US010976211B2

(12) United States Patent
Huang et al.

(10) Patent No.: US 10,976,211 B2
(45) Date of Patent: Apr. 13, 2021

(54) FULLY-AUTOMATED HANDHELD PRESSURE CALIBRATOR

(71) Applicant: BEIJING CONST INSTRUMENTS TECHNOLOGY INC., Beijing (CN)

(72) Inventors: Zhiyong Huang, Beijing (CN); Xin Liu, Beijing (CN); Fengshan Dong, Beijing (CN); Xilei Tian, Beijing (CN); Rui Li, Beijing (CN); Wei Ji, Beijing (CN); Licheng Li, Beijing (CN); Gang Wang, Beijing (CN); Hongjun Gao, Beijing (CN); Chunhui Wan, Beijing (CN)

(73) Assignee: BEIJING CONST INSTRUMENTS TECHNOLOGY INC., Beijing (CN)

( * ) Notice: Subject to any disclaimer, the term of this patent is extended or adjusted under 35 U.S.C. 154(b) by 200 days.

(21) Appl. No.: 16/329,096

(22) PCT Filed: Jul. 14, 2017

(86) PCT No.: PCT/CN2017/092962
§ 371 (c)(1),
(2) Date: Feb. 27, 2019

(87) PCT Pub. No.: WO2018/014790
PCT Pub. Date: Jan. 25, 2018

(65) Prior Publication Data
US 2019/0219472 A1  Jul. 18, 2019

(30) Foreign Application Priority Data

Jul. 22, 2016 (CN) .......................... 201610582819.2
Jul. 22, 2016 (CN) .......................... 201610587080.4

(51) Int. Cl.
*G01D 9/00* (2006.01)
*G01L 27/00* (2006.01)

(52) U.S. Cl.
CPC ............ *G01L 27/005* (2013.01); *G01D 9/005* (2013.01); *G01L 27/00* (2013.01)

(58) Field of Classification Search
CPC ........ G01L 27/00; G01L 27/005; G01D 9/005
See application file for complete search history.

(56) References Cited

U.S. PATENT DOCUMENTS 4,224,013 A   9/1980 Davis
4,658,829 A   4/1987 Wallace
(Continued)

FOREIGN PATENT DOCUMENTS

CN   201225251      4/2009
CN   201269794 Y    7/2009
(Continued)

OTHER PUBLICATIONS

European Search Report of EP Application No. 17830424, dated May 13, 2020.
(Continued)

*Primary Examiner* — Ryan D Walsh
(74) *Attorney, Agent, or Firm* — Rabin & Berdo, P.C.

(57) ABSTRACT

A fully-automated handheld pressure calibrator, comprising a housing, and gas circuit and electrical circuit components installed in the housing. The gas circuit components comprise a pressure source capable of supplying a pressurized gas. The gas circuit and electrical circuit components are integrated and installed in the housing in a modular manner, and the shape of the housing is suitable to be held in a hand. The pressure calibrator of the present invention enables all kinds of functions including pressure generation, pressure control, pressure instrument connection, and recording, result calculation, and report output of a pressure calibration process, and is suitable for on-site an on-line calibration of a pressure instrument.

37 Claims, 21 Drawing Sheets

(56) References Cited

U.S. PATENT DOCUMENTS

| | | | | |
|---|---|---|---|---|
| 6,640,614 | B1* | 11/2003 | Bode | ........................ G01L 27/02 |
| | | | | 73/1.01 |
| 2003/0046974 | A1 | 3/2003 | Kosh | |
| 2004/0206154 | A1* | 10/2004 | Kosh | ..................... G01L 27/005 |
| | | | | 73/1.64 |
| 2014/0182354 | A1* | 7/2014 | Jiang | ................... F04B 39/0094 |
| | | | | 73/1.63 |
| 2015/0228422 | A1* | 8/2015 | McFarland | ........ H01H 11/0062 |
| | | | | 73/1.71 |

FOREIGN PATENT DOCUMENTS

| | | |
|---|---|---|
| CN | 102182665 A | 9/2011 |
| CN | 102305688 A | 1/2012 |
| CN | 202326506 U | 7/2012 |
| CN | 103267608 A | 8/2013 |
| CN | 104595151 A | 5/2015 |
| CN | 205876644 U | 1/2017 |
| CN | 205879444 U | 1/2017 |
| EP | 2717031 A1 | 4/2014 |
| JP | H0868713 A | 3/1996 |
| JP | 2002174562 A | 6/2002 |

OTHER PUBLICATIONS

Laser et al., A Review of Micropumps, Journal of Micromechanics and Microengineering, Apr. 21, 2004, vol. 14, No. 6, pp. 35-64, Institute of Physics Publishing.
CNIPA Search Report.

* cited by examiner

FULLY-AUTOMATED HANDHELD PRESSURE CALIBRATOR

FIELD OF THE INVENTION

The present invention belongs to the field of metering calibration of pressure instruments, and relates to a micro fully-automated handheld pressure calibrator, which can compress air automatically to produce pressurized gas and accomplish gas pressure control automatically, is assembled from modules, and can be used to calibrate multi-range pressure instruments at different accuracies in the field by replacing a standard pressure module.

BACKGROUND OF THE INVENTION

Pressure instruments used in fields such as industrial production and pressure measurements, etc. have to be calibrated periodically, to ensure the pressure instruments detect pressure accurately and ensure the pressure equipment is used within safety limits. As industrial automation is developed rapidly, pressure instruments in production processes are evolved to digital and electrical ones gradually. To calibrate pressure instruments in service, many pressure instruments are usually mounted with a pressure calibration interface and a switching valve in the pressure pipeline, so that the pressure instruments in service can be calibrated in the field without disassembling.

Existing pressure calibrators usually comprise gas circuit components, which include a pressure source capable of supplying pressurized gas. In the calibration process of a pressure instrument in the field, for example, usually a pressure generation device compresses a medium to provide continuously changing pressure required for operation, and the generated pressure is controlled to be stable at a required specific pressure value; the pressure generation device, a pressure control unit, a standard pressure instrument, and a pressure instrument to be calibrated in the field are connected by means of connecting devices into a testing system, which is used to calibrate the pressure instrument in the field; the comparative pressure values of the standard pressure instrument and the calibrated pressure instrument are logged manually, calculations are carried out for the comparative pressure values to ascertain the error range of the calibrated pressure instrument at different pressure values, and finally whether the calibrated pressure instrument complies with the specification is ascertained, and a calibration report is generated, archived, and sent to the user.

Therefore, in such a field calibration process, usually several associated devices or instruments, including a pressure generation device, pressure medium connection and transfer devices, and a pressure data processing device, etc., are required to work with each other to accomplish calibration of the pressure instrument. Pressure instruments are used in industries at complex service locations, even at high altitudes, locations with small space, or highly polluted petroleum or chemical industries, where it is impossible to use the above-mentioned instruments in combination. Calibration apparatuses should be miniaturized and designed into portable or even handheld ones, to relieve the burden on calibration operators and improve operability of calibration processes.

At present, there is no handheld calibrator product that can realize all kinds of functions yet, including pressure generation, pressure control, pressure instrument connection, automatic recording in pressure calibration process, result calculation, and report output.

Contents of the Invention

To solve the above problems, the present invention provides a fully-automated handheld pressure calibrator that can realize all kinds of functions, including pressure generation, pressure control, pressure instrument connection, recording in pressure calibration process, result calculation, and report output.

The above object of the present invention is attained with the following solution:

A fully-automated handheld pressure calibrator, comprising a housing, and gas circuit components and electrical circuit components assembled in the housing, wherein, the gas circuit components comprise a pressure source capable of supplying pressurized gas, the constituents of the gas circuit components and the constituents of the electrical circuit components are integrated and assembled in the housing in a modular form, and the overall profile of the calibrator is suitable for holding in hand.

Wherein, the constituents of the gas circuit components include: a micro intelligent gas distribution module (200) combined with a micro gas pump (100), configured to provide pressurized gas and vacuum for the pressure calibrator, wherein the micro gas pump (100) serves as the pressure source; a micro intelligent pressure control module (300), configured to control and regulate the pressurized gas and vacuum from the micro intelligent gas distribution module (200); a standard pressure module (500), configured to provide reference pressure for the pressure calibrator; and a micro intelligent pressure interface module (400), configured to connect the micro intelligent pressure control module (300) and the standard pressure module (500).

A positive pressure connector (240) and a vacuum connector (245) of the micro intelligent gas distribution module (200) are plugged in and communicate with corresponding pressurized gas interface (72) and vacuum interface (80) of the micro intelligent pressure control module (300), a control module pressure connector (302) of the micro intelligent pressure control module (300) communicates with a gas pressure input interface (415) of the micro intelligent pressure interface module (400), and a gas circuit interface of the standard pressure module (500) is butt-jointed with a gas circuit interface of the micro intelligent pressure interface module (400).

Wherein, the electrical circuit components include: an interface circuit board (600) configured to connect the electrical circuits of the gas circuit components, a main control circuit board (700) configured to control the operation of the entire apparatus, a touch display screen (800) for input and output, external electrical measurement jacks (022), and external electric device interface mounting holes (015), wherein the electrical circuits of the electrical circuit components and a rechargeable battery (900) are electrically connected to the main control circuit board (700).

Wherein, the housing comprises an upper housing (010), a lower housing (030), and a lower cover (040); the upper housing (010) and the lower housing (030) are fitted together to form a main body of calibrator suitable for holding in hand, and the micro intelligent pressure interface module (400), the standard pressure module (500), the main control circuit board (700), the interface circuit board (600), and the touch display screen (800) are assembled in an internal space of the main body; the lower cover (040) is mounted on a top part outside the lower housing (030), and the micro intelligent gas distribution module (200) and the micro intelligent pressure control module (300) are assembled in an internal space formed by the lower cover (040) and the lower housing (030); the rechargeable battery (900) is assembled on a bottom part outside the lower housing (030).

The upper housing (010) is a wedge-shaped cover that is larger at the upper part and smaller at the lower part, with an inclined top end surface; a through-hole I (011) is arranged in the inclined top end surface to assemble a pressure connector (403) and a reference pressure connector (414) on the micro intelligent pressure interface module (400) in a way that the pressure connector (403) and the reference pressure connector (414) are exposed outside the housing; a square frame (013) is arranged in an outward flat surface of the upper housing (010) to accommodate the touch display screen (800); three circular external measurement jacks (012) are arranged above the square frame (013), and a circular hole is arranged below the square frame to mount a power supply button (014); external electric device interface mounting holes (015) are arranged in left side and right side of the upper housing (010).

The lower housing (030) is a wedge-shape holder that is larger at the upper part and smaller at the lower part, with an inclined top end surface; a through-hole II (031) is arranged in the inclined top end surface to mount a standard pressure module mounting base (406) of the micro intelligent pressure interface module (400).

A groove (018) is arranged at a circumferential edge of the upper housing (010) where the upper housing (010) is fitted with the lower housing (030), a flange (036) is arranged at a corresponding circumferential edge of the lower housing (030) where the lower housing (030) is fitted with the upper housing (010), and the flange (036) and the groove (018) are tightly fitted with each other.

The present invention further provides a micro intelligent gas distribution module used in the fully-automated handheld pressure calibrator. The micro intelligent gas distribution module (200) comprises a micro gas pump (100) and a gas source terminal block (280), wherein, the gas source terminal block (280) is connected with the micro gas pump (100) and communicates with a gas circuit, a primary gas suction pipeline (114) configured to suck external gas and a secondary gas discharge pipeline (122) configured to output pressurized gas are provided in the micro gas pump (100), a positive pressure gas chamber (234) and a vacuum gas chamber (236) are provided in the gas source terminal block (280), the two gas chambers (234,236) communicate with the two pipelines (114, 122) of the micro gas pump (100) and are controlled via micro solenoid valves (i.e., valve V1, valve V2, and valve V3) provided in the gas source terminal block (280).

Wherein, the gas source terminal block (280) comprises a valve terminal (230), two large accommodating cavities are arranged inside the valve terminal in a separated manner and are used as the positive pressure gas chamber (234) and the vacuum gas chamber (236) respectively, and the top parts of the accommodating cavities are sealed by a top cover (246); three small accommodating cavities are arranged inside the valve terminal and separated from each other to accommodate the valve V1, the valve V2, and the valve V3 respectively, and the positive pressure gas chamber (234) and the vacuum gas chamber (236) are connected with the three solenoid valves through pipelines.

The present invention further provides a cylinder body-guided micro boosting electric gas pump, which may be used as a micro gas pump (100) in a fully-automated handheld pressure calibrator. The cylinder body-guided micro pressurized electric gas pump comprises a pump body base (108), a motor base (102) and a motor that are connected with the pump body base, an eccentric shaft (104) driven by the motor, a link rod (105) interlocked with the eccentric shaft, a primary cylinder body (1081), a secondary cylinder body (106), a piston rod (110) that runs through the primary cylinder body and the secondary cylinder body and is movable synchronously with the link rod, and a plurality of one-way valves provided at outer ends of the two cylinder bodies.

Wherein, the two ends of the pump body base (108) form the primary cylinder body (1081) and a secondary cylinder body support base (1082), the secondary cylinder body (106) is assembled at the inner side of the secondary cylinder body support base (1082) and is in the same axial line as the primary cylinder body (1081); the volume of the secondary cylinder body (106) is smaller than the volume of the primary cylinder body (1081), and a primary gas discharge pipeline (117) of the primary cylinder body (1081) communicates with a secondary gas suction pipeline (120) of the secondary cylinder body (106).

The two ends of the piston rod (110) are provided with a primary piston end (1101) and a secondary piston end (1102), the primary piston end is fitted with the primary cylinder body (1081), and the secondary piston end extends into the secondary cylinder body (106) and is fitted with the secondary cylinder body.

The secondary cylinder body (106) is a hollow columnar body, a first step surface (1062) perpendicular to the axial direction of the secondary cylinder body (106) is arranged on the inner surface of the columnar body, a second combined seal (107) is assembled at the first step surface (1062), and the side surfaces of the pump body base (108) abut against the second combined seal (107).

The first step surface (1062) is configured in a way that a primary through-hole (1061) and a secondary through-hole (1066) are formed in the inner surface of the secondary cylinder body (106) and communicate with each other, the diameter of the primary through-hole (1061) is greater than the diameter of the secondary through-hole (1066), and the inner surface of the primary through-hole (1061), the first step surface (1062), and the outer surface of the secondary piston end (1102) of the piston rod (110) form an annular groove together, in which the second combined seal (107) is placed; a pair of protrusions (1083) corresponding to each other are arranged at the joint between the pump body base (108) and the secondary cylinder body (106) to retain the second combined seal (107).

Wherein, the outer surface of the secondary cylinder body (106) is at least provided with a second step surface (1063), a seal ring abuts against the second step surface (1063), and the sides of the motor base (104) abut against the seal ring; or, the outer surface of the secondary cylinder body (106) is provided with two stages of steps with a third step surface (1064) and a fourth step surface (1065), the distance of the third step surface (1064) from the central axis of the secondary cylinder body (106) is smaller than the distance of the fourth step surface (1065) from the central axis of the secondary cylinder body (106), a seal ring (128) abuts against the third step surface (1064), and the sides of the motor base (104) abut against the seal ring (128) and the fourth step surface (1065).

The end intersecting surface area of the primary piston end (1101) is greater than the end intersecting surface area of the secondary piston end (1102), and the corresponding axial cross sectional area of the primary cylinder body (1081) is greater than the axial cross sectional area of the secondary cylinder body (106).

Wherein, the outer end of the primary cylinder body (1081) is provided with a cylinder body gasket (112), a primary gas suction one-way valve (115) and a primary gas discharge one-way valve (116) that are assembled in a reversed direction, and an end cap (113) sequentially. The primary gas suction one-way valve (115) and the primary gas discharge one-way valve (116) communicate with the inner cavity of the primary cylinder body (1081), a primary gas suction pipeline (114) on the end cap (113) is connected with external gas and communicates with the primary gas suction one-way valve (115), a primary gas discharge pipeline (117) on the end cap (113) communicates with the primary gas discharge one-way valve (116) and communicates with a secondary gas suction pipeline (120) in the secondary cylinder body (106) via a connection pipeline (119).

The outer end of the secondary cylinder body (106) is provided with a secondary gas suction pipeline (120) and a secondary gas discharge pipeline (122), a secondary gas suction one-way valve (121) configured to control gas intake is mounted in front of an inlet of the secondary gas suction pipeline (120), and the primary gas discharge pipeline (117) in the primary cylinder body (1081) communicates with the secondary gas suction one-way valve (121) and the secondary gas suction pipeline (120) via a connection pipeline (119) disposed in a valve terminal (130); a secondary gas discharge one-way valve (123) configured to control gas discharge is mounted at an outlet of the secondary gas discharge pipeline (122).

Wherein, the valve V3 disposed in the gas source terminal block (280) is a two-position three-way solenoid valve, which comprises a first vent hole (2331) of valve V3, a second vent hole (2332) of valve V3, and a third vent hole (2333) of valve V3, wherein the third vent hole (2333) of valve V3 communicates with the external atmosphere, the second vent hole (2332) of valve V3 communicates with the primary gas suction pipeline (114) of the micro electric pump (100), and the first vent hole (2331) of valve V3 communicates with the vacuum gas chamber (236) via a gas flow pipeline I (238).

The valve V1 disposed in the gas source terminal block (280) is a two-position two-way solenoid valve, which comprises a first vent hole (2311) of valve V1 and a second vent hole (2312) of valve V1, wherein the first vent hole (2311) of valve V1 communicates with the external atmosphere, and the second vent hole (2312) of valve V1 communicates with the secondary gas discharge pipeline (122) of the micro gas pump (100).

The valve V2 disposed in the gas source terminal block (280) is a two-position two-way solenoid valve, which comprises a first vent hole (2321) of valve V2 and a second vent hole (2322) of valve V2, wherein the first vent hole (2321) of valve V2 communicates with the secondary gas discharge pipeline (122) of the micro gas pump (100), and the second vent hole (2322) of valve V2 communicates with the positive pressure gas chamber (234).

Wherein, a sealing cushion (241) is laid on the outer surface of the valve terminal (230), and has a first irregular through-hole (2411) that communicates with the primary gas suction pipeline (114) via the third vent hole (2333) of valve V3; the outer side of the sealing cushion is fitted with the lower cover (040), the lower cover (040) has gas suction through-holes (042) composed of a plurality of vent holes at a position corresponding to the first irregular through-hole (2411), and a filter (041) is provided in the first irregular through-hole (2411).

The sealing cushion (41) is further arranged with a second irregular through-hole (2412), which communicates with the secondary gas discharge pipeline (122) via the first vent hole (2311) of valve V1; the lower cover (040) has gas discharge through-holes (043) composed of a plurality of vent holes at a position corresponding to the second irregular through-hole (2412).

The present invention further provides a micro intelligent pressure control module for a fully-automated handheld pressure calibrator. The micro intelligent pressure control module (300) comprises a control valve terminal (61) and a pressure sensor (69), a vacuum sensor (67), a circuit board (63), a gas intake control solenoid valve (64), a gas discharge control solenoid valve (66), a fourth solenoid valve (65), a pressurized gas interface (72), a vacuum interface (80), and a gas passage connector, which are integrated in the control valve terminal (61). wherein:

A plurality of pipelines formed by pipeline holes are provided inside the control valve terminal; both the pressure sensor (69) and the vacuum sensor (67) are electrically connected with the circuit board (63); the pressurized gas interface (72), the pressure sensor (69), and the gas intake control solenoid valve (64) are connected with the gas passage connector via the plurality of pipelines; the vacuum interface (80), the vacuum sensor (67), the fourth solenoid valve (65), and the gas discharge control solenoid valves (66) are connected with the gas passage connector through the plurality of pipelines.

Wherein, the gas passage connector is formed by a first connector (81), a union joint (82), and a control module pressure connector (302) that are connected sequentially, the first connector is a hollow tubular structure and is connected with one end of the union joint, the other end of the union joint is plug-in connected with the control module pressure connector (302), and a seal ring is provided inside the port of the first connector (81) and the port of the control module pressure connector (302).

Wherein, the pressure sensor, the vacuum sensor, and the circuit board are electrically connected to a main electrical circuit interface; the gas intake control solenoid valve, the gas discharge control solenoid valve, and the fourth solenoid valve are electrically connected to the main electrical circuit interface through connecting wires; and the main electrical circuit interface is connected to an interface circuit board (600).

Wherein, the gas intake control solenoid valve and the gas discharge control solenoid valve are micro high-precision gas flow control valves, each of which is arranged with a first port and a second port; the fourth solenoid valve is a two-position three-way solenoid valve arranged with a first vent hole (651) of fourth solenoid valve, a second vent hole (652) of fourth solenoid valve, and a third vent hole (653) of fourth solenoid valve; when the fourth solenoid valve is in a power-off state, the second vent hole (652) of fourth solenoid valve communicates with the third vent hole (653) of fourth solenoid valve; when the fourth solenoid valve is in a power-on state, the first vent hole (651) of fourth solenoid valve communicates with the second vent hole (652) of fourth solenoid valve, and the second vent hole (652) of fourth solenoid valve is blocked from the third vent hole (653) of fourth solenoid valve.

The pressurized gas interface (72) is fixed to one side of the control valve terminal (61), one end of the pressurized gas interface (72) is plug-in mounted in and leak-tight connected with the positive pressure connector (240) of the micro intelligent gas distribution module (200), and the other end of the pressurized gas interface (72) is inside the control valve terminal and communicates with a first pressure pipeline (73); the pressure sensor (69) is arranged with a first port and a second port, the first port communicates with the first pressure pipeline (73), and the second port communicates with a second pressure pipeline (74); the gas intake control solenoid valve (64) is arranged with a first port and a second port, the first port communicates with the second pressure pipeline (74), and the second port communicates with a third pressure pipeline (75); the third pressure pipeline (75) communicates with a fourth pressure pipeline (76); the fourth pressure pipeline (76) communicates with a second port of the gas discharge control solenoid valve (66) and the first connector (81).

The vacuum interface (80) is fixed to one side of the control valve terminal (61), one end of the vacuum interface (80) is located on the surface of the control valve terminal and plug-in mounted in and leak-tight connected with the vacuum connector (245) of the micro intelligent gas distribution module (200), and the other end of the vacuum interface (80) is inside the control valve terminal and communicates with a first vacuum pipeline (78); the vacuum sensor (67) is arrange with a first port and a second port, the first port communicates with the first vacuum pipeline (78), and the second port communicates with the first vent hole (651) of fourth solenoid valve; the second vent hole (652) of fourth solenoid valve communicates with a downstream gas discharge pipeline (77), and the third vent hole (653) of fourth solenoid valve communicates with the atmosphere; the downstream gas discharge pipeline (77) is connected with the first port of the gas discharge control solenoid valve (66), the second port of the gas discharge control solenoid valve communicates with the fourth pressure pipeline (76), and the fourth pressure pipeline is connected with the first connector (81).

The present invention further provides a micro intelligent pressure interface module for the fully-automated handheld pressure calibrator. The micro intelligent pressure interface module (400) comprises a connector base (402) configured to assemble a standard pressure module (500), and a pressure connector (403), a reference pressure connector (414), and a gas pressure input interface (415) that are provided on the connector base, wherein the gas pressure input interface communicates with the pressure connector, the reference pressure connector, and the standard pressure module through gas flow pipelines inside the connector base, the pressure connector and the reference pressure connector are connected with an external pressure instrument to be tested, wherein the connector base (402) comprises a first columnar body structure and a second columnar body structure that extend in two different directions, and has two connecting surfaces, i.e., a gas pressure input connecting surface is arranged at the junction between the two columnar body structures, and the gas pressure input interface (415) is provided on the gas pressure input connecting surface; a connector connecting surface is arranged at and end of the first columnar body structure, and the pressure connector (403) and the reference pressure connector (414) are provided on the connector connecting surface; a standard pressure module connecting surface is arranged at an end of the second columnar body structure, and the standard pressure module (500) is assembled on the standard pressure module connecting surface.

Wherein, a reference pressure cavity (408), a gas-liquid separation chamber (407), and a first solenoid valve (409) are further provided in the connector base (402), the first solenoid valve is disposed between the pressure connector (403) and the gas-liquid separation chamber, the pressure connector communicates with the gas-liquid separation chamber via a first gas flow pipeline (421) and a second vent hole (424) of first solenoid valve, and the gas-liquid separation chamber directly communicates with the gas pressure input interface (415); the gas-liquid separation chamber communicates with the reference pressure cavity via the first solenoid valve and a fourth gas flow pipeline (420), and the reference pressure cavity communicates with the reference pressure connector (414).

Wherein, the outer side of the gas-liquid separation chamber is sealed by means of a vent valve seat (404), a second solenoid valve (410) is provided in the vent valve seat, a second vent hole (426) of second solenoid valve communicates with the gas-liquid separation chamber (407) through the first gas flow pipeline (421), and a first vent hole (425) of second solenoid valve communicates with the atmosphere.

Wherein, a filth filter (413) is provided at an internal port of the pressure connector (403) and an internal port of the reference pressure connector (414) respectively.

Wherein, a module pressure interface (416) and a module reference pressure interface (417) are provided on the standard pressure module connecting surface of the connector base (402), the module reference pressure interface directly communicates with the reference pressure cavity (408), and module pressure interface communicates with the gas-liquid separation chamber (407) through a third gas flow pipeline (419).

Wherein, a standard pressure module mounting base (406) is further mounted on the standard pressure module connecting surface of the connector base (402), the standard pressure module mounting base is a columnar body structure with a L-shaped stepped hole, a deeper side of the L-shaped stepped hole is connected with a connecting surface of the standard pressure module mounting base of the connector base, a through-slot is arranged in the step of a shallower side of the L-shaped stepped hole, a second circuit board (405) is mounted on the top part of the through-slot, a communication plug (412) passes through the through-slot and is electrically connected to the second circuit board, and a socket (411) is electrically connected to the communication plug.

Wherein, the standard pressure module (500) is a differential pressure module plug-in mounted to the connector base (402) from the standard pressure module mounting base (406), a pressure interface (505) of the differential pressure module is plug-in mounted to the module pressure interface (416) of the connector base, the pressure reference interface (514) is plug-in mounted into the module reference pressure interface (417), a seal ring (504) of the differential pressure module seals the interface connections, the communication plug (412) on the connector base is plug-in mounted into a communication socket (508) of the differential pressure module, a first circuit board (502) of the differential pressure module is electrically connected to the second circuit board (405) on the connector base, and the differential pressure module is fixed to the connector bases (402) by non-removable screws (506) on the differential pressure module; or the standard pressure module is an absolute pressure module, a pressure interface (505) of the absolute pressure module is plug-in mounted into the module pressure interface (416) of the connector base, a seal ring (504) of the absolute pressure module seals the interface connections, the communication plug (412) on the connector base is plug-in mounted into a communication socket (508) of the absolute pressure module, a first circuit board (502) of the absolute pressure module is electrically connected to the second circuit board (405) on the connector base, and the absolute pressure module is fixed to the connector base (402) by non-removable screws on the absolute pressure module; or the standard pressure module is a gauge pressure module, a pressure interface (505) of the gauge pressure module is plug-in mounted into the module pressure interface (416) of the connector base, a seal ring (504) of the gauge pressure module seals the interface connection, the communication plug (412) on the connector base is plug-in mounted into a communication socket (508) of the gauge pressure module, a first circuit board (502) of the gauge pressure module is connected to the second circuit board (405) of the connector base, and the gauge pressure module is fixed to the connector base (402) by non-removable screws on the gauge pressure module.

In the fully-automated handheld pressure calibrator provided in the present invention, an interface circuit board plug (601) configured to connect the main control circuit board (700), a gas distribution module socket (602) configured to connect the electrical circuit (201) of the micro intelligent gas distribution module (200), a control module socket (603) configured to connect the electrical circuit (301) of the micro intelligent gas control module (300), a battery plug (604) configured to connect a rechargeable battery (900), and an interface module socket (606) configured to connect the electrical circuit (401) of the micro intelligent pressure interface module (400) are distributed on the interface circuit board (600).

A display screen socket (705) and a touch screen socket (706) configured to connect a display screen and a touch screen in the touch display screen (800) respectively, module interface sockets (704) configured to extended external module interfaces (025) for temperature and pressure, etc., a socket (707) for connecting a USB interface (024) and a DC interface (023), and interface circuit board sockets (703) configured to connect the interface circuit board (600), and a core circuit board (701), a Bluetooth module (708), a Wifi module (702), a memory unit (711), and a microswitch (712), etc. are distributed on the main control circuit board (700).

Wherein, the main control circuit board (700) further includes a measurement circuit (709) configured to connect external electrical measurement interfaces, which are a plurality of external electrical measurement interfaces (022) mounted on an electrical measurement interface press plate (021) and pressed into measurement jacks (012) on a front end surface of the upper housing (010).

Wherein, the main control circuit board (700) is connected with the interface circuit board (600) via a supporting frame (050), which is mounted together with the main control circuit board (700) and the touch display screen (800) integrally on the inner side of the upper housing (010).

Wherein, the main control circuit board (700) is further connected with a communication module (1000), which is connected to a database (3000) through a network (2000).

Wherein, the main control circuit board (700) is electrically connected with a camera assembly that comprises a camera unit (4000), a camera (5000) provided on the camera unit, and an image recognition program embedded in the main control circuit board (700), wherein the camera faces the front side of the calibrated pressure instrument to capture the data and model information displayed on a dial of the calibrated pressure instrument and the appearance characteristics of the calibrated pressure instrument.

With the design described above, the present invention has the following features:

A. The present invention is a fully automated handheld calibrate compact in size and light in weight, suitable for holding in hand, and incorporates a variety of functions, including automatic gas pressure generation, stable pressure control, and data logging, etc.; it is convenient to carry and can be used conveniently for calibration work in the field.

B. A user-friendly man-machine interaction interface is realized by operating on a touch display screen connected to the main control circuit board, and thereby the learning difficulty of the user is decreased; the user can accomplish all operations in the calibration process with the interface on the touch display screen.

C. The apparatus in the present invention is equipped with a modular intelligent gas circuit system composed of a micro intelligent gas distribution module (including a micro gas pump), a micro intelligent pressure control module, and a micro intelligent pressure interface module. The components of the modular intelligent gas circuit system are connected to an interface circuit board, which is in turn plug-in mounted in and connected to a main control circuit board in the main control circuit system, so that the intelligent gas circuit system is controlled via the main control circuit system to accomplish operations such as intelligent pressure generation, gas distribution, pressure control, pressure relief, and blowdown, etc.

D. The apparatus in the present invention may be adapted to different instruments to be calibrated, which may be different in accuracy, measurement range, and type (absolute pressure, differential pressure, or gauge pressure), by replacing the standard pressure module mounted on the pressure interface module, so as to calibrate different types of pressure instruments.

E. The main control circuit board in the present invention includes a measurement circuit part, to which the external electrical measurement interface of the calibrator is connected, so as to measure electrical signals (e.g., current and voltage, etc.) the calibrated pressure instrument and process the signals via the measurement circuit part. The main control circuit board can log the electrical signals from all parts, calculate a calibration result, store calibration records, and output a calibration report.

F. The main control circuit board is provided with a Wifi module and a Bluetooth module, and the external communication interface connected to the main control circuit board is provided with a USB interface, so that the calibrator can carry out import/export of data and report by means of wireless or wired communication.

G. The external communication interface is provided with two extended module interfaces, which are connected to the main control circuit board, and can connect external pressure and temperature modules and the like to extend the calibration functions of the calibrator in the present invention to acquire other desirable parameters (e.g., external pressure and temperature), and extend the pressure measurement range and the local pressure generation capacity of the calibrator.

H. A communication module is included so that the calibrator obtains a remote communication function and any intermediate communication medium is omitted. Thus, the calibrator may be connected to a remote database after simple setting as long as it can access a supported network, so as to download pre-stored basic information of the calibrated pressure instrument from the database in real time and upload the calibration data to the database through the network in real time.

I. The fully-automated handheld calibrator provided in the present invention is equipped with a high-capacity rechargeable battery, which can supply power continuously for a long time to facilitate field calibration work.

REFERENCE NUMBERS OF COMPLETE APPARATUS

100: micro gas pump; 200: micro intelligent gas distribution module; 201: micro intelligent gas distribution module connecting circuit;

300: micro intelligent pressure control module; 301: micro intelligent pressure control module connecting circuit; 302: control module pressure connector; 303: elastic gas guide cushion;

400: micro intelligent pressure interface module; 401: micro intelligent pressure interface module connecting circuit;

500: standard pressure module;

600: interface circuit board; 601: interface circuit board plug; 602: gas distribution module socket; 603: control module socket; 604: battery plug; 606: interface module socket;

700: main control circuit board; 701: core circuit board; 702: Wifi module; 703: interface circuit board socket; 704: module interface socket; 705: touch screen socket; 706: display screen socket; 707: socket for connecting USB interface and DC interface; 708: Bluetooth module; 709: measurement circuit; 711: memory unit; 712: microswitch; 713: elastic plate;

800: touch display screen; 801: touch screen bracket;

900: rechargeable battery; 901: guide rail groove; 902: battery socket; 903: battery groove;

010: upper housing; 011: through-hole I; 012: measurement jack; 013: square frame; 014: power supply button; 015: external electric device interface mounting hole (mounting holes of interface for external electric device); 016: waterproof end cap; 018: groove;
020: connecting circuit board; 021: electrical measurement interface press plate; 022: external electrical measurement interface; 023: DC interface; 024: USB interface; 025: module interface; 026: hanger-type fixing base; 027: mounting plate; 028: retaining rib; 029: seal ring;
030: lower housing; 031: through-hole II; 032: groove I; 033: groove II; 034: battery mounting guide rail; 035: T-shaped groove; 036: flange;
040: lower cover; 041: filter; 042: gas suction through-hole; 043: gas exhaust through-hole;
050: supporting frame; 055: groove III; 056: reinforcing rib

DETAILED DESCRIPTION OF THE EMBODIMENTS

Hereunder the fully-automated handheld pressure calibrator in the present invention will be detailed in embodiments with reference to the accompanying drawings.

Figure 1A:
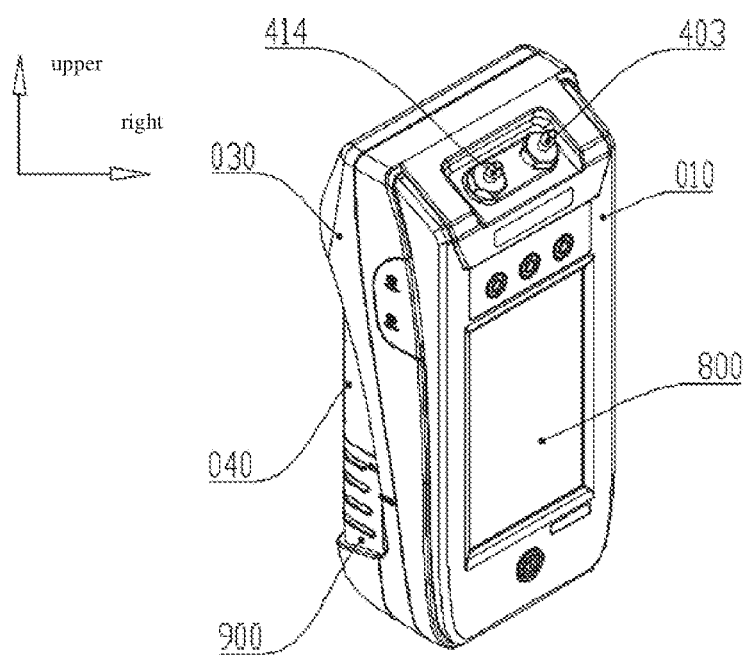
FIG. 1A is an overall outside view of the fully-automated handheld pressure calibrator in the present invention.
Figure 1B:
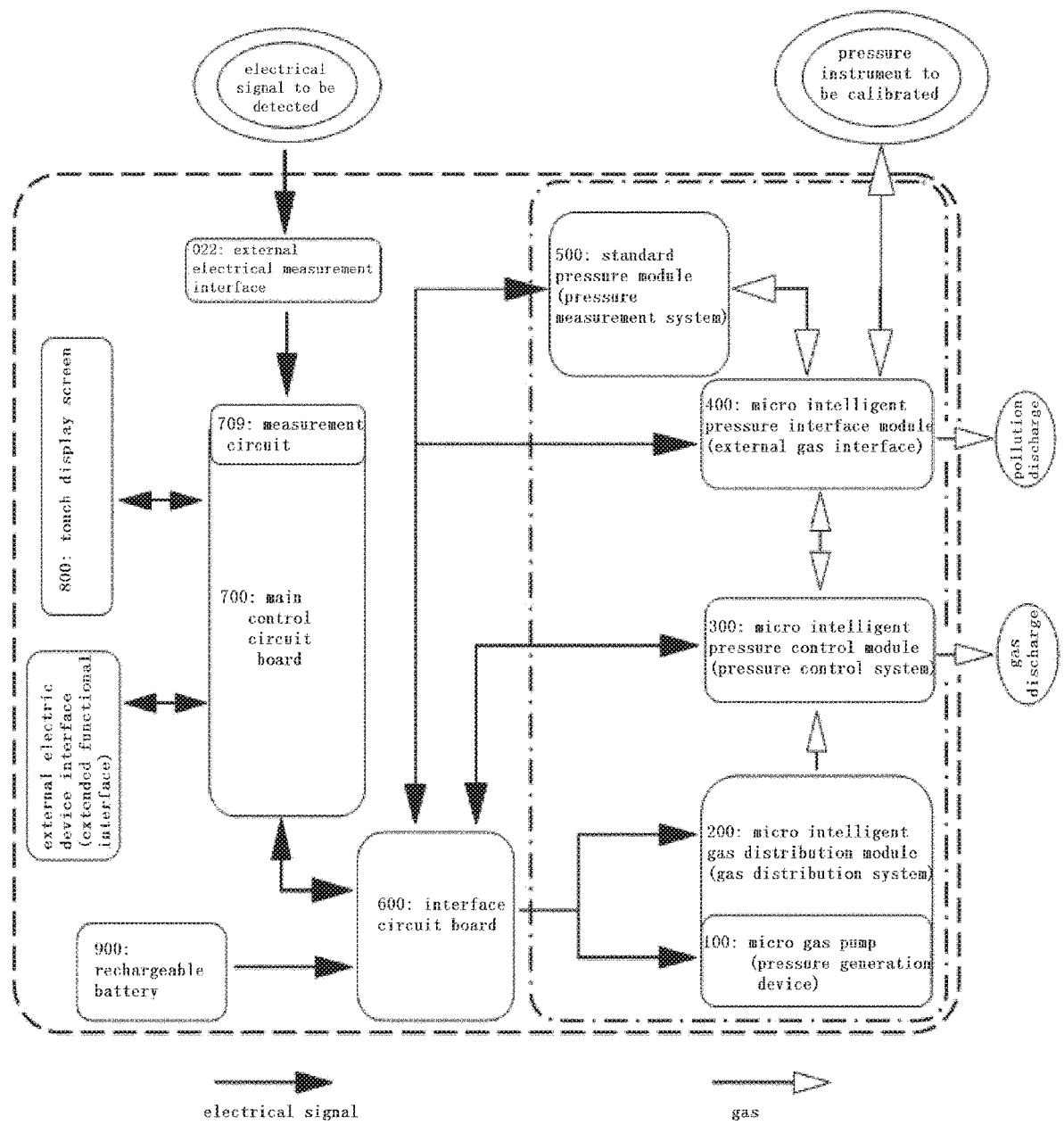
FIG. 1B is a structural logic diagram of the fully-automated handheld pressure calibrator in the present invention.
Figure 1C:
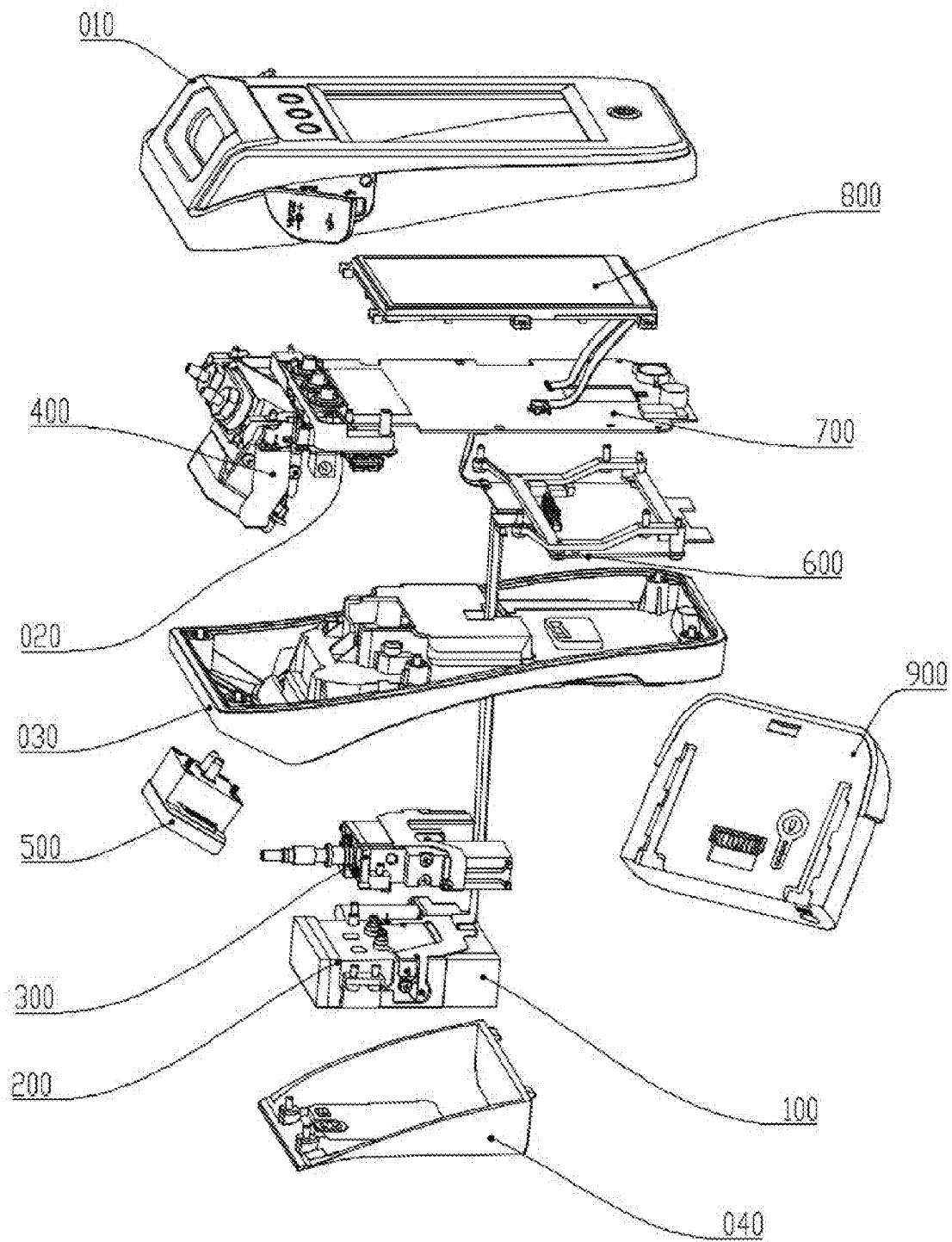
FIG. 1C is an exploded structural view of the fully-automated handheld pressure calibrator in the present invention.

As shown in FIGS. 1A, 1B, and 1C, the fully-automated handheld pressure calibrator in the present invention is in a modular design. The calibrator comprises a housing composed of an upper housing 010, a lower housing 030, and a lower cover 040, gas circuit components and electrical circuit components integrated and assembled in the housing, and a rechargeable battery 900 mounted outside the housing. Wherein, the gas circuit components comprise a micro intelligent gas distribution module 200 (including a micro gas pump 100), a micro intelligent pressure control module 300, a micro intelligent pressure interface module 400, and a standard pressure module 500; the electrical circuit components comprise a touch display screen 800, a main control circuit board 700, an interface circuit board 600, and external electrical measurement interfaces 022 and mounting holes of interface for external electric device 015; the electrical circuits of the gas circuit components are connected to the interface circuit board 600, and the electrical circuits of the electrical circuit components are connected to the main control circuit board 700. Hereunder the components will be detailed:

Housing

The housing of the fully-automated handheld pressure calibrator in the present invention is made of an elastic material (thermoplastic polyurethane elastomer (TPU), which has excellent encapsulation performance and is suitable for holding in hand), and is generally light and convenient and comfortable to hold in hand. The structure of the housing is shown in FIGS. 1A, 1C, 2, and 3:

The housing comprises an upper housing 010 and a lower housing 030, wherein, the upper housing 010 and the lower housing 030 are fitted together to form a main body of calibrator suitable for holding in hand, and the micro intelligent pressure interface module 400, the standard pressure module 500, the main control circuit board 700, the interface circuit board 600, and the touch display screen 800 are assembled in an internal space of the main body; a lower cover 040 is mounted on an outer side of the lower housing 030, a micro intelligent gas distribution module 200 (including a micro gas pump 100) and a micro intelligent pressure control module 300 are assembled in an internal space formed by the lower cover 040 and the lower housing 030, and a rechargeable battery 900 is assembled on the bottom part outside the lower housing 030.

The upper housing 010 is a wedge-shaped cover body in overall, and is a structure that is larger at the upper part and smaller at the lower part when it is placed in the direction of use of the calibrator (the direction shown in FIG. 1A); a top end surface (the left side is top side in FIGS. 2 and 3) of the upper housing 010 is an inclined surface with a through-hole I 011, the elastic material (TPU) on the inner side of the circumference of the upper housing 010 extends to the inclined surface and the through-hole I 011 in the inclined surface, so that the through-hole 011 and the parts mounted in the through-hole 011 are tightly fitted with each other (the through-hole I 011 is configured in a way that a pressure connector 403 and a reference pressure connector 414 of the micro intelligent pressure interface module 400 are exposed outside the calibrator from the inclined surface of the upper housing 010); a square frame 013 is arranged in an outward flat surface of the upper housing 010 (i.e., the upward flat surface in FIGS. 2 and 3) to accommodate the touch display screen 800; three circular measurement jacks 012 are provided above the square frame 013, and a circular hole is provided below the square through-hole to mount a power supply button 014; when the power supply button 014 is mounted in the circular hole, a flange of the power supply button 014 is tightly fitted with the inner side of the upper housing 010 at the position of the circular hole; mounting holes of interface for external electric device 015 (see FIG. 3) are arranged on left side and right side of the upper housing 010, the two external electric device interface mounting holes 015 are sealed with a waterproof end cap 016 respectively, and the two waterproof end caps 016 are rotatable and movable with respect to the upper housing 010 but are non-detachable from the upper housing 010; a groove 018 is arranged in the circumferential edge of the upper housing 010 where the upper housing 010 is fitted with the lower housing 030.

The lower housing 030 is a wedge-shaped holder in overall, and is a structure that is large at the upper side and smaller at the lower side when it is placed in the direction of use of the calibrator (the direction shown in FIG. 1A); a top end surface (the left side is top side in FIGS. 2 and 3) of the lower housing 030 is an inclined surface with a through-hole II 031 (see FIG. 3), the elastic material (TPU) on the inner side of the circumference of the lower housing 030 transits to the top inclined surface of the lower housing 030 and into the through-hole II 031 in the inclined surface, so that the through-hole II 031 and the part (a standard pressure module mounting base 406 of the micro intelligent pressure interface module 400) mounted in the through-hole II 031 are tightly fitted with each other. A flange 036 is arranged on the circumferential edge of the lower housing 030 where the lower housing 030 is fitted with the upper housing 010; when the lower housing 030 and the upper housing 010 are mounted and fitted together, the flange 036 (also made of the elastic material TPU) on the lower housing 030 extends into a groove 018 on the upper housing 010 to ensure tight fitting between the mounting surfaces.

To mount the touch display screen 800, a groove is arranged on the circumference of the square frame 013 at the inner side of the upper housing 010, a piece of box-shaped waterproof foam material is mounted in the groove, the touch display screen 800 is stacked on a touch screen bracket 801 (see FIG. 2), the touch screen bracket 801 is mounted on the inner side of the upper housing 010 and secured at the position of the square frame 013, pressing the waterproof foam material. The touch display screen 800 is composed of a touch screen and a liquid crystal display that are stacked together and used in combination.

The lower cover 040 is a wedge-shaped cover in overall, and is a structure that is smaller at the upper part and larger at the lower part when it is placed in the direction of use of the calibrator (the direction shown in FIG. 1A), the lower cover 040 is assembled on the top part outside the lower housing 030, with its smaller end facing upward (the left side is top side in FIGS. 2 and 3), and the part of the lower cover 040 that is fitted with the lower housing 030 is also made of the elastic material (TPU); when the lower housing 030 and the lower cover 040 are fitted together, the lower cover 040 presses the elastic material (TPU) that extends to the fitting part to ensure tightly fitting between the mounting surfaces. The rechargeable battery 900 is assembled on a bottom part of the lower cover 040 outside the lower housing 030.

The parts of the housing are sealed so that the entire fully-automated handheld calibrator in the present invention is sealed at a high waterproof and dustproof level.

The upper housing 010, the lower housing 030, the lower cover 040, and the rechargeable battery 900 are assembled into the fully-automated handheld pressure calibrator shown in FIG. 1A, which shows the integrity and handheld characteristics of the calibrator. Top, bottom, left, right, front, back, and inside and outside are defined herein with reference to the direction of use of the calibrator shown in FIG. 1A. Hereunder the internal components and the assembly of the components of the fully-automated handheld pressure calibrator will be detailed in the following description of the components.

Micro Intelligent Gas Distribution Module 200 (Including a Micro Gas Pump 100)

In the present invention, the micro intelligent gas distribution module 200 serves as a gas source for the calibrator, and can store pressurized gas and vacuum and can be switched to provide vacuum or pressurized gas.

Figure 14:
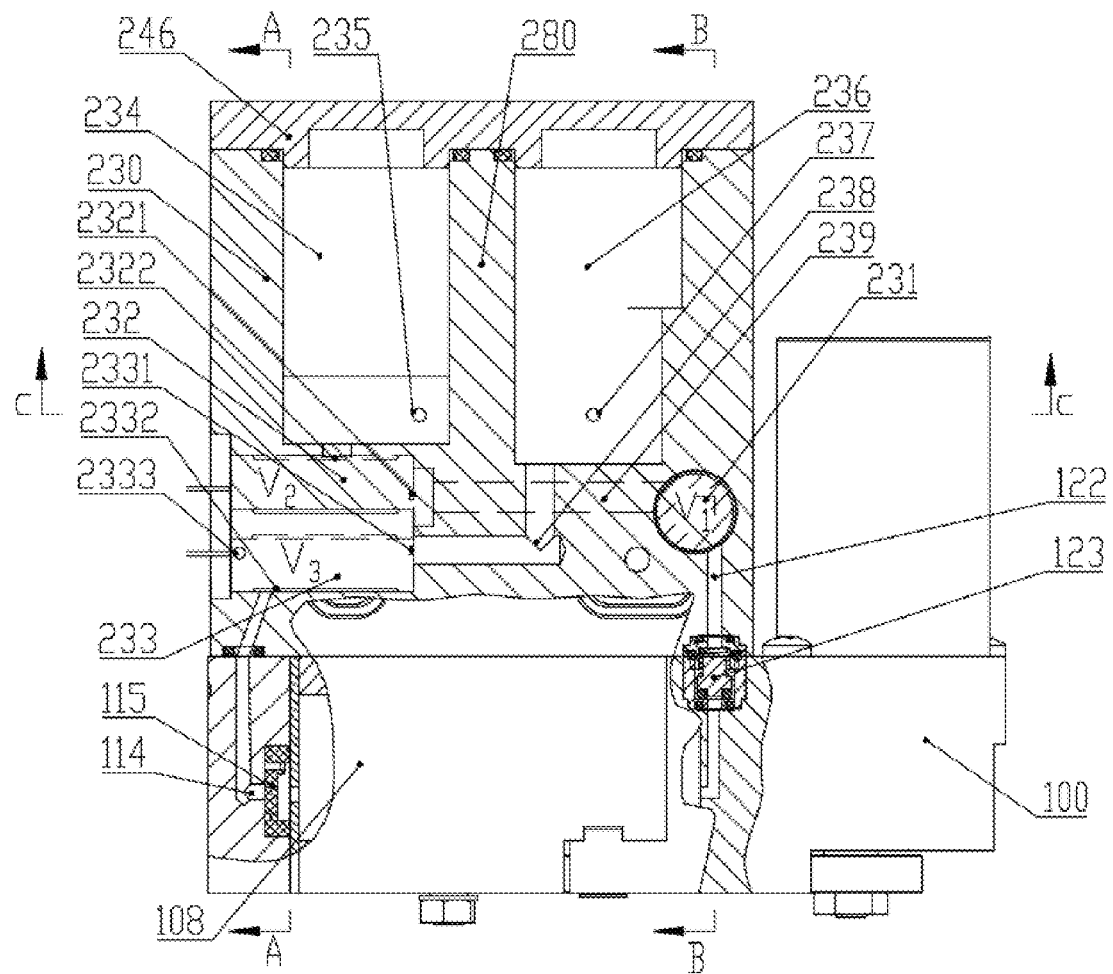
FIG. 14 is a sectional view of the structure of the micro intelligent gas distribution module.
Figure 15:
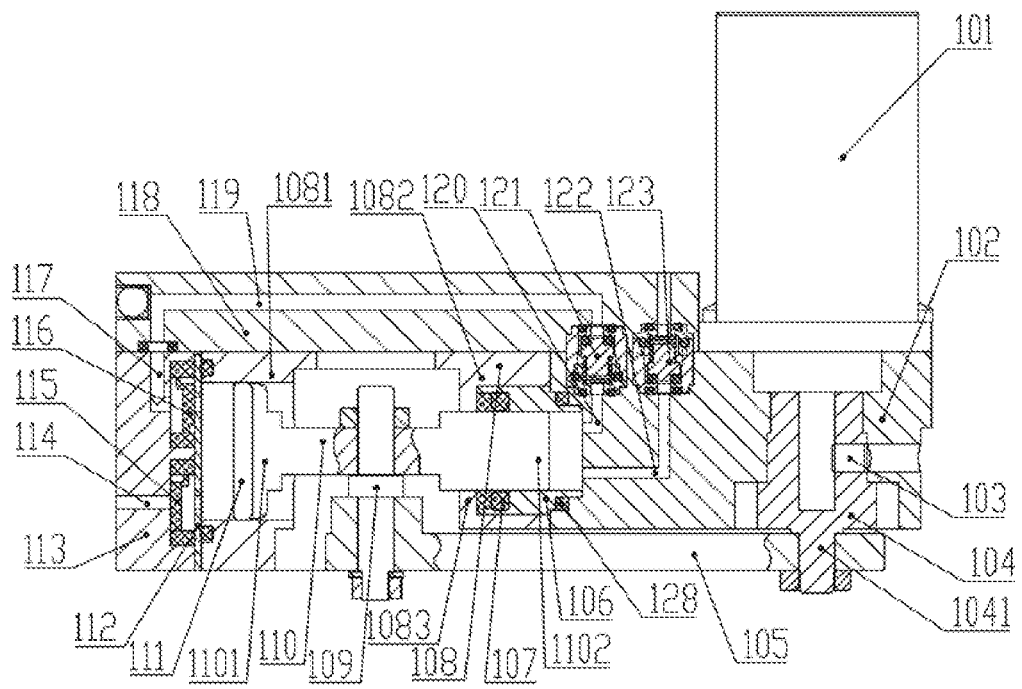
FIG. 15 is a sectional view of the structure of the micro gas pump in the micro intelligent gas distribution module.

The micro intelligent gas distribution module 200 comprises two parts, i.e., a micro gas pump 100 and a gas source terminal block 280, as shown in FIG. 14, wherein, the micro gas pump 100 is a boosting electric gas pump, and the gas source terminal block 280 makes the micro gas pump 100 communicate with the environment. The reference numbers for this part include:

100: micro gas pump; 101: motor; 102: motor base;
103: pin shaft; 104: eccentric shaft; 1041: drive tang; 105: link rod;
106: secondary cylinder body; 1061: primary through-hole; 1062: first step surface; 1063: second step surface; 1064: third step surface; 1065: fourth step surface; 1066: secondary through-hole;
107: second combined seal;
108: pump body base; 1081: primary cylinder body; 1082: secondary cylinder body support base; 1083: protrusion;
109: pin; 110: piston rod; 1101: primary piston end; 1102: secondary piston end; 111: first combined seal; 112: cylinder body gasket;
113: end cap; 114: primary gas suction pipeline; 115: primary gas suction one-way valve;
116: primary gas discharge one-way valve; 117: primary gas discharge pipeline; 118: press plate;
119: connection pipeline;
120: secondary gas suction pipeline; 121: secondary gas suction one-way valve; 122: secondary gas discharge pipeline; 123: secondary gas discharge one-way valve;
124: one-way valve core; 1241: top protrusion; 1242: bottom protrusion; 125: one-way one-way valve body; 1251: gas inlet; 1252: gas outlet; 126: spring; 127: valve end cap; 129: valve body seal ring;
128: seal ring;
280: gas source terminal block; 230: valve terminal;
231: valve V1; 2311: first vent hole of valve V1; 2312: second vent hole of valve V1;
232: valve V2; 2321: first vent hole of valve V2; 2322: second vent hole of valve V2;
233: valve V3; 2331: first vent hole of valve V3; 2332: second vent hole of valve V3;
2333: third vent hole of valve V3;
234: positive pressure gas chamber; 235: positive pressure gas chamber ventilation pipeline; 236: vacuum gas chamber; 237: vacuum gas chamber ventilation pipeline; 238: gas flow pipeline I; 239: gas flow pipeline II; 240: positive pressure connector; 241:
sealing cushion; 2411: first irregular through-hole; 2412: second irregular through-hole; 242: ventilation plate; 245: vacuum connector; 246: top cover.

I. Micro Gas Pump 100

In the present invention, the micro gas pump 100 is a cylinder body-guided micro boosting electric gas pump, and its structure is shown in FIGS. 14-17. The micro gas pump 100 comprises a motor 101, an eccentric shaft 104, a link rod 105, a secondary cylinder body 106 and a primary cylinder body 1081, a piston rod 110, a pin 109, a pump body base 108, a plurality of one-way valves and seal rings, and a plurality of pipelines, wherein:

the pump body base 108 is a connecting component of the electric gas pump, the motor 101 is fixed to one side of the pump body base 108 in the vertical direction via the motor base 102, the eccentric shaft 104 is fixed to the bottom part of the motor base 102 via the pin shaft 103, and the motor shaft extends into a groove of the eccentric shaft 104 in the vertical direction and is positioned by means of the pin shaft 103.

A drive tang 1041 that extends downward and offset from axle center is provided at the lower end of the eccentric shaft 104, the drive tang 1041 passes through a mounting hole in one end of the link rod 105 arranged horizontally, and an end part of the drive tang 1041 extends out of the link rod 105 and is fixed with a screw nut; the pin 109 that is arranged vertically passes through another mounting hole arranged in the other end of the link rod 105 and connects the link rod 105 on the piston rod 110 in the horizontal direction, the link rod 105 is spaced from the piston rod 110, the end of the pin 109 extending out of the link rod 105 and the end of the pin 109 extending out of the piston rod 110 are fixed with a screw nut respectively.

The piston rod 110 comprises a rod part and a primary piston end 1101 and a secondary piston end 1102 arranged at two ends of the rod part, and the primary piston end 1101 and the secondary piston end 1102 extend into the primary cylinder body 1081 and the secondary cylinder body 106 respectively. The two ends of the pump body base 108 form the primary cylinder body 1081 and a secondary cylinder body support base 1082, i.e., the primary cylinder body 1081 and the secondary cylinder body support base 1082 are formed integrally. The primary cylinder body 1081 is configured to accommodate low-pressure gas, and is located at a distal end of movement of the link rod 105 (the mark "left" in the figure is the distal end of movement of the link rod 105), and the primary piston end 1101 is assembled inside the primary cylinder body 1081; the secondary cylinder body support base 1082 is configured to assemble the secondary cylinder body 106, the secondary cylinder body 106 is configured to accommodate high-pressure gas, and the secondary piston end 1102 is assembled inside the secondary cylinder body 106. The secondary piston end 1102 is a cylinder, and the secondary piston end 1102 extends into the secondary cylinder body 106 and is fitted with the secondary cylinder body 106 to form a sealed structure in the left-right movement process of the piston rod 110. In addition, the rod part of the piston rod 110 doesn't extend into the secondary cylinder body 106 in the left-right movement process of the piston rod 110. The piston rod 110 forms a sealed structure inside the primary cylinder body 1081 by means of a first combined seal 111 of the primary piston end 1101, and the first combined seal 111 is formed by a hollow bowl-shaped seal ring lined with an elastic seal ring; the piston rod 110 forms a sealed structure inside the secondary cylinder body 106 by means of a second combined seal 107 between the secondary cylinder body 106 and the outer surface of the piston rod 110, and the second combined seal 107 is assembled from a conventional highly wear-resistant rigid ring and an elastic seal ring fitted over the rigid ring. The motor 101 drives the eccentric shaft 104 to rotate, which drives the link rod 105 to swing left and right via the drive tang 1041 (leftward swing end of the link rod 105 is a distal end of movement of the link rod 105 with respect to the eccentric shaft 104, and the rightward swing end of the link rod 105 is a proximal end of movement of the link rod 105 with respect to the eccentric shaft 104), and the link rod 105 in turn drives the piston rod 110 via the pin 109 to reciprocate left and right along the axial line in the primary cylinder body 1081 and the secondary cylinder body 106. The end surface area of the primary piston end 1101 of the piston rod 110 is greater than the end surface area of the secondary piston end 1102, and accordingly the axial cross sectional area of the primary cylinder body 1081 is greater than the axial cross sectional area of the secondary cylinder body 106; thus, in the left-right movement process of the piston rod 110, the stroke of the piston rod 110 is the same, the gas in the primary cylinder body 1081 is compressed and then driven to enter into the secondary cylinder body 106 under the control of the one-way valve, and the volume of the gas is reduced in the secondary cylinder body 106 (i.e., the gas is further compressed), and thereby primary pressurization of the gas is realized.

A cylinder body gasket 112, one-way valves (including a primary gas suction one-way valve 115 and a primary gas discharge one-way valve 116), and an end cap 113 are provided at the outer end of the primary cylinder body 1081. Two vent holes are arranged in the cylinder body gasket 112, and the primary gas suction one-way valve 115 and the primary gas discharge one-way valve 116 communicate with the interior of the primary cylinder body 1081 via the two vent holes. Two pipelines, i.e., a primary gas suction pipeline 114 and a primary gas discharge pipeline 117, are arranged on the end cap 113. The primary gas suction pipeline 114 is configured to connect with ambient air or an external compressed air pipeline, and communicates with the primary gas suction one-way valve 115. The primary gas discharge pipeline 117 communicates with the primary gas discharge one-way valve 116 and is configured to discharge the gas in the primary cylinder body 1081.

The outer end of the secondary cylinder body 106 is connected with the motor base 102, two pipelines that communicate with the interior of the secondary cylinder body 106 are arranged inside the motor base 102 (including a secondary gas suction pipeline 120 and a secondary gas discharge pipeline 122), a gas-intake one-way valve (a secondary gas suction one-way valve 121) is mounted at the inlet of the secondary gas suction pipeline 120 to supply gas into the secondary cylinder body 106. Another gas discharge one-way valve (a secondary gas discharge one-way valve 123) is mounted at the outlet of the secondary gas discharge pipeline 122 to discharge out the gas in the secondary cylinder body 106. The pump body base 108 and the motor base 102 may be in a split design. In the case that they are in a split design, a press plate 118 may be provided to press and fit with the end cap 113, the top end of the pump body base 108 and the top end of the motor base 102, and press the secondary gas suction one-way valve 121 and the secondary gas discharge one-way valve 123 tightly at the same time; the press plate 118 has a built-in connection pipeline 119, one end of the connection pipeline 119 communicates with the primary gas discharge pipeline 117, and the other end of the connection pipeline 119 communicates with the secondary gas suction one-way valve 121. The pump body base 108 and the valve terminal 230 may be connected into an integral piece in the present invention (as shown in FIG. 14). In that case, the press plate 118 is unnecessary, and is substituted by the bottom of the valve terminal 230.

In the present invention, the secondary cylinder body 106 not only is fitted with the secondary piston end 1102 of the piston rod 110 to form an enclosed space to accommodate high-pressure gas, but also is arranged axial concentrically with the primary cylinder body 1081 and may be used as a guide device for the piston rod 110. The secondary cylinder body 106 serving as a guide device is located at the end at the secondary side of the piston rod 110 and forms a reversed guide structure, i.e., when the low-pressure piston (the primary piston end 1101) in the primary cylinder body 1081 (a low-pressure cylinder) compresses the gas forwardly (the left side is front side in FIG. 15), the secondary cylinder body 106 (a high-pressure cylinder) and the high-pressure piston (the secondary piston end 1102) that are assembled in a fitted manner become a main guide mechanism by means of fitting between shaft and hole, and attain a force guide effect in the direction reversed to the direction of movement of the low-pressure piston. The structure of the secondary cylinder body 106 is shown in FIG. 18, wherein, FIGS. 18A and 18B show two different structural forms of the secondary cylinder body 106 respectively.

Figure 17:
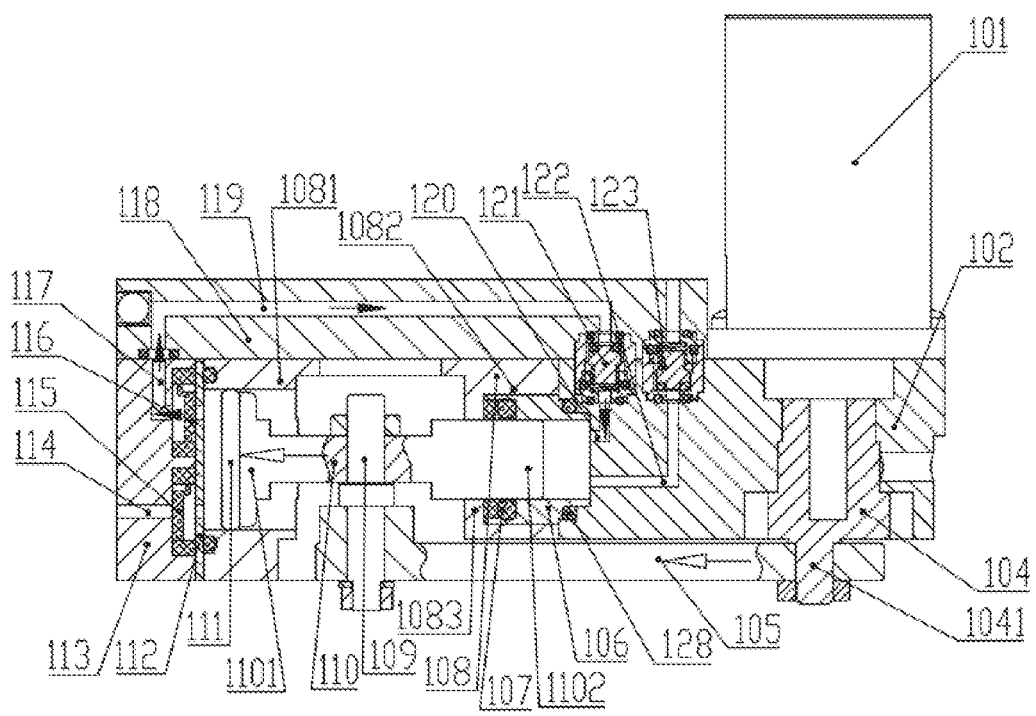
FIG. 17 is a schematic diagram of the piston rod of the micro gas pump in a leftward movement operating state.
Figure 18A:
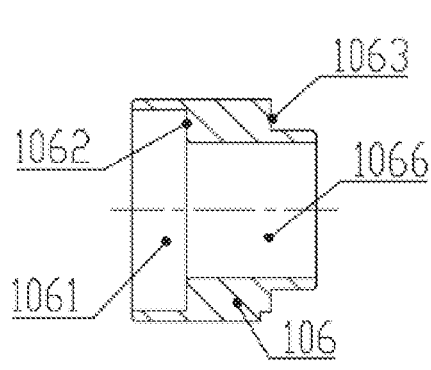
FIG. 18A and FIG. 18B are sectional views of two different structures of the secondary cylinder body in the micro gas pump.
Figure 18B:
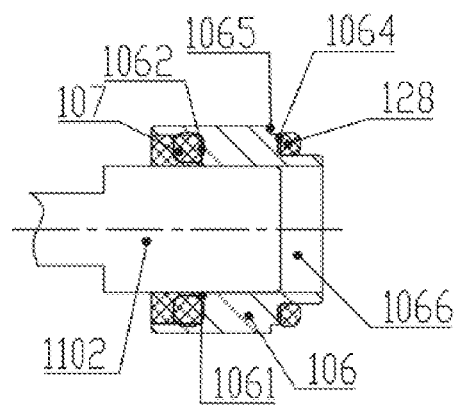

As shown in FIGS. 18A-B, the secondary cylinder body 106 is a hollow columnar body, with two stages of through-holes therein, i.e., a primary through-hole 1061 and a secondary through-hole 1066 respectively. The two stages of through-holes communicate with each other and the diameter of the primary through-hole 1061 is greater than the diameter of the secondary through-hole 1066, the primary through-hole 1061 has a first step surface 1062, which is perpendicular to the axial direction of the secondary cylinder body 106 and connects the inner surface of the primary through-hole 1061 and the inner surface of the secondary through-hole 1066. The inner diameter of the secondary through-hole 1066 is in clearance fit with the outer diameter of the secondary piston end 1102 of the piston rod 110, and the inner diameter of the primary through-hole 1061 is greater than the outer diameter of the secondary piston end 1102 of the piston rod 110; thus, the inner surface of the primary through-hole 1061, the first step surface 1062, and the outer surface of the secondary piston end 1102 of the piston rod 110 form an annular groove together, in which the second combined seal 107 is placed, so that a sealed structure is formed between the secondary cylinder body 106 and the secondary piston end 1102 of the piston rod 110 to prevent the gas inside the secondary cylinder body 106 from leaking at the first step surface 1062; a pair of protrusions 1083 corresponding to each other and capable of sealing the opening of the annular groove are arranged at the joint between the pump body base 108 and the secondary cylinder body 106 (see FIG. 17) to retain the second combined seal 107. An outer step is arranged on the outer surface of the secondary cylinder body 106 at the end of the secondary cylinder body 106 adjacent to the motor base 102, so that the outer surface of the secondary cylinder body 106 forms two parts different in outer diameter from each other. The outer step surface of the outer step (i.e., a second step surface 1063) is perpendicular to the axial direction of the secondary cylinder body 106. The second step surface 1063 connects the outer surfaces of the two parts of the secondary cylinder body 106 that are different in outer diameter from each other, a seal ring 128 is provided on the outer surface with smaller outer diameter of the secondary cylinder body 106, and the seal ring 128 abuts against the second step surface 1063, the motor base 102 is arranged outside the seal ring 128 and presses the seal ring 128 and thereby seals the side of the secondary cylinder body 106 that abuts against the motor base 102, so that the high-pressure gas inside the secondary cylinder body 106 can be discharged out only via the secondary gas discharge one-way valve 123.

FIG. 18B shows another structural form of the secondary cylinder body 106, which is similar to the structure shown in FIG. 18A, except for the structure of the outer step on the secondary cylinder body 106. To adjust the compression amount of the seal ring, the outer step of the secondary cylinder body 106 has two stages and forms two outer step surfaces, i.e., a third step surface 1064 and a fourth step surface 1065 respectively, wherein, the distance of the third step surface 1064 from the central axis of the secondary cylinder body 106 is smaller than the distance of the fourth step surface 1065 from the central axis of the secondary cylinder body 106. The seal ring 128 is disposed only on the third step surface 1064, both the third step surface 1064 and the fourth step surface 1065 are in compression fit with the motor base 102, the motor base 102 compresses the fourth step surface 1065 and thereby can prevent any play of the secondary cylinder body 106 incurred by the movement of the piston rod 110 (because it is possible that the elastic seal ring may be further deformed under pressure after it is compressed); the compression amount of the seal ring 128 may be adjusted by adjusting the spacing between the third step surface 1064 of the secondary cylinder body 106 and the surface of the motor base 102 that abuts against the elastic seal ring 128 in the axial direction. The motor base 102 has a structure that matches/mates with the two outer step surfaces, to fix and compress the seal ring 128 on one hand, and press the secondary cylinder body 106 on the pump body base 108 in the axial direction by means of a pressing surface of the motor base 102 that matches the fourth outer step surface 1065 on the other hand.

Figure 19:
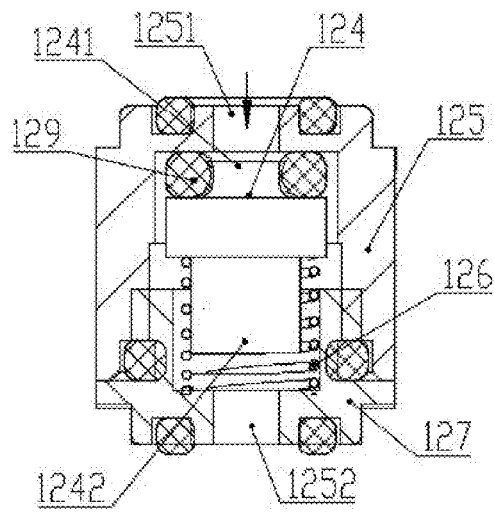
FIG. 19 is a sectional view of the structure of the one-way valve in the micro gas pump.

Wherein, the primary gas suction one-way valve 115, the primary gas discharge one-way valve 116, the secondary gas suction one-way valve 121, and the secondary gas discharge one-way valve 123 may be implemented with one-way valves that have an existing structure and the same function. Preferably, the one-way valve structure shown in FIG. 19 may be used. As shown in FIG. 19, the one-way valve comprises a one-way valve body 125, a valve end cap 127 that is thread-connected with the one-way valve body 125, a one-way valve core 124 disposed in the one-way valve body 125, and a spring 126 between the one-way valve core 124 and the valve end cap 127, wherein, the one-way valve body 125 is a hollow columnar body, with a top side arranged with a gas inlet 1251 for gas input, an open bottom end connected with the valve end cap 127 via a sealed interface, and a gas outlet 1252 arranged in the valve end cap 127; the one-way valve core 124 is coaxially mounted inside an inner cavity formed by the one-way valve body 125 and the valve end cap 127, with clearance around the one-way valve core 124; the one-way valve core 124 has a top protrusion 1241 and a bottom protrusion 1242, a valve body seal ring 129 is mounted between the top protrusion 1241 and the one-way valve body 125, and the spring 126 is fitted over the bottom protrusion 1242.

The working principle of the one-way valve is as follows: when the gas enters into the one-way valve via the gas inlet 1251 at the side of the one-way valve body 125 away from the spring 126, the gas applies pressure to the one-way valve core 124 and pushes the one-way valve core 124 to move toward the valve end cap 127; thus, the spring 126 is compressed and the clearance between the one-way valve core 124 and the one-way valve body is increased at the same time, the valve body seal ring 129 can't seal effectively anymore; as a result, the gas enters into the one-way valve body 125 and is discharged from the gas outlet 1252 in the valve end cap 127 via the clearance between the one-way valve body 125 and the one-way valve core 124. When no gas enters into the one-way valve via the gas inlet 1251 or the force applied by the gas entering into the valve is not enough to compress the spring 126, the compressed spring 126 rebounds and applies rebounding force upwardly, so that the one-way valve core 124 moves toward the gas inlet 1251 at the top of the one-way valve body 125 and the clearance between the one-way valve core 124 and the one-way valve body is decreased, the one-way valve core 124 presses the valve body seal ring 129 to attain a sealing effect, and the gas can't pass through the gas inlet 1251; when gas enters into the valve via the gas outlet 1252 in the reversed direction, the seal ring 129 is further compressed and retained in the sealed state, and the gas can't pass through the gas inlet 1251 in the reversed direction. Thus, one-way gas intake is realized.

The one-way valve has the following beneficial effects: firstly, the one-way valve has a compact structure, and is helpful for realizing miniaturization and saving space; secondly, the one-way valve may be manufactured separately and then plug-in mounted on an element that requires it, and thus can be used and replaced conveniently; and thirdly, the one-way valve can be opened in the reversed direction and used conveniently by reversing the mounting direction.

Figure 16:
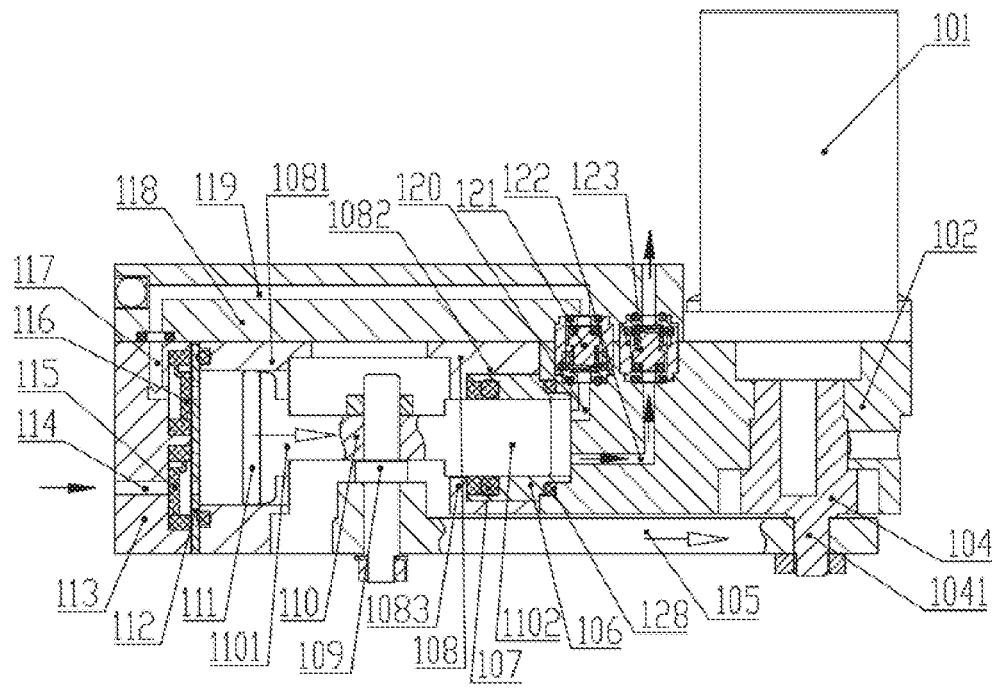
FIG. 16 is a schematic diagram of the piston rod of the micro gas pump in a rightward movement operating state.

The micro gas pump 100 is obtained by assembling the above components. The working principle of the micro gas pump 100 is as follows:

In FIG. 16, the motor 101 drives the eccentric shaft 104 to rotate, which in turn drives the link rod 105 and the piston rod 110 to move rightward and finally reach to the rightmost side. At that point, at the side of the primary cylinder body 1081 (the low-pressure part of the pump body, a low-pressure cylinder), the primary gas suction one-way valve 115 is opened, the primary gas discharge one-way valve 116 is closed, ambient air enters into the primary cylinder body 1081 through the primary gas suction pipeline 114, and the space inside the primary cylinder body 1081 is increased gradually and reaches a maximum space; at the same time, at the side of the secondary cylinder body 106 (the high-pressure part of the pump body, a high-pressure cylinder), the secondary gas suction one-way valve 121 is closed, the gas that came from the low-pressure cylinder previously is further compressed in the secondary cylinder body 106 and the pressure is increased, and thus a secondary pressurization process of the gas is realized; at that point, the secondary gas discharge one-way valve 123 is opened to discharge the gas that is pressurized secondarily.

In FIG. 17, the motor 101 drives the eccentric shaft 104 to rotate, which in turn drives the link rod 105 and the piston rod 110 to move leftward and finally reach to the leftmost side. At that point, at the side of the primary cylinder body 1081, the primary gas suction one-way valve 115 is closed, the primary gas discharge one-way valve 116 is opened, and the gas in the primary cylinder body 1081 enters into the secondary cylinder body 106 through the primary gas discharge pipeline 117, the connection pipeline 119, the secondary gas suction one-way valve 121, and the secondary gas suction pipeline 120; here, the secondary cylinder body 106 receives the gas that comes from the primary cylinder body 1081, and, owing to the fact that the area of the primary piston end 1101 is greater than the area of the secondary piston end 1102, the volume of the gas from the primary cylinder body 1081 is compressed after it enters into the secondary cylinder body 106, and the pressure of the gas is increased, and thus a primary pressurization process of the gas is realized. In that process, the secondary gas discharge one-way valve 123 remains closed when the gas pressure in the secondary cylinder body 106 is lower than the pressure at the discharge end of the secondary gas discharge one-way valve 123; the secondary gas discharge one-way valve 123 is opened and the primarily pressurized gas in the secondary cylinder body 106 is discharged through the secondary gas discharge pipeline 122 when the gas pressure in the secondary cylinder body 106 is greater than the pressure at the discharge end of the secondary gas discharge one-way valve 123.

Thus, the external gas is sucked into the primary cylinder body 1081 (as shown in FIG. 16), is compressed in the primary cylinder body 1081 (as shown in FIG. 17), and then enters into the secondary cylinder body 106, where the gas is subject to primary pressurization in which the volume of the gas is decreased and secondary pressurization in which the gas is compressed further (as shown in FIG. 16), and then is discharged through the secondary gas discharge pipeline 122. In that way, the micro gas pump operates cyclically and thereby realizes a function of providing pressurized gas continuously.

The micro gas pump 100 in the present invention has the following beneficial effects:

(1) In the portion of the secondary cylinder body 106, a second combined seal 107 is placed in the annular groove defined by the inner surface of the secondary cylinder body 106 and the outer surface of the piston rod 110, and thereby the dynamic seal between the piston rod 110 and the secondary cylinder body 106 in the prior art is improved to static seal, so that the service life of the second combined seal 107 is improved;

(2) The secondary cylinder body 106 is located at the secondary piston end 1102 of the piston rod 110, becomes a guide mechanism that utilizes fitting between shaft and hole structurally, and form a gas pump with an inherent guide function; moreover, the fitting length between the secondary cylinder body 106 and the piston rod 110 is great and thereby the stability of movement of the piston rod 110 is improved, the existing approach of utilizing seal elements as main piston guide parts is changed, and the abrasion of the seal elements is reduced;

(3) The secondary cylinder body 106 is made of a wear-resistant and self-lubricating material, and thereby the friction force between the secondary cylinder body 106 and the piston rod 110 is reduced, and the service life of the micro gas pump 100 is improved;

(4) Since there is self-lubrication between the secondary cylinder body 106 and the piston rod 110, any lubricant is unnecessary, and thereby an oil-free lubrication boosting gas pump is formed, and possible pollution of the micro gas pump 100 is reduced; and (5) The end surface area of the primary piston end 1101 is larger; thus, when the piston rod 110 moves leftward, since the pressure in the primary cylinder body 1081 is lower, the link rod 105 may apply lower force to the piston rod 110 to discharge a large quantity of gas in the primary cylinder body 1081 into the secondary cylinder body 106, and thereby the motor 101 may provide lower power to the link rod 105 and power consumption is reduced; since the end surface area of the secondary piston end 1102 is smaller, the gas pressure output can be higher, and the piston rod 110 requires lower power; hence, when the piston rod 110 moves rightward, the gas in the secondary cylinder body 106 can be pressurized, and a secondary pressurization process of the gas is realized.

II. Gas Source Terminal Block 280

Figures 20A, 20C:
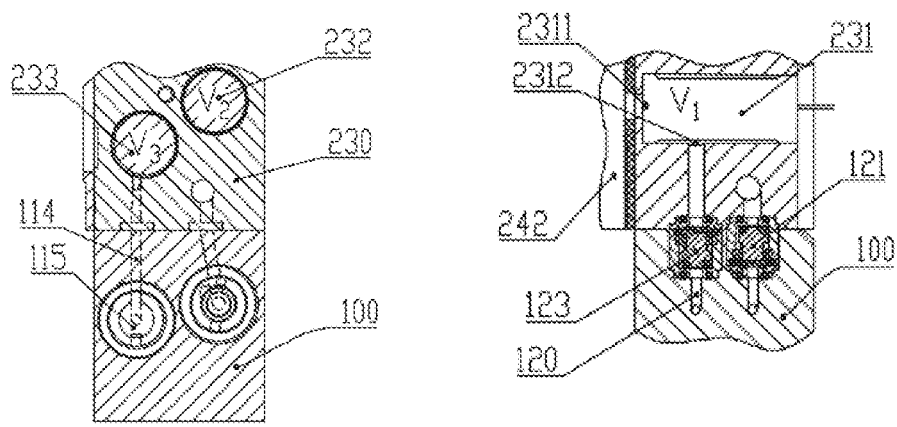
FIGS. 20A-C are sectional views illustrating the connections between valves V1-V3 and the micro gas pump.

Please see FIG. 14. The gas source terminal block 280 in the present invention comprises a valve terminal 230, a positive pressure gas chamber 234 and a vacuum gas chamber 236 arranged in the valve terminal 230, and three micro solenoid valves V1 231, V2 232, and V3 233 that communicate with the two gas chambers and micro gas pump pipelines. The valve terminal 230 is a component configured to arrange two gas chambers, three solenoid valves, and pipelines, and has two larger accommodating cavities, three smaller accommodating cavities, and a plurality of pipeline holes therein. The two larger accommodating cavities that are separated from each other may be directly used as a positive pressure gas chamber 234 and a vacuum gas chamber 236 respectively; in the case that the larger accommodating cavities are directly used as gas chambers, the top of each accommodating cavity is sealed with a top cover 246; as shown in FIG. 21B, the positive pressure gas chamber 234 is connected through a positive pressure gas chamber ventilation pipeline 235 and communicates with a positive pressure connector 240, the vacuum gas chamber 236 is connected through a vacuum gas chamber ventilation pipeline 237 and communicates with a vacuum connector 245; the three smaller accommodating cavities that are separated from each other are configured to accommodate the three solenoid valves V1 231, V2 232 and V3 233 respectively, and the positive pressure gas chamber 234, the vacuum gas chamber 236, and the three solenoid valves are interconnected through pipelines. Wherein:

Please see FIG. 14 and FIG. 20A (the section A-A in FIG. 14), the valve V3 233 is mounted in the valve terminal 230 at a position near the primary cylinder body 1081 at the low-pressure cylinder side of the micro gas pump 100. The valve V3 is a two-position three-way solenoid valve comprising three vent holes, i.e., a first vent hole 2331 of valve V3, a second vent hole 2332 of valve V3, and a third vent hole 2333 of valve V3, wherein the third vent hole 2333 of valve V3 communicates with the external atmosphere, the second vent hole 2332 of valve V3 communicates with the gas suction end of the micro gas pump 100, i.e., the primary gas suction pipeline 114, and the first vent hole 2331 of valve V3 communicates with the vacuum gas chamber 236 through a gas flow pipeline I 238. The three vent holes can be controlled to be open or closed via the valve V3.

Please see FIG. 14 and FIG. 20C (the section B-B in FIG. 14), the valve V1 231 is mounted in the valve terminal 230 at a position near the secondary cylinder body 106 at the high-pressure cylinder side of the micro gas pump 100. The valve V1 231 is a two-position two-way solenoid valve comprising two vent holes, i.e., a first vent hole 2311 of valve V1 and a second vent hole 2312 of valve V1, wherein the first vent hole 2311 of valve V1 communicates with the external atmosphere, and the second vent hole 2312 of valve V1 communicates with the pressurization output side of the micro gas pump 100, i.e., the secondary gas discharge pipeline 122. The secondary gas discharge pipeline 122 may be controlled to communicate with the ambient air or to be blocked from the ambient air by opening/closing the valve V1.

Figure 20B:
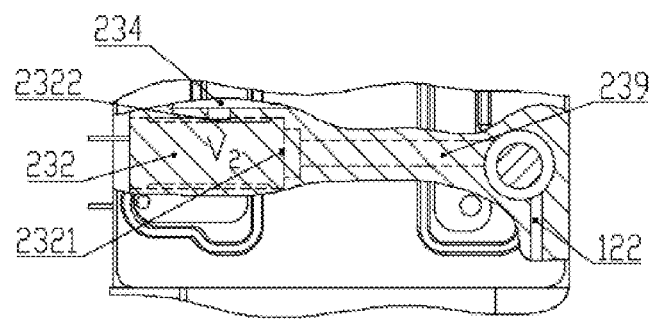

Please see FIG. 14 and FIG. 20B, the valve V2 232 is configured to communicate with the positive pressure gas chamber 234 and the pressurization output side of the micro gas pump 100, i.e., the secondary gas discharge pipeline 122. The valve V2 232 is a two-position two-way solenoid valve comprising two vent holes, i.e., a first vent hole 2321 of valve V2 and a second vent hole 2322 of valve V2, wherein the first vent hole 2321 of valve V2 communicates with the secondary gas discharge pipeline 122 through a gas flow pipeline II 239 (the secondary gas discharge pipeline 122 is split into two branches, which are connected with the valve V1 and the valve V2 respectively), and the second vent hole 2322 of valve V2 communicates with the positive pressure gas chamber 234. The two vent holes of valve V2 can be controlled to be open or closed via the valve V2.

The micro solenoid valves V1 231, V2 232 and V3 233 assembled as above and the motor 101 of the micro gas pump 100 are connected to the electrical circuits of the interface circuit board 600, the solenoid valves are controlled to be open or closed and the motor 101 of the micro gas pump 100 are controlled to start or stop through the electrical circuits, so that the gas flow between the micro gas pump 100 and the positive pressure gas chamber 234, vacuum gas chamber 236 or external atmosphere is connected or disconnected, high-pressure gas is stored in the positive pressure gas chamber 234, and vacuum is formed in the vacuum gas chamber 236.

The above-mentioned assembly is a basic form of the gas source terminal block 280 and can accomplish the following work:

The vacuum source generation process is as follows: the valve V3 is energized, the third vent hole 2333 of valve V3 is closed, the second vent hole 2332 of valve V3 and the first vent hole 2331 of valve V3 communicate with each other and are open, the vacuum gas chamber 236 communicates with the low-pressure gas suction pipeline 114 of the micro gas pump 100 via a gas flow pipeline I 238, and the low-pressure side of the micro gas pump 100 performs vacuum pumping of the vacuum gas chamber 236; the gas extracted from the vacuum gas chamber 236 is conveyed in the micro gas pump 100 to the high-pressure side, and then is conveyed through the secondary gas discharge pipeline 122 via the secondary gas discharge one-way valve 123 to the valve V1; when the valve V1 is energized, the second vent hole 2312 of valve V1 and the first vent hole 2311 of valve V1 are opened, and the gas extracted from the vacuum gas chamber 236 is discharged via the first vent hole 2311 of valve V1 to the atmosphere. As the micro gas pump 100 operates continuously, the gas in the vacuum gas chamber 236 is discharged continuously, and the vacuum degree in the vacuum gas chamber 236 is increased; when the valve V3 is deenergized, the first vent hole 2331 of valve V3 that communicates with the vacuum gas chamber 236 is closed, and thus the vacuum in the vacuum gas chamber 236 is retained. In the above process, the valve V2 is closed, and no pressurized gas is outputted from the micro gas pump 100 in the vacuum pumping process of the vacuum gas chamber 236.

Figure 11:
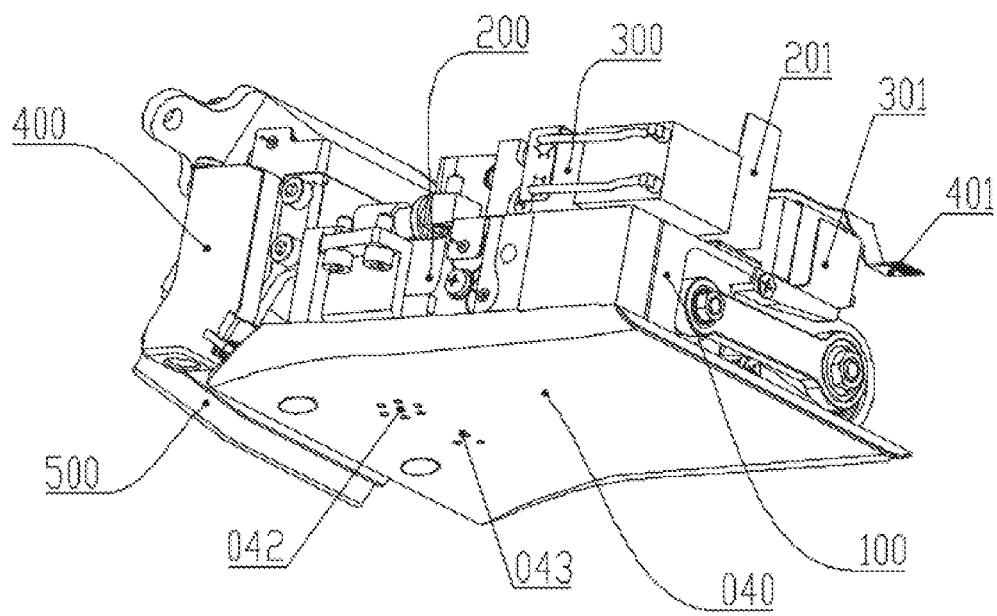
FIG. 11 is an assembly diagram of the gas circuit system of the fully-automated handheld pressure calibrator in the present invention.
Figure 13:
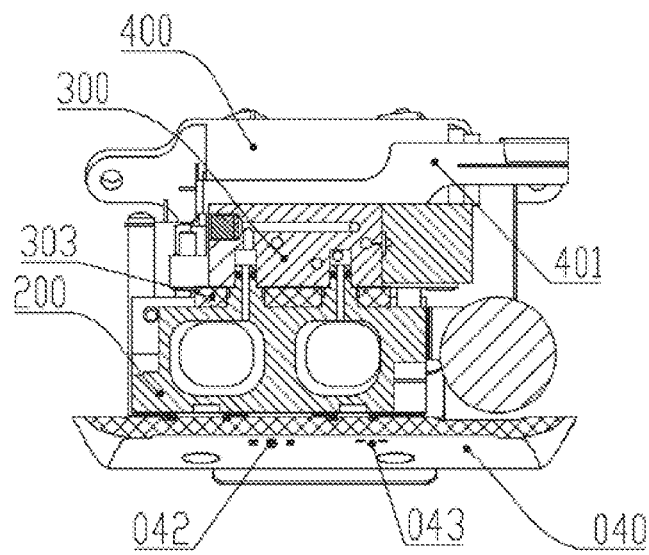
FIG. 13 is a sectional view of the gas circuit system of the fully-automated handheld pressure calibrator rotated by 90° clockwise in the direction B-B in FIG. 12 in the present invention.

The positive pressure gas source generation process is as follows: the valve V3 is deenergized, the first vent hole 2331 of valve V3 is closed (the micro gas pump 100 doesn't perform vacuum pumping of the vacuum gas chamber 236 anymore), the third vent hole 2333 of valve V3 and the second vent hole 2332 of valve V3 communicate with each other and are opened, and the primary gas suction pipeline 114 of the micro gas pump 100 communicates with the atmosphere via the third vent hole 2333 of valve V3; the micro gas pump 100 operates, the lower cover 040 and the sealing cushion 241 clamped between the lower cover 040 and the valve terminal 230 form a gas suction through-hole 042 (see FIGS. 11, 13 and 22), and the primary gas suction pipeline 114 of the micro gas pump 100 sucks external gas (air) from the gas suction through-hole 42 continuously and pressurizes the gas to form pressurized gas; the valve V2 is energized and the valve V1 is deenergized, the first vent hole 2321 of valve V2 and the second vent hole 2322 of valve V2 are opened, the first vent hole 2311 of valve V1 is closed, the pressurized gas formed by the micro gas pump 100 is conveyed through an external circulation flow path composed of the secondary gas discharge one-way valve 123, the secondary gas discharge pipeline 122, and the second vent hole 2312 of valve V1, the gas flow pipeline II 239, the first vent hole 2321 of valve V2, and the second vent hole 2322 of valve V2 to the positive pressure gas chamber 234, so that pressure is formed inside the positive pressure gas chamber 234.

Thus, the generated pressurized gas can be stored in the positive pressure gas chamber 234 and used as a positive pressure gas source, and the vacuum gas chamber 236 forms a vacuum source. During actual operation, as shown in FIG. 21B, the positive pressure gas chamber 234 can communicate with the micro intelligent pressure control module 300 via the positive pressure connector 240 and the vacuum gas chamber 236 can communicate with the micro intelligent pressure control module 300 via the vacuum connector 245, and thereby provide a positive pressure gas source or vacuum source.

When the gas source terminal block 280 operates initially, by opening the valve V1 and closing the valve V2, the secondary cylinder body 106 (high-pressure cylinder) of the micro gas pump 100 can communicate with the ambient air via the gas exhaust through-hole 043 (please see FIG. 22, the lower cover 040 and the sealing cushion 241 clamped between the lower cover 040 and the valve terminal 230 form a gas exhaust through-hole 043); at that point, the gas pressure in the high-pressure cylinder is the ambient atmospheric pressure, and thus the micro gas pump 100 can be started without pressure, a problem of damage of gas pump parts resulted from high pressure generated instantaneously owing to the small volume of the pipeline when the micro gas pump 100 is started, and thereby the gas pump is protected, and the service life of the micro intelligent gas distribution module 200 is prolonged. After the gas source is started here without pressure, the valve V1, the valve V2, and the valve V3 are controlled as required to generate pressurized gas and vacuum.

The gas source terminal block 280 designed as above can attain the following beneficial effects: firstly, it has compact structure and small size, and can automatically provide pressurized gas and vacuum. Secondly, the generated positive pressure gas source and vacuum can be stored in the positive pressure gas chamber 234 and the vacuum gas chamber 236, and can be used to provide a positive pressure gas source and a vacuum source directly when required, without starting the gas pump. Thus, frequent starting of the gas pump is reduced, and the gas supply efficiency of the gas source is improved.

III. Assembling and Improvement of Micro Intelligent Gas Distribution Module 200

Figure 2:
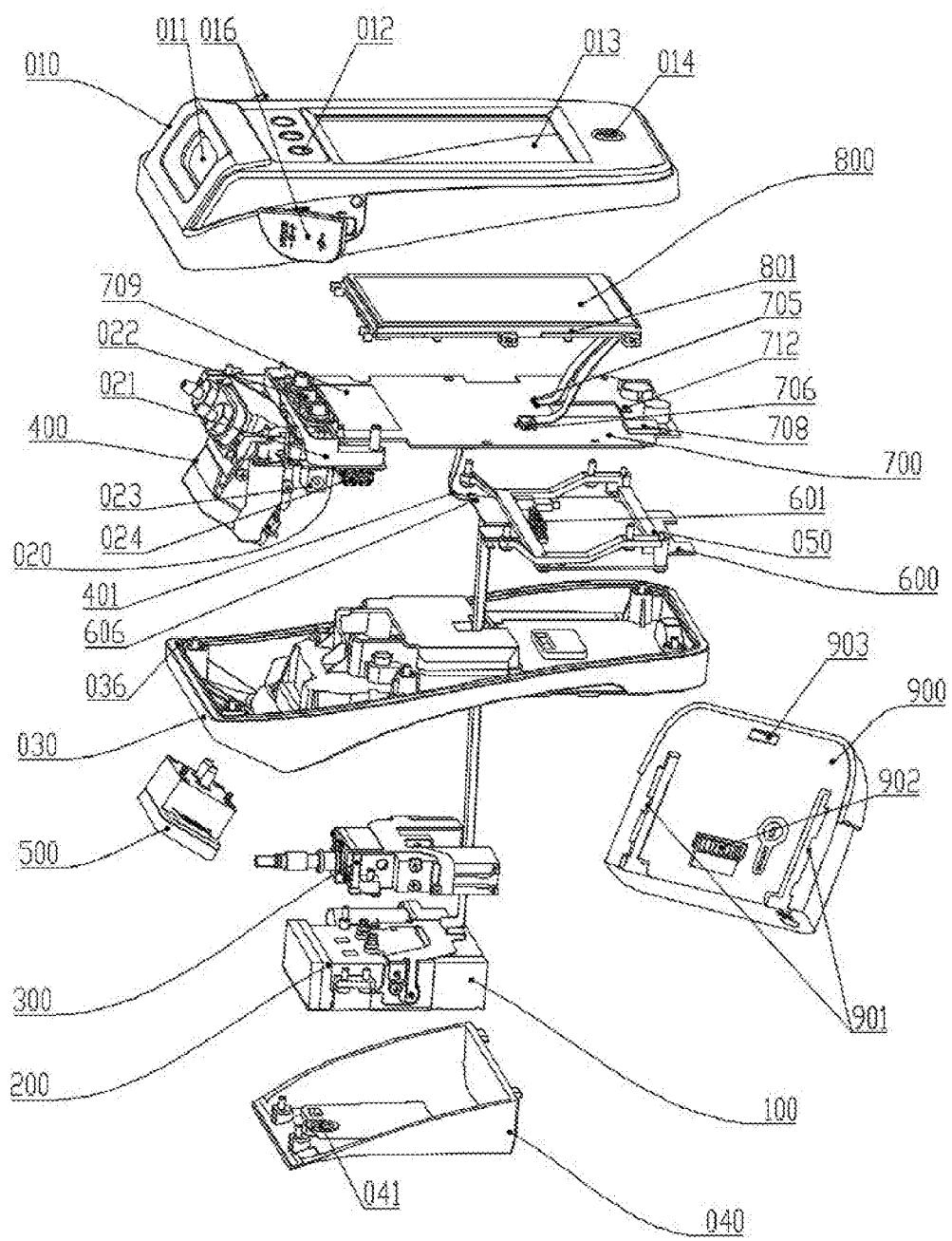
FIG. 2 is an exploded isometric view of the overall structure of the fully-automated handheld pressure calibrator in the present invention.
Figure 3:
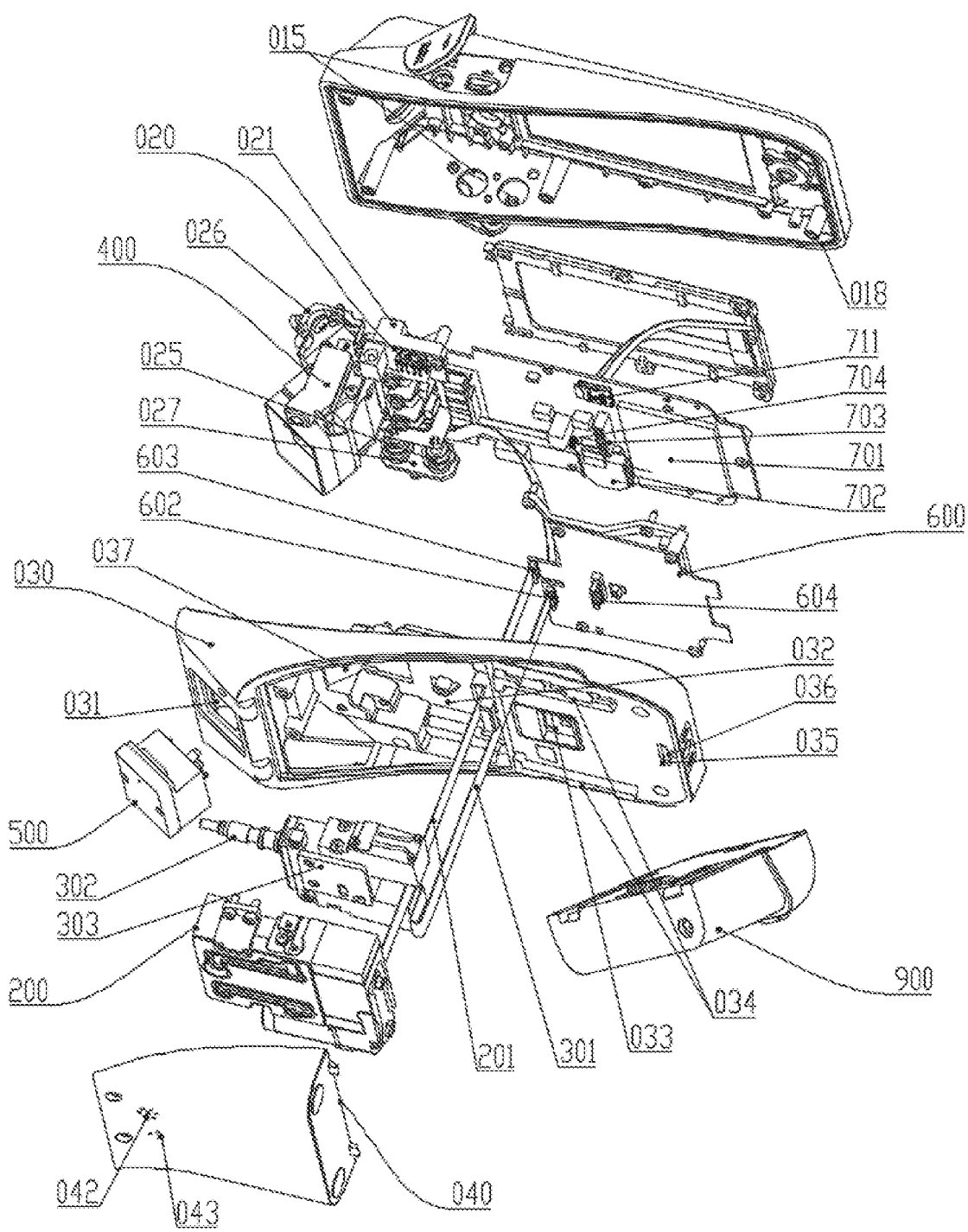
FIG. 3 is a bottom exploded isometric view of the overall structure of the fully-automated handheld pressure calibrator in the present invention.

As shown in FIGS. 2 and 3, after the micro intelligent gas distribution module 200 is plug-in mounted in the micro intelligent pressure control module 300, the micro intelligent gas distribution module 200 is disposed between the lower housing 030 and the lower cover 040 and located at the side of the lower cover 040.

In the present invention, the above-mentioned basic form of micro intelligent gas distribution module 200 is expanded to form an improved gas distribution module. The improvement is embodied in an additional sealing cushion and an additional filter system.

Figure 21A:
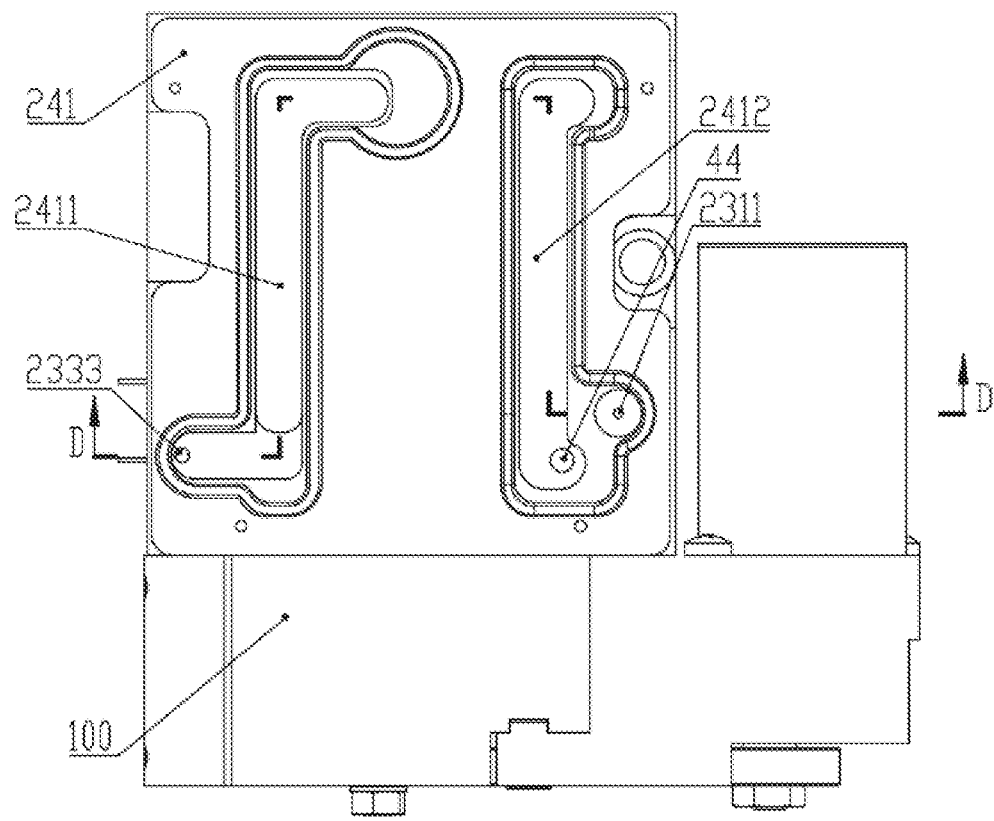
FIG. 21A is a front view of the micro intelligent gas distribution module.
Figure 21B:
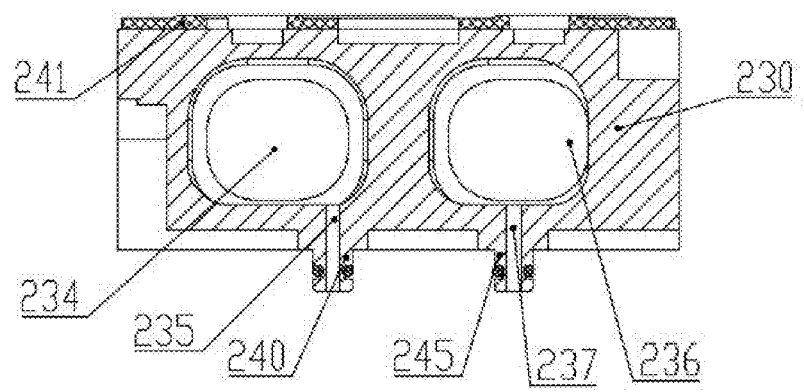
FIG. 21B is a partial sectional view along line C-C in FIG. 14.
Figure 22:
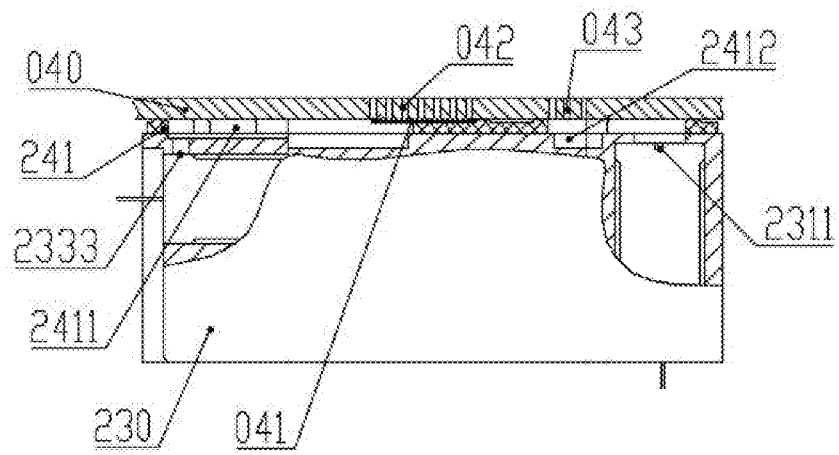
FIG. 22 is a partial sectional view along line D-D in FIG. 21A.
Figure 23:
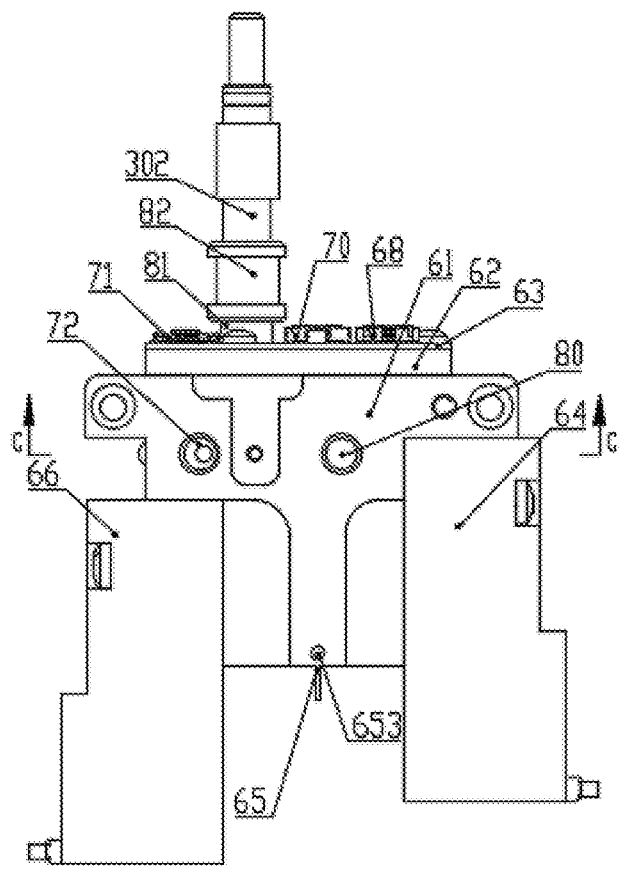
FIG. 23 is a front view of the structure of the micro intelligent pressure control module.
Figure 24:
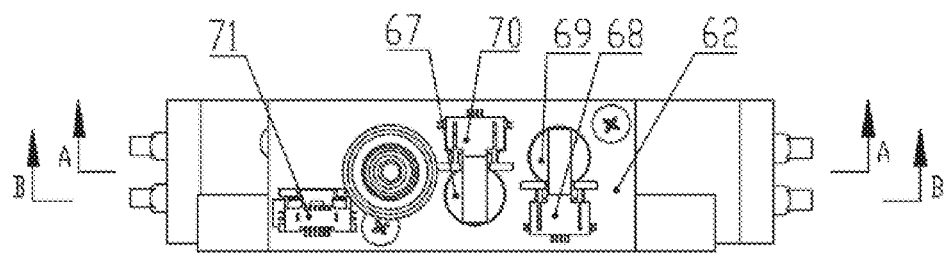
FIG. 24 is a top view of the structure of the micro intelligent pressure control module.
Figure 25:
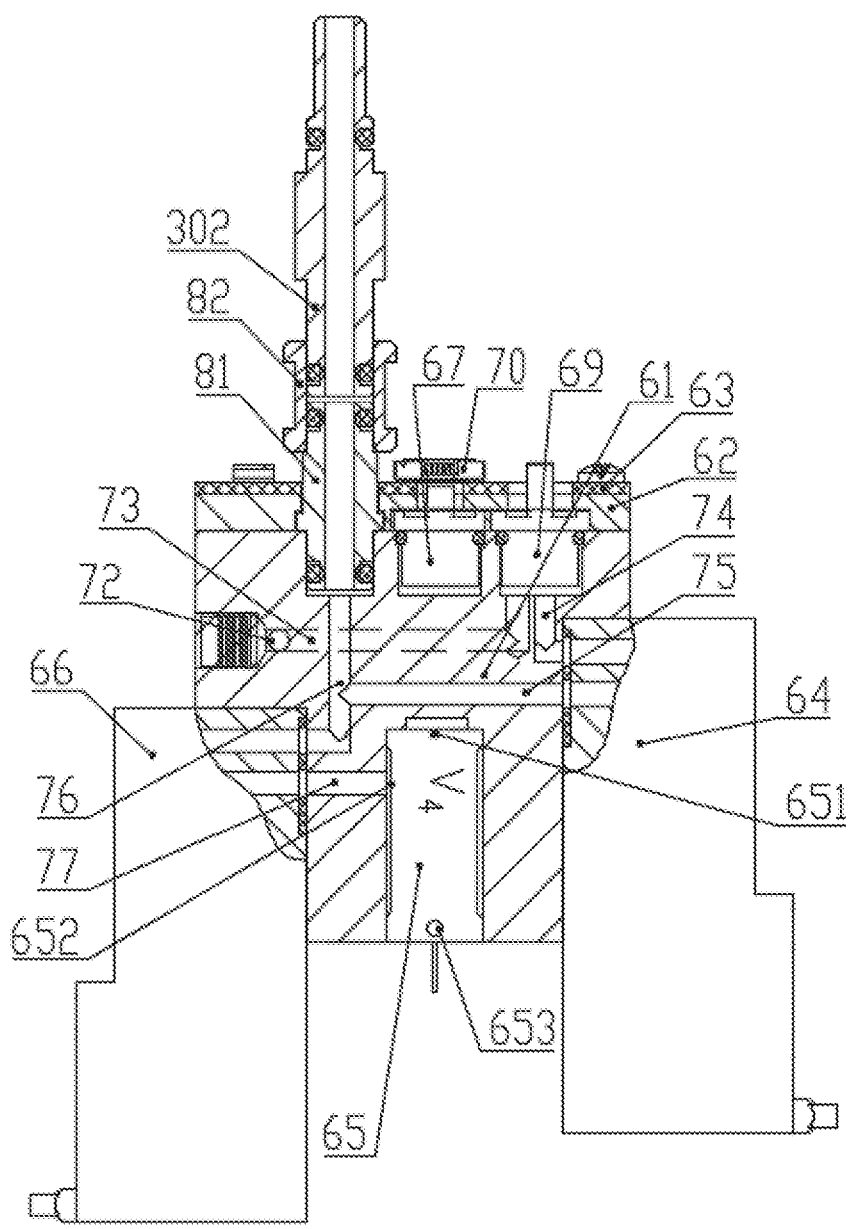
FIG. 25 is a sectional view along line B-B in FIG. 24.
Figure 26:
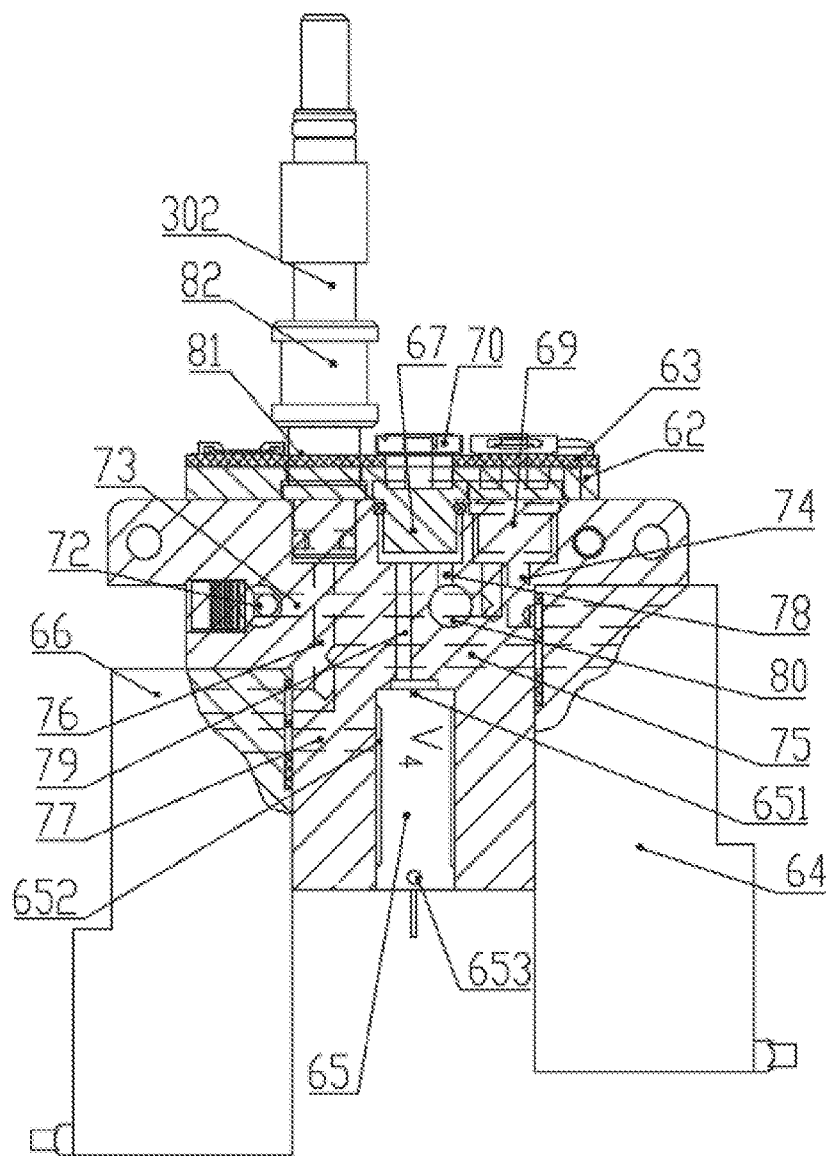
FIG. 26 is a sectional view along line A-A in FIG. 24.
Figure 27:
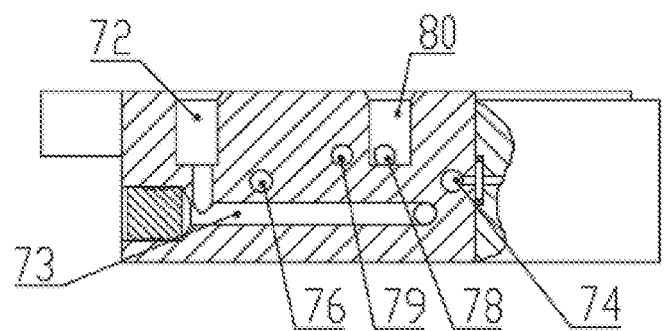
FIG. 27 is a sectional view along line C-C in FIG. 23.

Please see FIGS. 21 and 22, which show the composition of the sealing cushion 241 at the side of the gas distribution module 200 in FIG. 14 toward the lower cover 040. The sealing cushion 241 is laid on the outer surface of the valve terminal 230 and faces the outer surface of the valve terminal 230 where the positive pressure connector 240 and the vacuum connector 245 are located (see FIG. 21B). Two profile through-holes are arranged in the sealing cushion 241, wherein the first irregular through-hole 2411 is at a position opposite to the positive pressure gas chamber 234, the first irregular through-hole 2411 communicates with the primary gas suction pipeline 114 via the third vent hole 2333 of valve V3, the second irregular through-hole 2412 is at a position opposite to the vacuum gas chamber 236, and communicates with the secondary gas discharge pipeline 122 via the first vent hole 2311 of valve V1.

The back flat surface of the lower cover 040 (see the flat surface shown in FIG. 3, which is defined in the direction of use of the calibrator), a group of gas suction holes 042 and a group of gas discharge holes 043, which consist of a plurality of vent holes respectively, are arranged in the back flat surface, the group of gas suction holes 042 correspond to the position of the first irregular through-hole 2411 and communicate with the first irregular through-hole 2411, the group of gas discharge holes 043 correspond to the position of the second irregular through-hole 2412 and communicate with the second irregular through-hole 2412, a filter 041 (see FIG. 2) is provided in the first irregular through-hole 2411 and cover the group of gas suction holes 042 from the interior, the back flat surface of the lower cover 040 and the outer surface of the valve terminal 280 clamp the sealing cushion 241 and the filter 041 in the sealing cushion 241 from two sides, and form a flat surface seal for the gas source terminal block 280 by means of the sealing cushion 241.

In the basic working process introduced above, in the gas distribution module assembled as above, when the valve V3 is in a power-off state, the third vent hole 2333 of valve V3 is opened, the ambient air enters into the first irregular through-hole 2411 via the group of gas suction holes 042, filtered by the filter 041, and then enters into the primary cylinder body 1081 (a low-pressure cylinder) of the micro gas pump 100 via the third vent hole 2333 of valve V3 through the primary gas suction pipeline 114; thus, the gas that enters into the low-pressure cylinder from the environment is filtered into clean gas. When the valve V1 is energized, the first vent hole 2311 of valve V1 is opened, the pressurized gas in the secondary cylinder body 106 (a high-pressure cylinder) of the micro gas pump 100 enters into the second irregular through-hole 2412 through the secondary gas discharge pipeline 122 via the first vent hole 2311 of valve V1, and is discharged through the group of gas discharge holes 043 in the lower cover 040, and doesn't affect the startup of the micro gas pump 100 without pressure.

The improved micro intelligent gas distribution module 200 has the following additional beneficial effects:

Firstly, the lower cover 040 and the valve terminal 230 clamp the sealing cushion 241 from two side and form a flat surface seal; thus, the gas intake passage and the gas discharge passage are short, the gas resistance is low, the efficiency of the gas pump is high, and the heat generated by the gas pump can be carried away by the sucked gas and discharged gas easily.

Secondly, the sealing cushion 241, the outer surface of the valve terminal 230, and the inner surface of the lower cover 040 jointly form a gas suction passage and a gas discharge passage and connect the gas circuit system with the external environment, the gas pump extracts filtered gas from the external environment of the system, and discharges all waste gas out of the system; the sealing is implemented centrally, and the gas source device can be waterproof and dust-proof.

Thirdly, the sealing cushion 241 mounted in a compressed state provides support for the gas source device, and can prevent the vibration of the micro gas pump from transferred to the exterior of the main body directly and attains a cushioning effect at the same time. Fourthly, a separating and filtering device is used at the gas intake side, to ensure dust and other solid particles can't intrude into the gas circuit.

Micro Intelligent Pressure Control Module 300

In the present invention, the micro intelligent pressure control module 300 is configured to control and regulate the pressurized gas and vacuum gas from the micro intelligent gas distribution module 200, to obtain expected high-precision and stable pressure and vacuum gas.

The following reference numbers are used in this part:
61: control valve terminal; 62: press plate; 63: circuit board; 64: gas intake control solenoid valve;
65: fourth solenoid valve; 651: first vent hole of fourth solenoid valve; 652: second vent hole of fourth solenoid valve; 653: third vent hole of fourth solenoid valve;
66: gas discharge control solenoid valve; 67: vacuum sensor; 68: first socket; 69: pressure sensor; 70: second socket; 71: third socket; 72: pressurized gas interface;
73: first pressure pipeline; 74: second pressure pipeline; 75: third pressure pipeline; 76: fourth pressure pipeline; 77: downstream gas discharge pipeline; 78: first vacuum pipeline; 79: second vacuum pipeline;
80: vacuum interface; 81: first connector; 82: union joint; 302: control module pressure connector.

I. Structure of Micro Intelligent Pressure Control Module 300

FIGS. 23-27 illustrate the structure of the micro intelligent pressure control module 300. The pressure control module employs a compact structure, and integrates a pressure sensor 69, a vacuum sensor 67, a circuit board 63, a gas intake control solenoid valve 64, a gas discharge control solenoid valve 66, a fourth solenoid valve 65, a pressurized gas interface 72, a vacuum interface 80, and a gas passage connector formed by a first connector 81, a union joint 82, and a control module pressure connector 302 connected sequentially on a control valve terminal 61, a plurality of pipelines formed by pipeline holes are arranged inside the control valve terminal 61, the pipelines are used as gas circuit connecting passages among the components, and the above-mentioned components are fitted with the pipelines to form a pressurized gas passage and a vacuum gas passage; the pressure sensor 69, the vacuum sensor 67, and the circuit board 63 are electrically connected to an interface circuit board 600 to control the gas intake control solenoid valve 64 and the gas discharge control solenoid valve 66, the fourth solenoid valve 65 regulates the quantity of the inputted pressurized gas and vacuum gas to obtain a pressure value or vacuum value that is equal to a set value, and thereby realizes intelligent control of the level of pressure/degree of vacuum. Wherein:

the gas intake control solenoid valve 64 and the gas discharge control solenoid valve 66 are fixed to two sides of the control valve terminal 61 by screws respectively, the circuit board 63 is fixed to the top side of the control valve terminal 61 by screws, the fourth solenoid valve 65 is mounted inside the control valve terminal 61 between the gas intake control solenoid valve 64 and the gas discharge control solenoid valve 66; it should be understood that the above-mentioned fixing is not limited to fixing with screws. The fixing may be implemented in other ways, such as welding, etc. The circuit board 63 is provided with three sockets, i.e., a first socket 68, a second socket 70, and a third socket 71, the pressure sensor 69 is electrically connected to the circuit board 63 via the first socket 68, the vacuum sensor 67 is electrically connected to the circuit board 63 via the second socket 70 (see FIG. 24), and the circuit board 63 is electrically connected to an interface circuit board socket 703 (see FIG. 3) via the third socket 71 (see FIG. 23); the gas intake control solenoid valve 64, the gas discharge control solenoid valve 66, and the fourth solenoid valve 65 are electrically connected to the interface circuit board socket 703 through connecting wires, and the interface circuit board socket 703 is electrically connected to an interface circuit board 600. The interface circuit board 600 is configured to acquire the data measured by the pressure sensor 69 and the vacuum sensor 67 and control the open/close of the gas intake control solenoid valve 64, the gas discharge control solenoid valve 66, and the fourth solenoid valve 65.

The pipelines inside the control valve terminal 61 comprise a first pressure pipeline 73, a second pressure pipeline 74, a third pressure pipeline 75, a fourth pressure pipeline 76, a downstream gas discharge pipeline 77, a first vacuum pipeline 78, and a second vacuum pipeline 79; the above pipelines are fitted with the solenoid valves to form a pressurized gas passage and a vacuum gas passage.

The gas intake control solenoid valve 64 and the gas discharge control solenoid valve 66 are micro high-precision gas flow control valves, and control the flow rate of inputted/outputted pressurized gas, and both of them have a first port and a second port respectively; the fourth solenoid valve 65 is a two-position three-way solenoid valve, and has a first vent hole 651 of fourth solenoid valve, a second vent hole 652 of fourth solenoid valve, and a third vent hole 653 of fourth solenoid valve.

As shown in FIGS. 23-27, pressurized gas is inputted from a pressurized gas interface 72. Hereunder the interconnection system of the components in the pressurized gas passage will be detailed, starting from the pressurized gas interface 72.

The pressurized gas interface 72 is fixed to one side of the control valve terminal 61, one end of the pressurized gas interface 72 is located on the surface of the control valve terminal 61 and is connected in a plug-in mounted manner with an external pressure gas source; the other end of the pressurized gas interface 72 is located inside the control valve terminal 61 and communicates with the first pressure pipeline 73; the pressure sensor 69 has a first port and a second port, wherein the first port communicates with the first pressure pipeline 73, the second port communicates with the second pressure pipeline 74, and the pressure sensor 69 can sense the pressure value of the pressurized gas flowing through it; the gas intake control solenoid valve 64 has a first port and a second port, wherein the first port communicates with the second pressure pipeline 74, and the second port communicates with the third pressure pipeline 75; the third pressure pipeline 75 communicates with the fourth pressure pipeline 76; the fourth pressure pipeline 76 further communicates with a second port of the gas discharge control solenoid valve 66 and the first connector 81 respectively.

The first connector 81 is a hollow tubular structure and is connected with one end of the union joint 82, the other end of the union joint 82 is connected with the control module pressure connector 302 in a plug-in mounted manner, and a seal ring is provided inside the port of the first connector 81 and the port of the control module pressure connector 302 to realize sealing of the gas circuit.

In actual application, the control module pressure connector 302 may be connected in a plug-in mounted way with the gas pressure input interface 415 of the micro intelligent pressure interface module 400, and the pressure interface module is usually connected with a standard pressure module 500, or may be connected with the pressure instrument to be calibrated alternatively; the pressurized gas or vacuum gas is conveyed to the standard pressure module 500 and the pressure instrument to be calibrated via the control module pressure connector 302. The control module pressure connector 302 is connected with the union joint 82 in a plug-in mounted way, so that the union joint 82 may realize quick separation or engagement between the first connector 81 and the control module pressure connector 302 conveniently by sliding, in order to connect or disconnect the gas circuit.

As shown in FIGS. 23-27, a vacuum gas source is connected from the vacuum interface 80. Hereunder the interconnection system of the components in the vacuum gas passage will be detailed, starting from the vacuum interface 80.

The vacuum interface 80 is fixed to the other side of the control valve terminal 61, one end of the vacuum interface 80 is located on the surface of the control valve terminal 61 and is connected in a plug-in mounted manner with an external vacuum gas source; the other end of the vacuum interface 80 is located inside the control valve terminal 61 and communicates with the first vacuum pipeline 78; the vacuum sensor 67 is arranged with a first port and a second port, the first port communicates with the first vacuum pipeline 78, and the second port communicates with the first vent hole 651 of the fourth solenoid valve 65, the vacuum sensor 67 can sense the vacuum value of the vacuum gas flowing through it; the second vent hole 652 of the fourth solenoid valve 65 communicates with the downstream gas discharge pipeline 77, and the third vent hole 653 of the fourth solenoid valve communicates with the atmosphere; the downstream gas discharge pipeline 77 is connected with the first port of the gas discharge control solenoid valve 66, the second port of the gas discharge control solenoid valve 66 communicates with the fourth pressure pipeline 76, and the fourth pressure pipeline 76 is connected with the first connector 81.

In summary, both the pressurized gas passage and the vacuum gas passage are connected to the first connector 81 via the components and the pipelines, and supply pressurized gas or vacuum gas to the micro intelligent pressure interface module 400 via the union joint 82 and the control module pressure connector 302, wherein the control module pressure connector 302 communicates with the gas pressure input interface 415 of the micro intelligent pressure interface module 400.

The above-mentioned components are assembled according to the above-mentioned connection relationship into the micro intelligent pressure control module 300, which realizes accurate pressure control and gas supply by means of leak-tight fitting among the vacuum sensor 67, the pressure sensor 69, the gas intake control solenoid valve 64, the gas discharge control solenoid valve 66, and the fourth solenoid valve 65 and the control circuit. The working principle of the micro intelligent pressure control module 300 is as follows:

When pressurized gas is to be supplied, the pressurized gas that comes from the positive pressure connector 240 of the micro intelligent gas distribution module 200 flows in via the pressurized gas interface 72, and then flows through the first pressure pipeline 73, the pressure sensor 69, the gas intake control solenoid valve 64 (in open state), the fourth pressure pipeline 76, the first connector 81, and the control module pressure connector 302 sequentially into the gas pressure input interface 415 of the micro intelligent pressure interface module 400; for example, the pressurized gas is provided to the pressure instrument to be calibrated and the standard pressure module 500 respectively through the micro intelligent pressure interface module 400 via the control module pressure connector 302. In that process, the gas discharge control solenoid valve 66 is closed to isolate the vacuum gas. The standard pressure module 500 measures the pressure value of the pressurized gas, and the interface circuit board 600 compares the measured pressure value with a preset pressure value; if the pressure value of the pressurized gas is lower than the preset pressure value, the gas intake control solenoid valve 64 is kept open, the gas discharge control solenoid valve 66 is closed, and the gas intake control solenoid valve 64 controls the input quantity of the pressurized gas; by supplying pressurized gas continuously, the pressure of the pressurized gas supplied to the pressure instrument to be calibrated is increased, till it reaches the preset pressure value; if the pressure value measured by the standard pressure module 500 is higher than the preset pressure value, the gas intake control solenoid valve 64 is closed and the gas discharge control solenoid valve 66 is opened; now, a part of the pressurized gas flowing toward the first connector 81 flows to the second vent hole 652 of the fourth solenoid valve 65 via the gas discharge control solenoid valve 66, the fourth solenoid valve 65 is kept in a power-off state at this point, the second vent hole 652 of the fourth solenoid valve 65 communicates with the third vent hole 653 of the fourth solenoid valve 65, and a part of the pressurized gas is exhausted to the environment via the third vent hole 653 of the fourth solenoid valve 65; when the pressure value measured by the standard pressure module 500 is equal to the preset pressure value, both the gas discharge control solenoid valve 66 and the gas intake control solenoid valve 64 are closed, and the pressurized gas at the preset pressure value is supplied to the pressure instrument to be calibrated.

When vacuum gas is to be supplied, the vacuum gas that comes from the vacuum connector 245 of the micro intelligent gas distribution module 200 flows through the vacuum interface 80, the first vacuum pipeline 78, the second vacuum pipeline 79, the fourth solenoid valve 65, the gas discharge control solenoid valve 66 (in open state), the fourth pressure pipeline 76, the first connector 81, and the control module pressure connector 302; at the same time, vacuum pumping is carried out for the pressure instrument to be calibrated and the standard pressure module 500 that are connected to the control module pressure connector 302. In that process, the fourth solenoid valve 65 is in a power-on state, the first vent hole 651 of fourth solenoid valve communicates with the second vent hole 652 of fourth solenoid valve, the second vent hole 652 of fourth solenoid valve is blocked from the third vent hole 653 of the fourth solenoid valve, and the gas intake control solenoid valve 64 is closed to isolate the pressurized gas at the same time. The standard pressure module 500 measures the vacuum degree of the vacuum gas, and the interface circuit board 600 compares the vacuum degree with preset vacuum degree; if the vacuum degree is not low enough, the gas discharge control solenoid valve 66 is kept open and the gas intake control solenoid valve 64 is closed, and vacuum pumping is continued, till the vacuum degree reaches the preset vacuum degree; if the vacuum degree is too low, the gas discharge control solenoid valve 66 is closed and the gas intake control solenoid valve 64 is opened, at this point, the pressurized gas supplied by the gas intake control solenoid valve 64 is supplied through the third pressure pipeline 75 to the first connector 81, till the vacuum degree is equal to the preset vacuum degree; then both the gas discharge control solenoid valve 66 and the gas intake control solenoid valve 64 are closed, and thereby stable vacuum gas is supplied to the pressure instrument to be calibrated.

II. Assembling of Micro Intelligent Pressure Control Module 300

As shown in FIGS. 2 and 3, after the vacuum interface 80 and pressurized gas interface 72 of the micro intelligent pressure control module 300 are aligned and plug-in mounted to the vacuum connector 245 and positive pressure connector 240 of the micro intelligent gas distribution module 200 in a sealed form respectively, the micro intelligent pressure control module 300 is mounted between the lower housing 030 and the lower cover 040 and located at the side of the lower housing 030, and the back side of the lower housing 030 (i.e., the bottom side in the direction shown in FIGS. 2 and 3) has a groove for mounting the micro intelligent pressure control module 300.

Here, an elastic gas guide cushion 303 is provided between the micro intelligent gas distribution module 200 and the micro intelligent pressure control module 300, the elastic gas guide cushion 303 is arranged with a gas guide channel, via which the third vent hole 653 of fourth solenoid valve on the micro intelligent pressure control module 300 communicates with a process hole 44 (for centralized gas discharging of the micro intelligent pressure control module 300) in the micro intelligent gas distribution module 200. Besides, the elastic gas guide cushion 303 has a cushioning effect and can reduce and isolate the vibration of the micro gas pump 100 on the micro intelligent gas distribution module 200.

Micro Intelligent Pressure Interface Module 400

In the present invention, the micro intelligent pressure interface module 400 is configured to connect the pressure instrument to be calibrated and the standard pressure module 500 and realize filtering of the flow returned from the tested pressure instrument, gas-liquid separation, and blowdown.

The control module pressure connector 302 on the micro intelligent pressure control module 300 is plug-in mounted to the input side of the micro intelligent pressure interface module 400 via corresponding holes and grooves, to supply gas at regulated pressure to the micro intelligent pressure interface module 400.

The following reference numbers are used in this part:
400: micro intelligent pressure interface module;
401: micro intelligent pressure interface module connecting circuit; 402: connector base; 403: pressure connector; 404: vent valve seat; 405: second circuit board; 406: standard pressure module mounting base; 407: gas-liquid separation chamber; 408: reference pressure cavity; 409: first solenoid valve; 410: second solenoid valve; 411: socket; 412: communication plug; 413: filth filter; 414: reference pressure connector; 415: gas pressure input interface; 416: module pressure interface; 417: module reference pressure interface; 418: end cap; 419: third gas flow pipeline; 420: fourth gas flow pipeline; 421: first gas flow pipeline; 422: second gas flow pipeline; 423: first vent hole of first solenoid valve; 424: second vent hole of first solenoid valve; 425: first vent hole of second solenoid valve; 426: second vent hole of second solenoid valve; 427: mounting hole.

I. Structure of Micro Intelligent Pressure Interface Module 400

Figure 28:
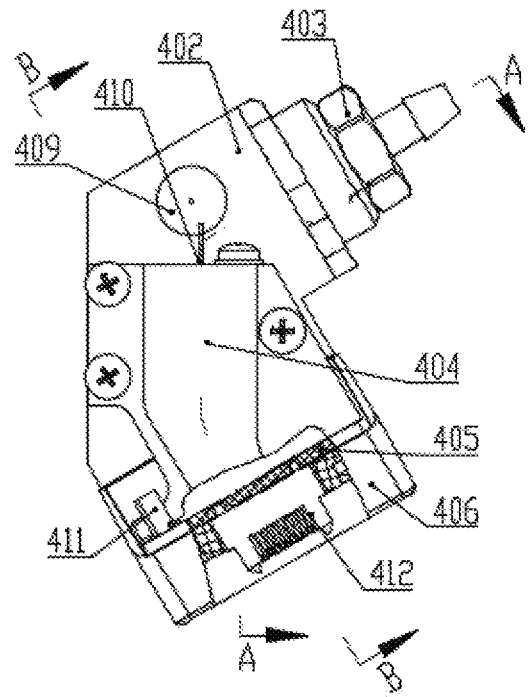
FIG. 28 is a front view of the micro intelligent pressure interface module.
Figure 29:
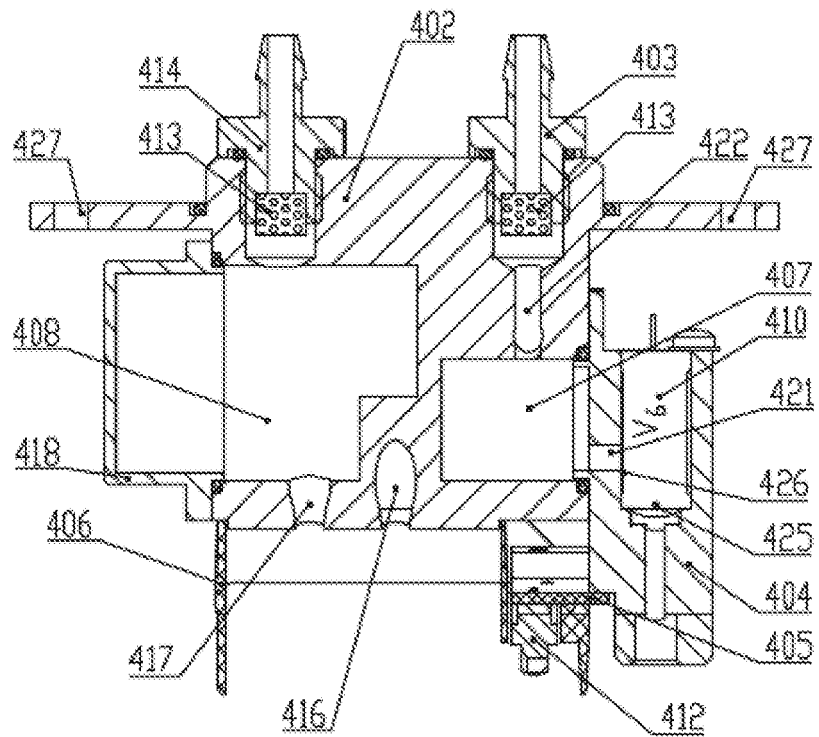
FIG. 29 is a sectional view along line A-A in FIG. 28.
Figure 30:
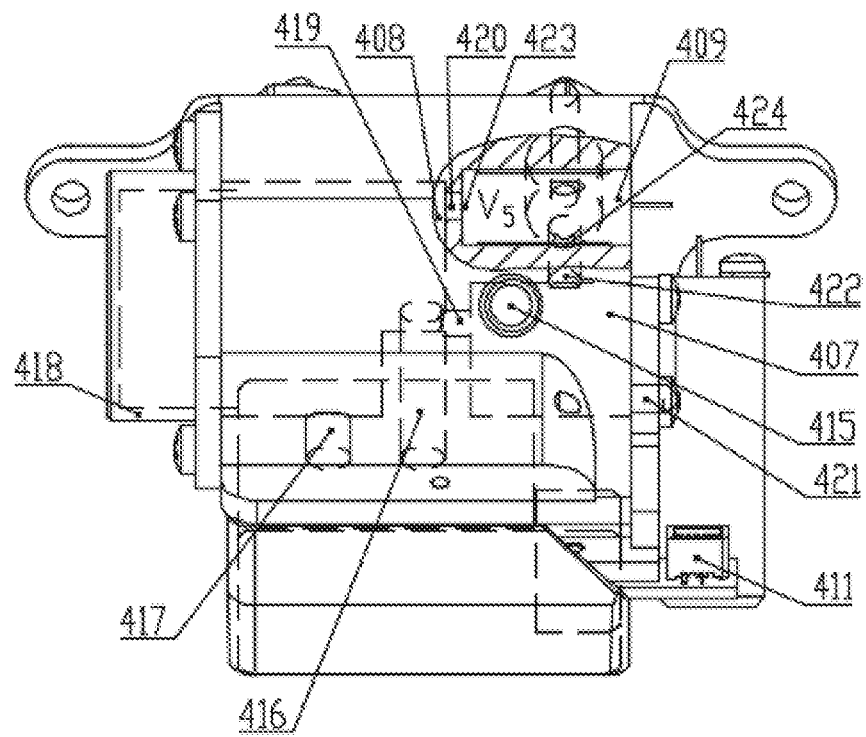
FIG. 30 is a left view of the micro intelligent pressure interface module.

FIGS. 28-30 illustrate the structure of the micro intelligent pressure interface module 400. As shown in FIG. 28, the micro intelligent pressure interface module 400 comprises a connector base 402 and a standard pressure module mounting base 406 that support and connect the entire pressure interface module, wherein the connector base 402 comprises two columnar body structures that extend in two different directions at a certain angle, i.e., a first columnar body structure and a second columnar body structure; the connector base 402 has three connecting surfaces, and a gas pressure input connecting surface is arranged at the junction between the two columnar body structures; the end of the first columnar body structure has a connector connecting surface configured to receive a pressure connector for connecting the pressure instrument; the end of the second columnar body structure has a standard pressure module connecting surface configured to connect the standard pressure module 500 and the standard pressure module mounting base 406; the standard pressure module mounting base 406 is a columnar body structure with a through-hole, and is configured to connect the standard pressure module 500; the through-hole of the standard pressure module mounting base 406 is a L-shaped stepped hole, a deeper side of the L-shaped stepped hole is connected with a standard pressure module mounting base connecting surface of the connector base 402, the step at the shallower side of the L-shaped stepped hole has a through-slot for assembling a communication plug 412.

As shown in FIGS. 29 and 30, a pressure connector 403 and a reference pressure connector 414 are provided on a connector connecting surface of the connector base 402 and are configured to connect a pressure side and a reference pressure side of the pressure instrument to be calibrated respectively; a gas-liquid separation chamber 407, a reference pressure cavity 408, a first solenoid valve 409, and a plurality of gas flow pipelines are arranged in the connector base 402, wherein the reference pressure cavity 408 is at the side of the connector base 402 where the reference pressure connector 414 is located, and communicates with the reference pressure connector 414 to present severe fluctuation of reference pressure, the outer side of the reference pressure cavity 408 is covered and sealed by an end cap 418, and a seal ring is provided at the joint between the reference pressure cavity 408 and the end cap 418; the gas-liquid separation chamber 407 is at the other side of the connector base 402 where the pressure connector 403 is located, and is configured to buffer gas and perform gas-liquid separation, the outer side of the gas-liquid separation chamber 407 is sealed by a vent valve seat 404; a second solenoid valve 410 is arranged in the vent valve seat 404, a second vent hole 426 of the second solenoid valve 410 communicates with the gas-liquid separation chamber 407 through a first gas flow pipeline 421, a first vent hole 425 of second solenoid valve communicates with the atmosphere, and gas exhaust and blowdown of the gas-liquid separation chamber 407 is realized by controlling the open/close of the second solenoid valve 410; the first solenoid valve 409 is disposed between the pressure connector 403 and the gas-liquid separation chamber 407, the pressure connector 403 communicates with the gas-liquid separation chamber 407 through a second gas flow pipeline 422 and the first solenoid valve 424, and the gas-liquid separation chamber 407 communicates with the reference pressure cavity 408 through the first solenoid valve 409 and a fourth gas flow pipeline 420; a gas pressure input interface 415 (for connecting the control module pressure connector 302 of the micro intelligent pressure control module 300) is provided on a gas pressure input connecting surface of the connector base 402, the gas pressure input interface 415 is configured to receive gas pressure input, and directly communicates with the gas-liquid separation chamber 407 to supply gas to the gas-liquid separation chamber 407.

As shown in FIG. 29, a protrusion extends from the connector base 402 at the side of the pressure connector 403 and the side of the reference pressure connector 414 respectively, the two protrusions have a mounting hole 427 respectively, and screws can be inserted into the mounting holes to fix the pressure interface module integrally to the housing of the fully-automated handheld pressure calibrator in the present invention. A filth filter 413 is provided at an internal port of the pressure connector 403 and an internal port of the reference pressure connector 414 respectively to filter off contaminants or impurities carried by the flow returned from a tested pressure instrument that has been used in a complex environment, so as to protect the connectors and the pipelines in the calibrator. The standard pressure module connecting surface of the connector base 402 is configured to connect the standard pressure module 500 and the standard pressure module mounting base 406, a second circuit board 405 is mounted on the top of the through-slot of the L-shaped stepped hole of the standard pressure module mounting base 406, the communication plug 412 passes through the through-slot and is electrically connected to the second circuit board 405, the communication plug 412 is electrically connected to a socket 411 and integrates connecting wires for the solenoid valves of the micro intelligent pressure interface module 400, etc. to form a micro intelligent pressure interface module connecting circuit 401 (see FIG. 2), and is inserted into the interface module socket 606 of the interface circuit board 600 and is used as a communication signal transfer interface, the socket 411 is connected to the micro intelligent pressure interface module connecting circuit 401; a module pressure interface 416 and a module reference pressure interface 417 are provided on the standard pressure module connecting surface of the connector base 402 for plug-in mounting of the standard pressure module 500; the module reference pressure interface 417 directly communicates with the reference pressure cavity 408, and the module pressure interface 416 communicates with the gas-liquid separation chamber 407 via a third gas flow pipeline 419.

II. Assembling

Figure 8:
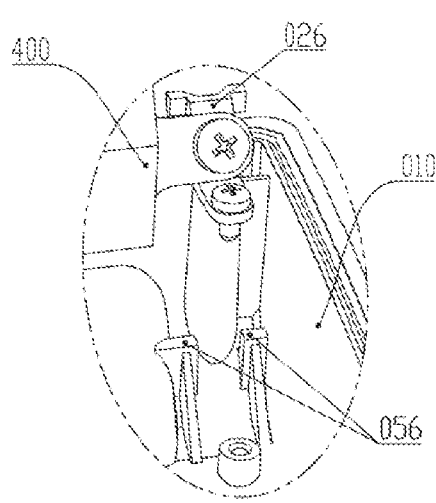
FIG. 8 is a schematic diagram of the hanger-type fixing base of the fully-automated handheld pressure calibrator in the present invention.
Figure 9:
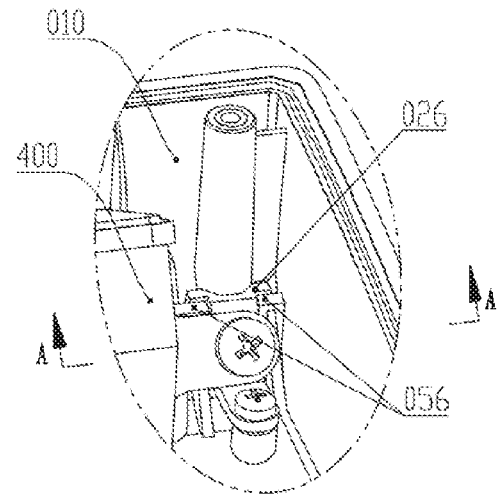
FIG. 9 is a structural installation diagram of the hanger-type fixing base of the fully-automated handheld pressure calibrator in the present invention.
Figure 10:
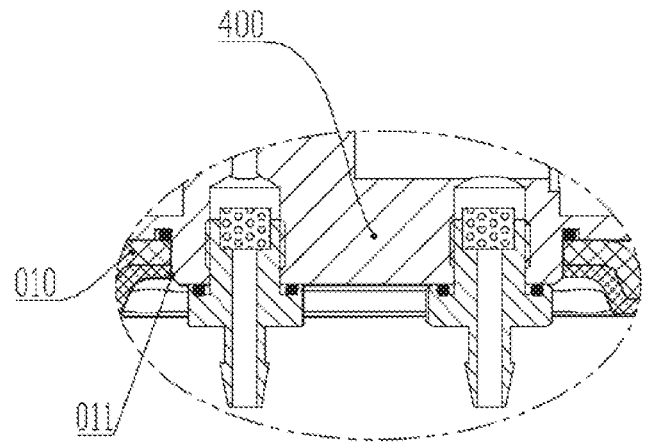
FIG. 10 is a sectional view A-A of the sealing between the micro intelligent pressure interface module and the upper housing of the fully-automated handheld pressure calibrator in FIG. 9 in the present invention.

Please see FIGS. 2 and 3 in conjunction with FIGS. 8, 9, and 10. The micro intelligent pressure interface module 400 is fixed to the top inclined end surface of the upper housing 010 via a hanger-type fixing base 026. The hanger-type fixing base 026 is hung to a reinforcing rib 056 of the inclined surface and then is fixed to the inner side of the upper housing 010, and the micro intelligent pressure interface module 400 is fixed to the hanger-type fixing base 026 via its mounting hole 427, and thereby is fixed inside the upper housing 010. After the micro intelligent pressure interface module 400 is fixed inside the upper housing 010 as described above, the gas pressure input interface 415 of the micro intelligent pressure interface module 400 is aligned and leak-tight connected with the control module pressure connector 302 of the micro intelligent pressure control module 300, the pressure connector 403 of the micro intelligent pressure interface module 400 and a reference pressure connector 414 are exposed out of the calibrator from the through-hole I 011 of the top inclined end surface of the upper housing 010; at the same time, the micro intelligent pressure interface module 400 is leak-tight fitted with the through-hole I 011 via seal rings for mounting boss side end faces of the pressure connector 403 and the reference pressure connector 414 on the connector base 402.

After all electrical components and the micro intelligent pressure interface module 400 are mounted in the upper housing 010, the lower housing 030 is fitted to the upper housing 010 below the upper housing 010. The flange 036 on the fitting surface of the lower housing 030 fitted to the upper housing 010 is mounted in the groove 018 of the upper housing, and the upper housing 010 is leak-tight fitted with the mounting surface of the lower housing 030; the standard pressure module mounting base 406 of the micro intelligent pressure interface module 400 is aligned to the beveled through-hole II 031 at the bottom front part of the lower housing 030. The standard pressure module 500 may be plug-in mounted and connected to the standard pressure module mounting base 406 of the micro intelligent pressure interface module 400 from the beveled through-hole II 031.

Standard Pressure Module 500

The standard pressure module 500 provides a high-precision standard pressure value as a pressure reference in the testing process. In the present invention, the standard pressure module 500 mounted on the pressure interface module may be replaced with a standard pressure module that has different accuracy, a different measurement range, and of a different type (absolute pressure, differential pressure, or gauge pressure), so as to calibrate a different pressure instrument.

The following reference numbers are used in this part:
500: standard pressure module;
501: base; 502: first circuit board; 503: base cover; 504: seal ring; 505: pressure interface; 506: non-removable screw; 507: pressure sensor; 508: communication socket; 509: sealing gasket; 510: waterproof and gas-permeable film; 511: vent hole; 512: press ring; 513: screw; 514: reference pressure interface.

I. Structure of Standard Pressure Module 500

Figure 33:
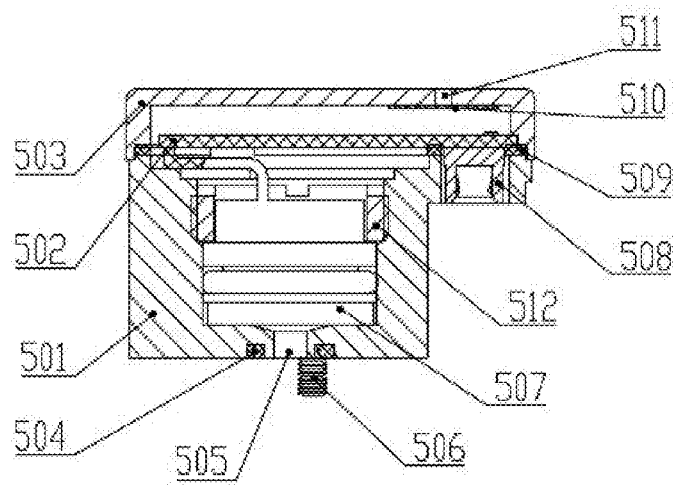
FIG. 33 is a sectional view of the structure of embodiment 1 of the standard pressure module.
Figure 34:
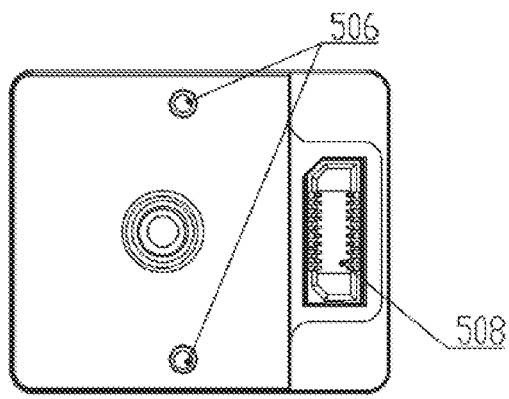
FIG. 34 is a bottom view of the embodiment 1 of the standard pressure module.

FIGS. 33-36 illustrate the structures of two common pressure modules (absolute pressure module/gauge pressure module and differential pressure module) for the standard pressure module 500. As shown in FIGS. 33 and 34, the absolute pressure module/gauge pressure module comprises a base 501, a circuit board 502, a pressure sensor 507, a base cover 503, and a communication socket 508, wherein, the base 501 is a L-shaped structure, a mounting slot for mounting a sensor is arranged on a thicker side of the base 501, the pressure sensor 507 is mounted in the mounting slot from top to bottom and is pressed by a press ring 512; a first through-hole for mounting a pressure interface 505 is arranged in the bottom of the mounting slot, and a seal ring 504 is arranged on the circumference of the pressure interface.

The first circuit board 502 is mounted on the top side of the base 501, a thinner side of the L-shaped base 501 has a cut-out, and the communication socket 508 is inserted through the cut-out and mounted on the circuit board 502; the signal transmission wires of the pressure sensor 507 are connected to the first circuit board 502, the first circuit board 502 analyzes, debugs, and amplifies the output signals from the pressure sensor 507, and then converts the output signals into high-precision digital signals, and transmits the high-precision digital signals via the communication socket 508 to a display instrument electrically connected with the communication socket 508 to directly display digital pressure signals.

The pressure interface 505 is arranged on the micro high-precision pressure module in the same direction as the communication socket 508, the communication socket 508 comprises a guide structure (see FIG. 33), which forms a guide connection with an external interface to prevent malfunction of the electrical circuit incurred by incorrect insertion. Two non-removable screws 506 are provided on the bottom surface of the thicker side of the base 501 symmetrically, for the convenience of fastening and connecting the pressure module integrally to the tested apparatus or pressure instrument. The seal ring 504 at the connector of the pressure interface 505 seals the pipeline that connects the surface of the apparatus or pressure instrument with the pressure interface 505.

The base cover 503 is an inverted U-shaped structure, the shape and side of the bottom parts of the side walls of the base cover 503 match the shape and size of the top parts of the side walls of the base, the base cover 503 presses a sealing gasket 509 to cover the side walls of the base 501, and the base cover 503 is at certain distance from the first circuit board 502, so that a sealed structure is formed between the base 501, the communication socket 508, and the base cover 503; the base cover 503 has a vent hole 511, a waterproof and gas-permeable film 510 is provided on the inner side of the base cover 503 at the vent hole 511, and is gas-permeable, waterproof, and dustproof. With the structure described above, a cavity formed by the base cover 503 and the base 501 is at IP67 waterproof and dustproof rating, to protect the pressure sensor 507 and the circuit board 502 and maintain ventilation at the same time, ensure the reference pressure for the pressure sensor 507 is the atmospheric pressure, and thereby ensure the accuracy of pressure measurement.

Figure 35:
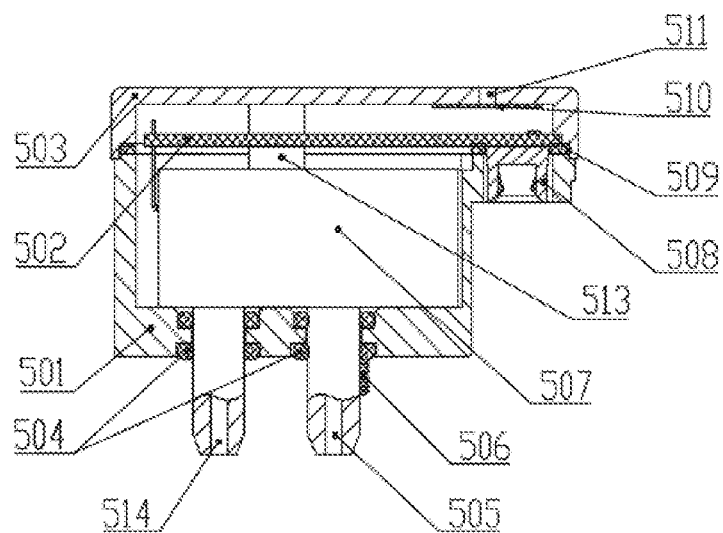
FIG. 35 is a sectional view of the structure of embodiment 2 of the standard pressure module.
Figure 36:
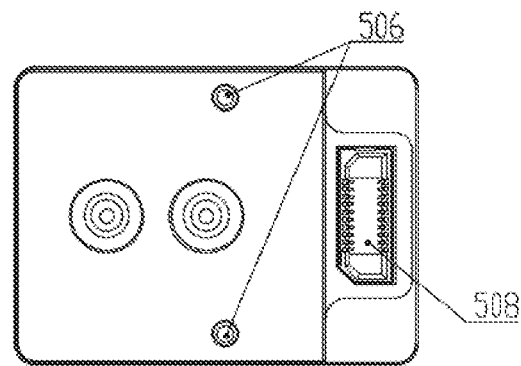
FIG. 36 is a bottom view of the embodiment 2 of the standard pressure module.

As shown in FIGS. 35 and 36, the differential pressure module is essentially the same as the absolute pressure module/gauge pressure module in structure, except that the pressure sensor of the differential pressure module is mounted in a mounting slot of the base 501, and the top end of the pressure sensor is pressed by the base cover 503 via a screw 513; the bottom of the mounting slot of the base 501 has a first through-hole and a second through-hole, which are used to mount the pressure interface 505 and the reference pressure interface 514 respectively, a seal ring 504 is provided on the circumference of the pressure interface 505 and the reference pressure interface 514 respectively.

The differential pressure module may be used to measure the difference between the pressure at the pressure interface 505 and the pressure at the reference pressure interface 514.

After the pressure interface module 400 is assembled with the standard pressure module 500, the obtained assembly can be directly mounted in the fully-automated handheld pressure calibrator in the present invention for use; the pressure connector 403, the reference pressure connector 414, and the standard pressure module mounting base 406 are exposed out of the fully-automated handheld pressure calibrator, for the convenient of connecting a pressure instrument to be calibrated and mounting, repairing, or replacing the standard pressure module 500. The pressure interface module 400 is mounted from the interior of the fully-automated handheld pressure calibrator; specifically, the standard pressure module mounting base 406 of the micro intelligent pressure interface module 400 is aligned to the beveled through-hole II 031 (see FIG. 3) at the top end of the lower housing 030 and mounted into the lower housing 030, then is fixed to the lower housing 030 of the fully-automated handheld pressure calibrator by screws inserted into the mounting holes 427 of the connector base 402; next, the standard pressure module 500 is led through the beveled through-hole II 031 from the standard pressure module mounting base 406 from top to bottom and plug-in mounted to the pressure interface module 400. The type of the standard pressure module 500 to be plug-in mounted may be determined according to the type of the pressure instrument to be calibrated. For example, an absolute pressure module should be mounted if an absolute pressure instrument is to be calibrated; a gauge pressure module should be mounted if a gauge pressure instrument is to be calibrated; a differential pressure module should be mounted if a differential pressure instrument is to be calibrated.

Figure 31:
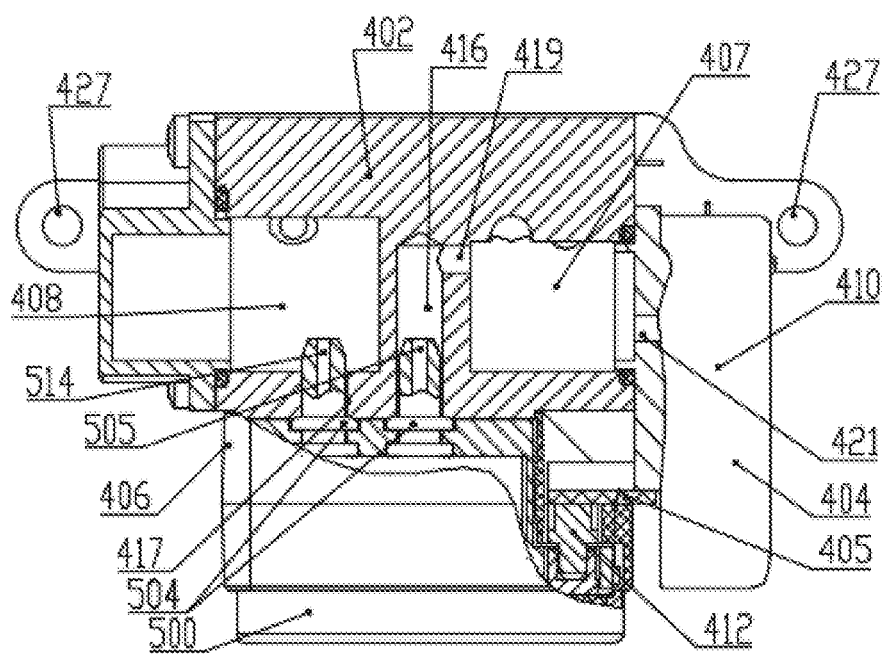
FIG. 31 is a partial sectional view along line B-B in FIG. 28 (mounted with the standard pressure module in embodiment 2)

As shown in FIG. 31, after the differential pressure module is plug-in mounted, the pressure interface 505 of the differential pressure module is plug-in mounted into the module pressure interface 416 of the connector base 402, the reference pressure interface 514 is plug-in mounted into the module reference pressure interface 417, the seal rings 504 of the differential pressure module seal the interface connections; at the same time, the communication plug 412 on the connector base 402 is plug-in mounted into the communication socket 508 of the differential pressure module, the first circuit board 502 of the differential pressure module is electrically connected to the second circuit board 405 on the connector base 402, the differential pressure module is fixed to the connector base 402 by means of the non-removable screws 506 of the differential pressure module; thus, the differential pressure module is connected with the gas circuit and electrical circuit of the interface module. Then, the reference pressure side of the differential pressure instrument to be calibrated is connected to the reference pressure connector 414, the pressure side of the differential pressure instrument to be calibrated is connected to the pressure connector 403, and regulated gas pressure is connected from the gas pressure input interface 415.

After the above-mentioned connection work is finished, the first circuit board 502 of the standard pressure module 500 (a differential pressure module) and the second circuit board 405 for the first solenoid valve 409 and the second solenoid valve 410 in the connector base 402 are connected to the interface circuit board 600, and the interface circuit board 600 is electrically connected to the main control circuit board 700. Thus, the differential pressure instrument can be calibrated now. The working process of the pressure interface module 400 and the standard pressure module 500 is as follows:

When a differential pressure instrument is to be calibrated, the second solenoid valve 410 is controlled to open, i.e., the first vent hole 425 of second solenoid valve is blocked from the second vent hole 426 of second solenoid valve; the first solenoid valve 409 is controlled to open, i.e., the first vent hole 423 of first solenoid valve communicates with the second vent hole 424 of first solenoid valve; no pressure input is provided from the gas pressure input interface 415, because the reference pressure interface 514 communicates with the pressure interface 505 and the differential pressure is 0; thus, a zero differential pressure point is found; at this point, the pressure at the reference pressure side is equal to the pressure at the pressure side of the differential pressure instrument, and the zero point of the pressure instrument to be calibrated can be calibrated; the first solenoid valve 409 and the second solenoid valve 410 are controlled to close, and gas is inputted via the gas pressure input interface 415 to pressurize the gas-liquid separation chamber 407 and the pressure side of the pressure instrument to be calibrated; at certain pressure in the last stage of pressure release process, the second solenoid valve 410 is opened to discharge contaminants (e.g., liquid, etc.) along with the flow returned from the calibrated instrument out of the gas-liquid separation chamber 407, the pressure value of the calibrated pressure instrument is checked and adjusted according to the pressure value of the standard pressure module, so as to calibrate the pressure instrument.

Figure 32:
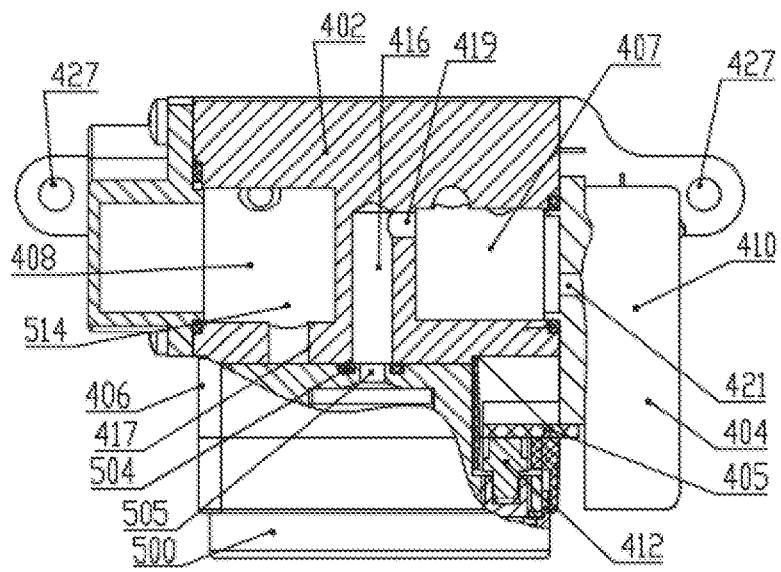
FIG. 32 is a partial sectional view along line B-B in FIG. 28 (mounted with the standard pressure module in embodiment 1)

As shown in FIG. 32, after an absolute pressure module (or a gauge pressure module; both absolute pressure module and gauge pressure module have only one pressure interface 505, here an absolute pressure module is used as an example in the description) is plug-in mounted, the pressure interface 505 of the absolute pressure module is plug-in mounted into the module pressure interface 416 of the connector base 402, the seal ring 504 of the absolute pressure module seals the interface connection; at the same time, the communication plug 412 on the connector base 402 is plug-in mounted into the communication socket 508 of the absolute pressure module, the first circuit board 502 of the absolute pressure module is electrically connected to the second circuit board 405 on the connector base 402, the absolute pressure module is fixed to the connector base 402 by means of the non-removable screws 506 of the absolute pressure module; thus, the absolute pressure module is connected with the gas circuit and electrical circuit of the pressure interface module. Then, the pressure side of the absolute pressure instrument to be calibrated is connected to the pressure connector 403, and pressurized gas is connected from the gas pressure input interface 415.

After the above-mentioned connection work is finished, the first circuit board 502 of the standard pressure module 500 (an absolute pressure module) and the second circuit board 405 for the first solenoid valve 409 and the second solenoid valve 410 in the connector base 402 are connected to the interface circuit board 600, and the interface circuit board 600 is electrically connected to the main control circuit board 700. Thus, the absolute pressure instrument can be calibrated now. The working principle is as follows:

the first solenoid valve 409 and the second solenoid valve 410 are controlled to close, i.e., the first vent hole 423 of first solenoid valve is blocked from the second vent hole 424 of first solenoid valve, and the first vent hole 425 of second solenoid valve is blocked from the second vent hole 426 of second solenoid valve, so that the gas-liquid separation chamber 407 is blocked from the reference pressure cavity 408; gas pressure is inputted to supply gas and pressurize the gas-liquid separation chamber 407; at certain pressure in the last stage of pressure release process, the second solenoid valve 410 is opened to discharge contaminants (e.g., liquid, etc.) along with the flow returned from the calibrated instrument out of the gas-liquid separation chamber 407, the absolute pressure module and the absolute pressure instrument are compared, and the supply gas pressure is adjusted according to the pressure value of the standard pressure module, to calibrate the absolute pressure instrument.

Interface Circuit Board 600 and Main Control Circuit Board 700

The interface circuit board 600 is a board that integrates the electrical circuits of gas circuit components and adapts the power supply and battery to the main control circuit board 700. Please see FIGS. 2 and 3. The interface circuit board 600 is a profile board, on which an interface circuit board plug 601 (for connecting the main control circuit board 700), a gas distribution module socket 602 (for connecting the micro intelligent gas distribution module connecting circuit 201), a control module socket 603 (for connecting the micro intelligent gas control module connecting circuit 301), a battery plug 604 (for connecting the rechargeable battery 900), and an interface module socket 606 (for connecting the micro intelligent pressure interface module connecting circuit 401 of the micro intelligent pressure interface module 400) are distributed. The interface circuit board 600 is located on the front bottom part (defined in the calibrator direction in FIG. 1) of the lower housing 030, the lower housing 030 has a plurality of holes and slots for circuit connection, the micro intelligent gas distribution module connecting circuit 201 and the micro intelligent gas control module connecting circuit 301 are connected to the gas distribution module socket 602 and the control module socket 603 on the interface circuit board 600 via corresponding holes and slots respectively.

Figure 12:
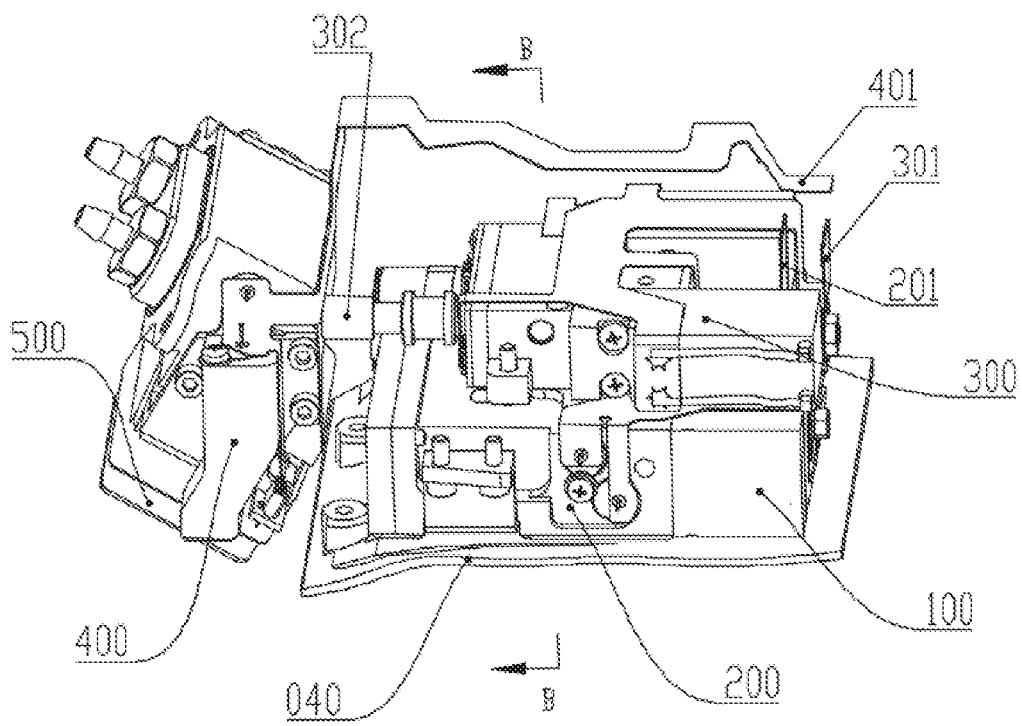
FIG. 12 is an isometric assembly diagram of the gas circuit system of the fully-automated handheld pressure calibrator in the present invention.

The gas circuit components (see FIGS. 11-13 for the composition of the gas circuit system) are connected to the interface circuit board 600; besides, the interface circuit board 600 is connected to the main control circuit board 700 via an interface circuit board plug 601, and the main control circuit board 700 performs intelligent control of the gas circuit via the interface circuit board 600. Wherein, the micro intelligent gas distribution module connecting circuit 201 of the micro intelligent gas distribution module 200 and the micro intelligent gas control module connecting circuit 301 of the micro intelligent gas control module 300 are connected to the gas distribution module socket 602 and the control module socket 603 on the interface circuit board 600 via holes and slots behind the bottom of a central groove of the lower housing 030; the micro intelligent pressure interface module connecting circuit 401 of the micro intelligent pressure interface module 400 is plug-in mounted to the interface module socket 606 and thereby connected to the interface circuit board 600.

The main control circuit board 700 is a board that integrates electrical circuits, and is integrally assembled at the inner side of the upper housing 010 (below the upper housing 010 in FIGS. 2 and 3). A supporting frame 050 is provided between the main control circuit board 700 and the interface circuit board 600, and is fixed together with the main control circuit board 700 and a touch display screen 800 to the inner side of the upper housing 010, and the interface circuit board 600 is fixed below the main control circuit board 700 via the supporting frame 050.

Figure 4:
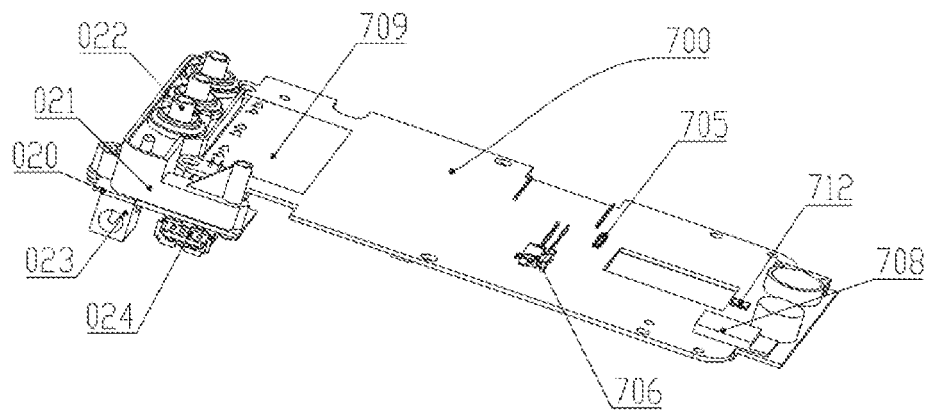
FIG. 4 is a front isometric view of the main control circuit board connected with external electrical measurement interface, DC interface and USB interface in the fully-automated handheld pressure calibrator in the present invention.
Figure 5:
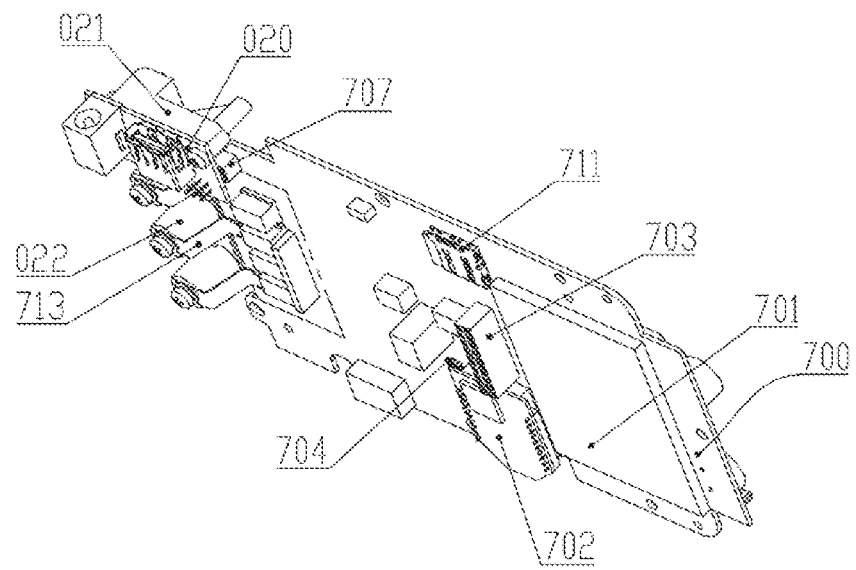
FIG. 5 is a bottom isometric view of the main control circuit board connected with external electrical measurement interface, DC interface and USB interface in the fully-automated handheld pressure calibrator in the present invention.
Figure 6:
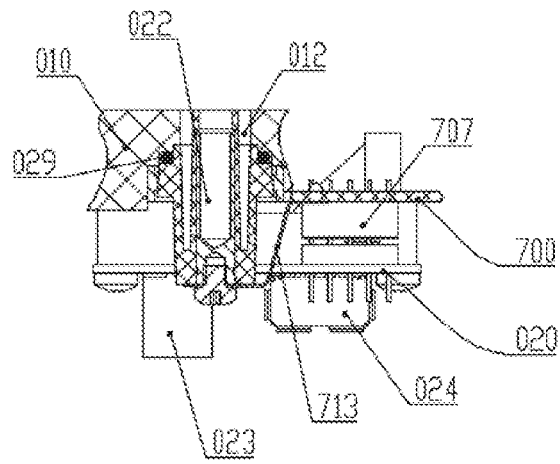
FIG. 6 is a structural installation diagram of the external electrical measurement interface in the fully-automated handheld pressure calibrator in the present invention.
Figure 7:
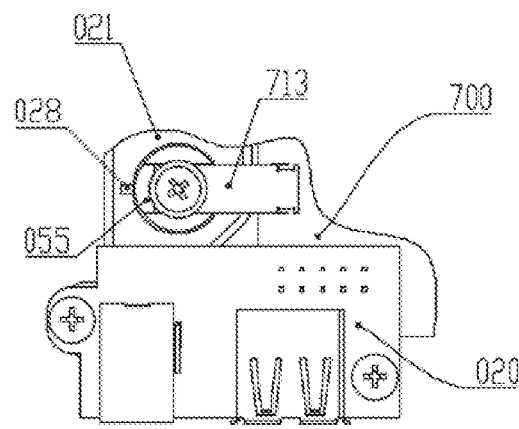
FIG. 7 is a bottom view of the structure in FIG. 6.

As shown in FIGS. 2-4, a display screen socket 705 and a touch screen socket 706 (for socket-jointing a display screen and a touch screen in the touch display screen 800), module interface sockets 704 (for connecting extended external module interfaces 025 for temperature and pressure, etc.), a socket 707 for connecting USB interface and DC interface, an interface circuit board socket 703 (for connecting the interface circuit board 600; the interface circuit board plug 601 is plug-in mounted and connected to the interface circuit board socket 703), a Bluetooth module 708, a WiFi module 702, a core circuit board 701 (a central control unit, loaded with commercial system control software and associated software for pressure calibration), a memory unit 711, and a microswitch 712 are distributed on the main control circuit board 700; the main control circuit board 700 further includes a measurement circuit 709 (for connecting an external electrical measurement interface), which is located in front of the control circuit board 700 (the top side of the calibrator in use is front side, i.e., the left side in FIGS. 2 and 3);

The measurement circuit 709 is designed to implement functions of measuring electrical signals and electrical signals related with pressure output at the same time for the calibrator, and it is used in conjunction with external electrical measurement interfaces. Please see FIGS. 2 and 3 in conjunction with FIGS. 4-7, the external electrical measurement interfaces are three cylindrical external electrical measurement interfaces 022 mounted on an electrical measurement interface press plate 021, and the external electrical measurement interfaces 022 are pressed into measurement jacks 012 on the front end surface of the upper housing 010 by the electrical measurement interface press plate 021; the outer cylindrical surface of the external electrical measurement interface 022 has a step surface and a retaining rib 028, with a seal ring 029 arranged in front of the step surface (see FIGS. 6 and 7) to seal the external electrical measurement interface 022 and the measurement jack 012; the mounting depth of the external electrical measurement interface 022 is limited behind the step surface, the retaining rib 28 is wedged in a slot in the electrical measurement interface press plate 021 to prevent rotation of the external electrical measurement interface. The measurement circuit 709 of the main control circuit board 700 has a soldered elastic plate 713 fixed to the external electrical measurement interface 022 by a screw, the end surface of the external electrical measurement interface 022 has a square groove III 055 to prevent rotation of the elastic plates 713, the elastic plate 713 is wedged in the groove III 055, and the groove III 055 can prevent the elastic plate 713 soldered to the measurement circuit 709 from rotating together with the fastening screw when the elastic plate is fastened to the external electrical measurement interface 022, so as to protect the soldering point at the joint between the elastic plate and the measurement circuit 709.

The DC interface 023 and the USB interface 024 are soldered to a connecting circuit board 020, the connecting circuit board 020 is plug-in mounted to the socket 707 for connecting USB interface and DC interface on the main control circuit board, and is fixed to the electrical measurement interface press plate 021 by screws; the DC interface 023 and the USB interface 024 are exposed out of the calibrator from the external electric device interface mounting hole 015 on the left side of the upper housing 010.

Two additional module interfaces 025 (see FIG. 3) are provided to extend to measure temperature and pressure. After the two module interfaces 025 are fixed to a mounting plate 027, the mounting plate 027 is fixed to the right side (with reference to the direction of use of the calibrator) of the upper housing 010 at the external electric device interface mounting hole 015, and is exposed out of the calibrator.

The data wires of the touch display screen 800 are connected and plug-in mounted to the display screen socket 705 and the touch screen socket 706, the main control circuit board 700 presses the touch display screen 800 and a touch screen bracket 801, and is mounted together with the touch display screen 800 and the touch screen bracket 801 in a square frame 013 in the inner side of the upper housing 010; the microswitch 712 on the main control circuit board 700 contacts with a power button 014, which switches on/off the calibrator by manipulating the microswitch 712.

The main control circuit board 700 is further provided with a WiFi module and a Bluetooth module, the external communication interface connected to the main control circuit board is provided with a USB interface, the calibrator may perform data and report import/export by means of wireless or wired communication, and the DC interface supplies power to the calibrator or charges the rechargeable battery.

The main control circuit board 700 further has reserved extended functional interface and external device interface, from which external pressure and temperature modules or the like may be connected to extend the calibration function of the calibrator in the present invention to acquire other desirable parameters and extend the pressure measurement range of the calibrator in the present invention to be beyond the local pressure generation capacity.

Figure 37:
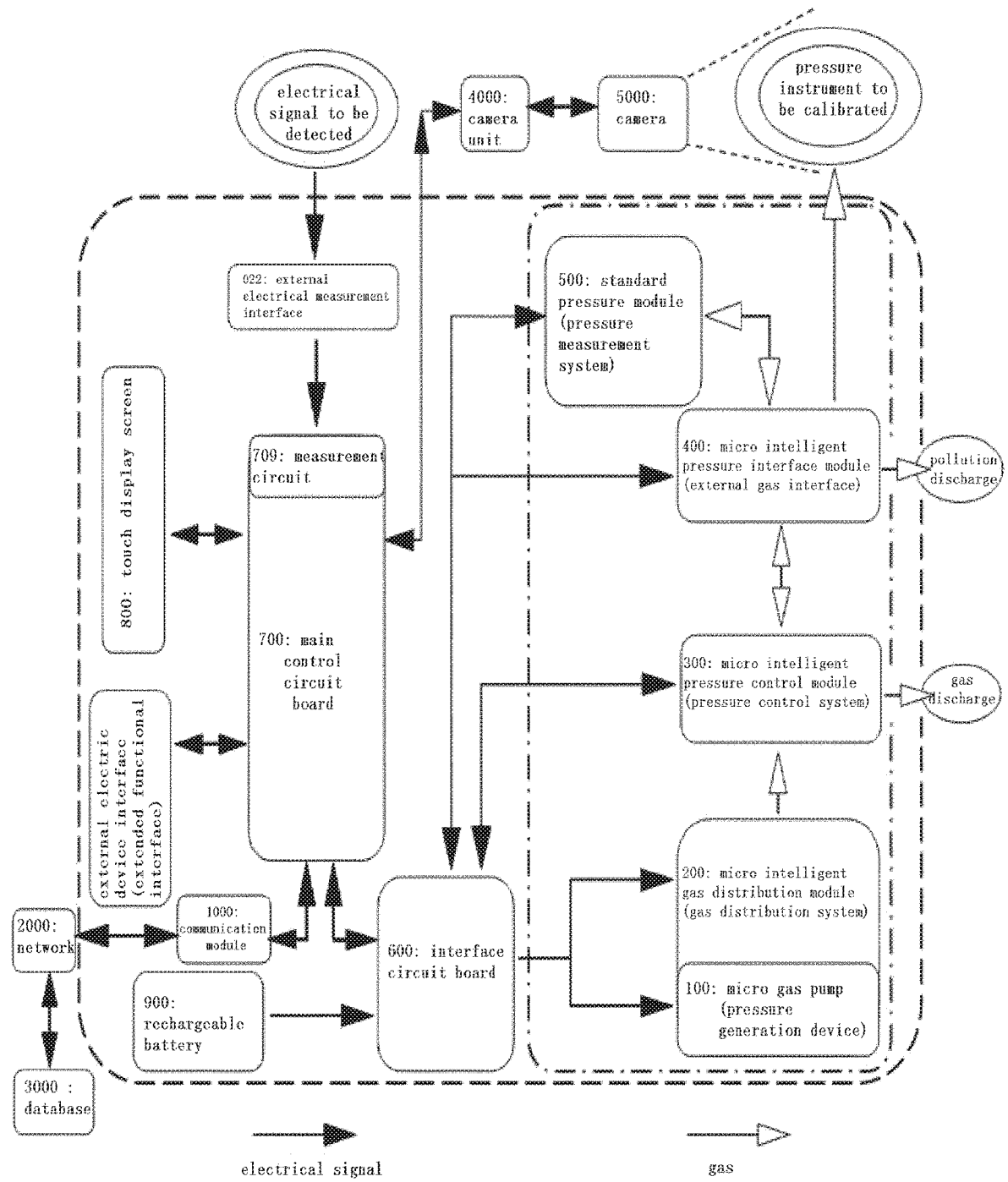

As shown in FIG. 37, the main control circuit board 700 is further connected with a communication module 1000, which is connected to a database 3000 through a network 2000. The communication module 1000 accomplishes data interaction between the main control circuit board 700 and the remote database 3000, and has a remote communication function. In terms of the implementation form, the communication module 1000 may be a communication program integrated in the main control circuit board 700, and, in that case, the main control circuit board 700 is provided with a network interface to access the network 2000; alternatively, the communication module 1000 may be a separate hardware module, for example, the communication module 1000 has a connecting plug and a network interface, wherein the connecting plug is configured to couple to the main control circuit board 700 to realize a mechanical connection and an electrically connection between the communication module 1000 and the main control circuit board 700, the network interface is connected to the network 2000 and accesses the database 3000 through the network 2000, wherein the network 2000 may be an Internet-based industrial Ethernet or a wireless network that supports Internet connection to realize the remote communication function.

The communication module 1000 may be integrated in the calibrator, so that the calibrator has a built-in remote communication function, and any intermediate communication medium is omitted; thus, as long as the calibrator is connected to a supported network, it can be connected to a remote database 3000 after simple setting, and download the basic information of the pressure instrument to be calibrated (including information such as the measurement range, accuracy, ID, and manufacturer, etc. of the pressure instrument to be calibrated), and history calibration data of the pressure instrument to be calibrated (including pressure indication values and pressure indication errors of all pressure calibration points, current values, and current indication errors, etc.), and calibration scheme (including an automatic calibration procedure for calibration operation) from the database in real time, and thereby realize automatic generation of calibration data of the calibrated pressure instrument, and upload the calibration data to the database 3000 through the network 2000 in real time.

As shown in FIG. 37, the main control circuit board 700 may further be electrically connected with a camera assembly, which comprises a camera unit 4000, a camera 5000 disposed on the camera unit 4000, and an image recognition program embedded in the main control circuit board 700, wherein the camera faces the front side of the pressure instrument to be calibrated, and can capture the data and model information displayed on a dial of the pressure instrument to be calibrated and the appearance characteristics of the pressure instrument; the captured image is transmitted via the camera unit 4000 to the main control circuit board 700, the image recognition program embedded in the main control circuit board 700 recognizes the image and thereby obtains model and basic information of the pressure instrument to be calibrated, e.g., measurement range, accuracy, ID, and manufacturer, etc. of the pressure instrument to be calibrated; in addition, the information may be transmitted by the main control circuit board 700 via the communication module 1000 to the remote database 3000.

Rechargeable Battery 900

As shown in FIGS. 2 and 3, guide rail grooves 901 are provided at the two sides of the rechargeable battery 900, a battery socket 902 is provided at the central part of the rechargeable battery 900, and a battery groove 903 is provided behind the rechargeable battery 900. A groove I 032 is arranged in the central part of the lower housing 030, a through-hole is arranged in the side surface in front of the groove, and a through-hole is arranged behind the bottom of the groove; battery mounting guide rails 034 are arranged on two sides of the back part of the lower housing, a groove II 033 is arranged in the middle between the guide rails, a through-hole is arranged in the bottom of the groove, and the battery plug 604 of the interface circuit board 600 is exposed from the through-hole in the bottom of the groove; a T-shaped groove 035 is arranged in the back part of the lower housing, a T-shaped end of the T-shaped groove 035 communicates with the back side of the lower housing, a rotatable T-shaped battery lock knob is provided in the T-shaped groove 035, a T-shaped cross end of the T-shaped battery lock knob is a semicircular column, and the T-shaped end is a column.

After the guide rail grooves 901 at the two sides of the battery are plug-in mounted to the battery mounting guide rails 034 at the two sides of the back part of the lower housing, the battery is fixed in a left-right direction; after the battery is pushed forward to a limit position, the guide rails fix the battery in a top-bottom direction, and the battery socket 902 is connected to the battery plug 604 on the interface circuit board; after the column part of the T-shaped battery lock knob is rotated from a position behind a central cover by 180°, a semicircular protrusion of the semicircular column part is rotated from the T-shaped groove 035 of the lower housing to the battery groove 903, so that the rechargeable battery 900 is fixed in a front-back direction; finally, the battery is fixed and pressed to the end surface of a lower cover 040. The rechargeable battery is a high-capacity battery and can supply power continuously for a long time to facilitate the field calibration work.

As shown in FIGS. 2, and 11-13, the parts of the fully-automated handheld pressure calibrator in the present invention are assembled as follows:

First, the electrical measurement interface 022 is fixed to the measurement jack 012 of the upper housing 010, the touch display screen 800 is connected to the main control circuit board 700 and placed inside the upper housing 010, the elastic plate 713 is connected to the electrical measurement interface 022, the interface circuit board 600 is fixed to the back bottom side of the main control circuit board 700, the micro intelligent pressure interface module 400 is disposed on the main control circuit board 700 and then the top side of the micro intelligent pressure interface module 400 is fixed to the inner side of the upper housing 010, the connecting circuit board 020 and the module interface 025 are mounted to the left side and right side of the upper housing 010, the lower housing 030 is covered, the standard pressure module 500 is mounted on the micro intelligent pressure interface module 400 via the through-hole II 031 of the lower housing 030, and the gas circuit interface of the standard pressure module 500 is butt-jointed with the gas circuit interface of the micro intelligent pressure interface module 400; the micro intelligent pressure control module 300 is mounted on the top part of the back side of the lower housing 030, and the control module pressure connector 302 of the micro intelligent pressure control module 300 communicates with the pressure input port of the micro intelligent pressure interface module 400; then, the micro intelligent gas distribution module 200 (including the micro gas pump 100) is stack-mounted, and the pressure output port and the vacuum output port of the micro intelligent gas distribution module 200 are plug-in mounted to and communicate with corresponding pressure and vacuum interfaces of the micro intelligent pressure control module 300; the lower cover 040 is mounted, and the rechargeable battery 900 is mounted on the back bottom part of the lower housing 030.

The working process of the fully-automated handheld pressure calibrator is as follows:

1) Connect an instrument to be calibrated, including gas circuit connection and connection from the electrical measurement interface 022 to the electrical signal side of the instrument to be calibrated;

2) Power on, and set a required pressure on the touch screen;

3) The calibrator operates automatically after the pressure is determined, wherein:

the micro gas pump 100 starts, and outputs pressurized gas or vacuum to the gas chamber 234/236 of the micro intelligent gas distribution module 200 according to the preset pressure;

on one hand, the micro intelligent pressure control module 300 measures the pressure or vacuum of the gas chamber of the micro intelligent gas distribution module 200, and controls the micro gas pump 100 to stop gas supply when a required pressure is reached; on the other hand, the micro intelligent pressure control module 300 regulates the output pressure of the micro intelligent pressure interface module 400 to the preset pressure via an gas intake or gas discharge control solenoid valve according to the pressure value given by the standard pressure module 500;

4) Read and output the pressure value of the pressure instrument to be calibrated, directly acquire the electrical signals outputted from the pressure instrument to be calibrated, and perform calculations as specified, and accomplish the testing and logging of a pressure point of the pressure instrument to be calibrated; the procedure is repeated automatically to accomplish the testing and logging of a plurality of pressure points;

5) Store the pressure testing task, judge whether the calibrated pressure instrument complies with the specification, and output a testing report.

In the fully-automated handheld pressure calibrator in the present invention, the touch display screen employs a user-friendly interface for man-machine interaction, to reduce learning difficulty for the user; the user can perform all operations in the calibration process of the calibrator with the touch display screen interface. The electrical circuit system of the fully-automated handheld calibrator can be operated on the touch display screen to realize intelligent control of the electrical circuit system and the gas circuit system, and the intelligent gas circuit system can be controlled via the electrical circuit system, so that the electrical circuit system can accomplish power supply, electrical signal detection, and electrical signal commissioning of the electrical circuits of the instrument to be calibrated, and thereby the operations of the gas circuit system, including intelligent pressure generation, gas distribution, pressure control, pressure relief, and blowdown, etc. can be accomplished. The calibration of the pressure and electrical signals of the instrument can be accomplished. In addition, the main control circuit board further can log the electrical signals pressure signals, and calibration data from all parts, calculate a calibration result, store calibration records, and output a calibration report. The fully-automated handheld pressure calibrator in the present invention has the following features:

A. The fully-automated handheld pressure calibrator is in a modular design, the gas circuit components and electrical circuit components are integrated in the housing of the calibrator, and the rechargeable battery is mounted on the housing externally. The gas circuit components include a micro intelligent gas distribution module (including a micro gas pump), a micro intelligent pressure control module, a micro intelligent pressure interface module, and a standard pressure module. The electrical circuit components include a touch display screen, a main control circuit board, an interface circuit board, an external electrical measurement interface, and external electric device interfaces. The components are in a modular design according to their functions, and the modules are convenient to replace and easy to repair and service.

B. The housing is light and compact, and convenient and comfortable for holding in hand; the entire apparatus is compact in size, light in weight, suitable for holding in hand, convenient to carry, and convenient to use in field calibration work.

The four sides of the upper housing and the four sides of the lower housing are coated with an elastic material, which transits to the top front inclined surface of the upper housing, the bottom front inclined surface of the lower housing, and the beveled through-holes, and sealing is formed between the housing and the parts mounted in the beveled through-holes in the installation process. A flange is provided at the joint between the upper housing and the lower housing and the lower cover to ensure the sealing of the housing, the electrical circuit components and the pressure interface modules of the gas circuit components are mounted between the upper housing and the lower housing. A through-frame is arranged in the front inclined surface of the upper housing, the square frame is arranged at the top of the upper housing to mount the touch display screen, circular holes are arranged above the square frame to mount the external electrical measurement interface, a power button mounting hole is arranged below the square frame, the flange of the power button is pressed to the power button mounting hole in a sealed form, external electric device interface mounting holes are arranged in the left side and right side of the upper housing, and the mounting holes are sealed with non-removable watertight covers after external electric device interfaces are mounted to the mounting holes. The parts of the housing are sealed so that the entire fully-automated handheld calibrator in the present invention is sealed at a high waterproof and dustproof level.

C. After the circumference of the touch display screen is sealed to the square hole with a piece of waterproof foam material, the touch screen bracket is stack-mounted from the inner side of the upper housing into the groove around the rectangular hole of the upper housing. A display screen socket, a touch screen socket, a module interface socket, a combined socket with USB interface and DC interface, and a control circuit board socket are provided on the main control circuit board. After the data wires of the touch display screen are connected to the main control circuit board, the main control circuit board presses the touch display screen, the microswitch on the interface circuit board contacts with the power switch, and the power switch realizes power on/off control by manipulating the microswitch; a Bluetooth module, a Wifi module, and a core circuit board are also provided on the main control circuit board. A supporting frame is provided between the main control circuit board and the interface circuit board, and the supporting frame are fixed together with the main control circuit board and the touch display screen inside the upper housing; the interface circuit board is fixed to the main control circuit board via the supporting frame; besides, the interface circuit board is connected to the main control circuit board via an interface circuit board plug.

D. The main control circuit board include a measurement circuit, the external electrical measurement interface is connected to the measurement circuit; the external electric device interfaces, the touch display screen, and the interface circuit board are connected to the main control circuit board; the micro intelligent gas distribution module (including a micro gas pump), the micro intelligent pressure control module, and the micro intelligent pressure interface module constitute a modularized intelligent gas circuit system. The components of the modularized intelligent gas circuit system are connected to the interface circuit board, and the interface circuit board is plug-in mounted and connected to the main control circuit board.

E. The touch display screen employs a user-friendly interface for man-machine interaction to reduce learning difficulty for the user; the user can perform all operations in the calibration process of the calibrator with the touch display screen interface. The electrical circuit system of the fully-automated handheld calibrator can be operated on the touch display screen to realize intelligent control of the electrical circuit system and the gas circuit system, and the intelligent gas circuit system can be controlled via the electrical circuit system, so that the electrical circuit system can accomplish power supply, electrical signal detection, and electrical signal commissioning of the electrical circuits of the instrument to be calibrated, and thereby the operations of the gas circuit system, including intelligent pressure generation, gas distribution, pressure control, pressure relief, and blowdown, etc. can be accomplished. The calibration of the pressure and electrical signals of the instrument can be accomplished. In addition, the main control circuit board further can log the electrical signals pressure signals, and calibration data from all parts, calculate a calibration result, store calibration records, and output a calibration report.

F. After the external electrical measurement interface is mounted to the mounting base, the external electrical measurement interface is sealed to the circular hole of the upper housing by a seal ring, and is connected to the measurement circuit of the main control circuit board via an elastic plate, the elastic plate is wedged into the groove below the external electrical measurement interface, and the electrical measurement jack has an anti-rotation effect. After the external electrical measurement interface is connected to the main control circuit board, it is mounted in the circular hole above the upper housing via a mounting base. After the USB interface and the DC interface are connected to the connecting circuit board on the electrical measurement interface press plate, they are plug-in mounted to the combined socket with USB interface and DC interface on the main control circuit board, and are exposed out of the calibrator from the mounting holes in a side of the top cover; two module interfaces are mounted to the other side of the top cover and exposed out of the calibrator from the mounting holes in the side, and the electrical circuits are together connected to the module interface socket on the main control circuit board. The mounting holes in the two sides are sealed with a waterproof cover respectively.

The main control circuit board is further provided with a WiFi module and a Bluetooth module, the external communication interface connected to the main control circuit board is provided with a USB interface, the calibrator may perform data and report import/export by means of wireless or wired communication, and the DC interface supplies power to the calibrator or charges the rechargeable battery. Two module interfaces are connected to the main control circuit board, and external modules for pressure and temperature, etc. are connected from the interface module to extend the calibration function of the calibrator in the present invention to acquire other desirable parameters, and extend the pressure measurement range to the calibrator in the present invention to be beyond the local pressure generation capacity.

G. A gas distribution module socket, a control module socket, an interface module socket, a battery plug, and a testing socket are provided on the interface circuit board. The gas circuit components are connected to the control module, which performs intelligent control of the gas circuit. The interface module is mounted inside the upper housing via a hanger-type fixing base, the pressure interface and the reference pressure interface of the interface module extend out of the calibrator through the beveled through-holes in the front side of the upper housing, the standard pressure module mounting base is fitted with the beveled through-hole in the front side of the lower cover, and the standard pressure module may be replaced and mounted from the beveled through-hole in the front side of the lower housing. In the present invention, the standard pressure module mounted on the pressure interface module may be replaced with a standard pressure module that has different accuracy, a different measurement range, and of a different type (absolute pressure, differential pressure, or gauge pressure), so as to calibrate a different pressure instrument.

H. The micro intelligent gas distribution module and the micro intelligent pressure interface module for the gas circuit components are mounted between the lower housing and the lower cover. In the groove II arranged on the back part of the lower housing, the battery plug of the interface circuit board can be exposed through the through-hole in the bottom of the groove.

I. The lower cover has a flat surface, a group of gas suction holes and a group of vent holes are arranged in the flat surface, and a filter is provided at the position of the gas suction holes. After the micro intelligent gas distribution module is plug-in mounted to the micro intelligent pressure control module, the micro intelligent gas distribution module and the micro intelligent pressure control module are together mounted in the central groove of the lower housing; the electrical circuits of the micro intelligent gas distribution module and the micro intelligent pressure control module are connected to the main control circuit board respectively via the through-hole behind the bottom of the central groove of the lower cover; the union joint on the micro intelligent pressure control module is plug-in mounted to the gas source interface of the micro intelligent pressure interface module through a through-hole in a side in front of the central groove of the lower housing to supply gas to the interface. After the lower cover is mounted to the lower housing, the inner flat surface presses the sealing cushion on the micro intelligent gas distribution module to form a sealed structure. The gas suction holes and the vent holes in the lower cover are connected to two profile through-holes in the sealing cushion respectively.

J. battery mounting guide rails are provided on the two sides of the back part of the lower housing, guide rail grooves are arranged on the two sides of the rechargeable battery, the guide rails are plug-in mounted to the guide rail grooves, so that the battery is fixed in left-right direction and top-bottom direction; the battery lock knob, the T-shaped groove of the lower housing, and the battery grooves are fitted together to fix the rechargeable battery in the front-back direction.

The present invention can attain the following beneficial effects:

(1) The calibrator in the present invention is a fully-automated handheld calibrator, which is compact in size and light in weight, suitable for holding in hand and carrying to an instrument service site for field calibration work.

(2) The touch display screen employs a user-friendly interface for man-machine interaction to reduce learning difficulty for the user; the user can perform all operations in the calibration process of the calibrator with the touch display screen interface.

(3) The calibrator realizes intelligent pressure generation, gas distribution, pressure control, and pressure relief, and meets the requirements for calibrating absolute pressure instruments, differential pressure instruments, and gauge pressure instruments.

(4) The calibrator can measure electrical signals and electrical signals related with pressure signals. The main control circuit board can log the electrical signals or the electrical signals related with pressure signals, compare the signals with standard signals, calculate a calibration result, and provide a calibration report.

(5) The main control circuit board is provided with a Wifi module and a Bluetooth module, and the external electrical measurement interface connected to the main control circuit board is provided with a USB interface, so that the calibrator can carry out import/export of data and report.

(6) Two module interfaces are provided on the external electrical measurement interface to extend the calibration function of the calibrator in the present invention to calibrate temperature, and extend the measurement ranges for pressure and electrical signal calibration of the calibrator in the present invention to be beyond the specified measurement ranges.

(7) The fully-automated handheld calibrator provided in the present invention is equipped with a high-capacity rechargeable battery, which can supply power continuously for a long time to facilitate field calibration work.

INDUSTRIAL APPLICABILITY

The present invention provides a fully-automated handheld pressure calibrator, in which the constituents of gas circuit components and the constituents of electrical circuit components are integrated and assembled in a modular form in a housing, and thereby the pressure calibrator has a compact structure and can be manufactured in mass production. The pressure calibrator is small in size, light in weight, suitable for holding in hand and carrying to an instrument service site for field calibration work, and suitable for industrial application.

The invention claimed is:

1. A fully-automated handheld pressure calibrator, comprising:
   a housing, and
   gas circuit components and electrical circuit components assembled in the housing,
   wherein, the gas circuit components comprise a pressure source capable of supplying pressurized gas, the constituents of the gas circuit components and the constituents of the electrical circuit components are integrated and assembled in the housing in a modular form, and the overall profile of the calibrator is suitable for holding in hand, and
   wherein, the constituents of the gas circuit components include:
   a micro intelligent gas distribution module (200) combined with a micro gas pump (100), configured to provide pressurized gas and vacuum for the pressure calibrator, wherein the micro gas pump (100) serves as the pressure source;
   a micro intelligent pressure control module (300), configured to control and regulate the pressurized gas and vacuum from the micro intelligent gas distribution module (200);
   a standard pressure module (500), configured to provide reference pressure for the pressure calibrator; and
   a micro intelligent pressure interface module (400), configured to connect the micro intelligent pressure control module (300) and the standard pressure module (500), wherein
   a positive pressure connector (240) and a vacuum connector (245) of the micro intelligent gas distribution module (200) are plugged in and communicate with corresponding pressurized gas interface (72) and vacuum interface (80) of the micro intelligent pressure control module (300),
   a control module pressure connector (302) of the micro intelligent pressure control module (300) communicates with a gas pressure input interface (415) of the micro intelligent pressure interface module (400), and
   a gas circuit interface of the standard pressure module (500) is butt-jointed with a gas circuit interface of the micro intelligent pressure interface module (400).

2. The fully-automated handheld pressure calibrator according to claim 1, wherein, the electrical circuit components include: an interface circuit board (600) configured to connect the electrical circuits of the gas circuit components, a main control circuit board (700) configured to control the operation of the entire apparatus, a touch display screen (800) for input and output, external electrical measurement interfaces (022), and external electric device interface mounting holes (015), wherein the electrical circuits of the electrical circuit components and a rechargeable battery (900) are electrically connected to the main control circuit board (700).

3. The fully-automated handheld pressure calibrator according to claim 2, wherein, the housing comprises an upper housing (010), a lower housing (030), and a lower cover (040); the upper housing (010) and the lower housing (030) are fitted together to form a main body of calibrator suitable for holding in hand, and the micro intelligent pressure interface module (400), the standard pressure module (500), the main control circuit board (700), the interface circuit board (600), and the touch display screen (800) are assembled in an internal space of the main body; the lower cover (040) is mounted on a top part outside the lower housing (030), and the micro intelligent gas distribution module (200) and the micro intelligent pressure control module (300) are assembled in an internal space formed by the lower cover (040) and the lower housing (030); the rechargeable battery (900) is assembled on a bottom part outside the lower housing (030).

4. The fully-automated handheld pressure calibrator according to claim 3, wherein, the upper housing (010) is a wedge-shaped cover that is larger at the upper part and smaller at the lower part, with an inclined top end surface; a through-hole I (011) is arranged in the inclined top end surface to assemble a pressure connector (403) and a reference pressure connector (414) on the micro intelligent pressure interface module (400) in a way that the pressure connector (403) and the reference pressure connector (414) are exposed outside the housing; a square frame (013) is arranged in an outward flat surface of the upper housing (010) to accommodate the touch display screen (800); three circular external measurement jacks (012) are arranged above the square frame (013), and a circular hole is arranged below the square frame to mount a power supply button (014); external electric device interface mounting holes (015) are arranged in left side and right side of the upper housing (010);

the lower housing (030) is a wedge-shape holder that is larger at the upper part and smaller at the lower part, with an inclined top end surface; a through-hole II (031) is arranged in the inclined top end surface to mount a standard pressure module mounting base (406) of the micro intelligent pressure interface module (400);

a groove (018) is arranged at a circumferential edge of the upper housing (010) where the upper housing (010) is fitted with the lower housing (030), a flange (036) is arranged at a corresponding circumferential edge of the lower housing (030) where the lower housing (030) is fitted with the upper housing (010), and the flange (036) and the groove (018) are tightly fitted with each other.

5. The fully-automated handheld pressure calibrator according to claim 1, wherein, the micro intelligent gas distribution module (200) comprises a micro gas pump (100) and a gas source terminal block (280), wherein, the gas source terminal block (280) is connected with the micro gas pump (100) and communicates with a gas circuit, a primary gas suction pipeline (114) configured to suck external gas and a secondary gas discharge pipeline (122) configured to output pressurized gas are provided in the micro gas pump (100), a positive pressure gas chamber (234) and a vacuum gas chamber (236) are provided in the gas source terminal block (280), the two gas chambers communicate with the two pipelines (114, 122) of the micro gas pump (100) and are controlled via micro solenoid valves (i.e., valve V1, valve V2, and valve V3) provided in the gas source terminal block (280).

6. The fully-automated handheld pressure calibrator according to claim 5, wherein, the gas source terminal block (280) comprises a valve terminal (230), two large accommodating cavities are arranged inside the valve terminal in a separated manner and are used as the positive pressure gas chamber (234) and the vacuum gas chamber (236) respectively, and the top parts of the accommodating cavities are sealed by a top cover (246); three small accommodating cavities are arranged inside the valve terminal and separated from each other to accommodate the valve V1, the valve V2, and the valve V3 respectively, and the positive pressure gas chamber (234) and the vacuum gas chamber (236) are connected with the three solenoid valves through pipelines.

7. The fully-automated handheld pressure calibrator according to claim 6, wherein, the micro gas pump (100) is a cylinder body-guided micro boosting electric gas pump, comprising a pump body base (108), a motor base (102) and a motor that are connected with the pump body base, an eccentric shaft (104) driven by the motor, a link rod (105) interlocked with the eccentric shaft, a primary cylinder body (1081), a secondary cylinder body (106), a piston rod (110) that runs through the primary cylinder body and the secondary cylinder body and is movable synchronously with the link rod, and a plurality of one-way valves provided at outer ends of the two cylinder bodies.

8. The fully-automated handheld pressure calibrator according to claim 7, wherein, the two ends of the pump body base (108) form the primary cylinder body (1081) and a secondary cylinder body support base (1082), the secondary cylinder body (106) is assembled at the inner side of the secondary cylinder body support base (1082) and is in the same axial line as the primary cylinder body (1081); the volume of the secondary cylinder body (106) is smaller than the volume of the primary cylinder body (1081), and a primary gas discharge pipeline (117) of the primary cylinder body (1081) communicates with a secondary gas suction pipeline (120) of the secondary cylinder body (106);

the two ends of the piston rod (110) are provided with a primary piston end (1101) and a secondary piston end (1102), the primary piston end is fitted with the primary cylinder body (1081), and the secondary piston end extends into the secondary cylinder body (106) and is fitted with the secondary cylinder body.

9. The fully-automated handheld pressure calibrator according to claim 8, wherein, the secondary cylinder body (106) is a hollow columnar body, a first step surface (1062) perpendicular to the axial direction of the secondary cylinder body (106) is arranged on the inner surface of the columnar body, a second combined seal (107) is assembled at the first step surface (1062), and the side surfaces of the pump body base (108) abut against the second combined seal (107);

the first step surface (1062) is configured in a way that a primary through-hole (1061) and a secondary through-hole (1066) are formed in the inner surface of the secondary cylinder body (106) and communicate with each other, the diameter of the primary through-hole (1061) is greater than the diameter of the secondary through-hole (1066), and the inner surface of the primary through-hole (1061), the first step surface (1062), and the outer surface of the secondary piston end (1102) of the piston rod (110) form an annular groove together, in which the second combined seal (107) is placed; a pair of protrusions (1083) corresponding to each other are arranged at the joint between the pump body base (108) and the secondary cylinder body (106) to retain the second combined seal (107).

10. The fully-automated handheld pressure calibrator according to claim 9, wherein, the outer surface of the secondary cylinder body (106) is at least provided with a second step surface (1063), a seal ring abuts against the second step surface (1063), and the sides of the motor base (104) abut against the seal ring; or, the outer surface of the secondary cylinder body (106) is provided with two stages of steps with a third step surface (1064) and a fourth step surface (1065), the distance of the third step surface (1064) from the central axis of the secondary cylinder body (106) is smaller than the distance of the fourth step surface (1065) from the central axis of the secondary cylinder body (106), a seal ring (128) abuts against the third step surface (1064), and the sides of the motor base (104) abut against the seal ring (128) and the fourth step surface (1065).

11. The fully-automated handheld pressure calibrator according to claim 10, wherein, the end intersecting surface area of the primary piston end (1101) is greater than the end intersecting surface area of the secondary piston end (1102), and the corresponding axial cross sectional area of the primary cylinder body (1081) is greater than the axial cross sectional area of the secondary cylinder body (106).

12. The fully-automated handheld pressure calibrator according to claim 11, wherein, the outer end of the primary cylinder body (1081) is provided with a cylinder body gasket (112), a primary gas suction one-way valve (115) and a primary gas discharge one-way valve (116) that are assembled in a reversed direction, and an end cap (113) sequentially, the primary gas suction one-way valve (115) and the primary gas discharge one-way valve (116) communicate with the inner cavity of the primary cylinder body (1081), a primary gas suction pipeline (114) on the end cap (113) is connected with external gas and communicates with the primary gas suction one-way valve (115), a primary gas discharge pipeline (117) on the end cap (113) communicates with the primary gas discharge one-way valve (116) and communicates with a secondary gas suction pipeline (120) in the secondary cylinder body (106) via a connection pipeline (119);

the outer end of the secondary cylinder body (106) is provided with a secondary gas suction pipeline (120) and a secondary gas discharge pipeline (122), a secondary gas suction one-way valve (121) configured to control gas intake is mounted in front of an inlet of the secondary gas suction pipeline (120), and the primary gas discharge pipeline (117) in the primary cylinder body (1081) communicates with the secondary gas suction one-way valve (121) and the secondary gas suction pipeline (120) via the connection pipeline (119) disposed in a valve terminal (130); a secondary gas discharge one-way valve (123) configured to control gas discharge is mounted at an outlet of the secondary gas discharge pipeline (122).

13. The fully-automated handheld pressure calibrator according to claim 12, wherein, the valve V3 disposed in the gas source terminal block (280) is a two-position three-way solenoid valve, which comprises a first vent hole (2331) of valve V3, a second vent hole (2332) of valve V3, and a third vent hole (2333) of valve V3, wherein the third vent hole (2333) of valve V3 communicates with the external atmosphere, the second vent hole (2332) of valve V3 communicates with the primary gas suction pipeline (114) of the micro electric pump (100), and the first vent hole (2331) of valve V3 communicates with the vacuum gas chamber (236) via a gas flow pipeline I (238);

the valve V1 disposed in the gas source terminal block (280) is a two-position two-way solenoid valve, which comprises a first vent hole (2311) of valve V1 and a second vent hole (2312) of valve V1, wherein the first vent hole (2311) of valve V1 communicates with the external atmosphere, and the second vent hole (2312) of valve V1 communicates with the secondary gas discharge pipeline (122) of the micro gas pump (100);

the valve V2 disposed in the gas source terminal block (280) is a two-position two-way solenoid valve, which comprises a first vent hole (2321) of valve V2 and a second vent hole (2322) of valve V2, wherein the first vent hole (2321) of valve V2 communicates with the secondary gas discharge pipeline (122) of the micro gas pump (100), and the second vent hole (2322) of valve V2 communicates with the positive pressure gas chamber (234).

14. The fully-automated handheld pressure calibrator according to claim 13, wherein, a sealing cushion (241) is laid on the outer surface of the valve terminal (230), and has a first irregular through-hole (2411) that communicates with the primary gas suction pipeline (114) via the third vent hole (2333) of valve V3; the outer side of the sealing cushion is fitted with the lower cover (040), the lower cover (040) has gas suction through-holes (042) composed of a plurality of vent holes at a position corresponding to the first irregular through-hole (2411), and a filter (041) is provided in the first irregular through-hole (2411);

the sealing cushion (41) is further arranged with a second irregular through-hole (2412), which communicates with the secondary gas discharge pipeline (122) via the first vent hole (2311) of valve V1; the lower cover (040) has gas discharge through-holes (043) composed of a plurality of vent holes at a position corresponding to the second irregular through-hole (2412).

15. The fully-automated handheld pressure calibrator according to claim 14, wherein, the micro intelligent pressure control module (300) comprises a control valve terminal (61), and a pressure sensor (69), a vacuum sensor (67), a circuit board (63), a gas intake control solenoid valve (64), a gas discharge control solenoid valve (66), a fourth solenoid valve (65), a pressurized gas interface (72), a vacuum interface (80), and a gas passage connector, which are integrated in the control valve terminal (61), wherein:

a plurality of pipelines formed by pipeline holes are provided inside the control valve terminal;

both the pressure sensor (69) and the vacuum sensor (67) are electrically connected with the circuit board (63);

the pressurized gas interface (72), the pressure sensor (69), and the gas intake control solenoid valve (64) are connected with the gas passage connector via the plurality of pipelines;

the vacuum interface (80), the vacuum sensor (67), the fourth solenoid valve (65), and the gas discharge control solenoid valves (66) are connected with the gas passage connector through the plurality of pipelines.

16. The fully-automated handheld pressure calibrator according to claim 15, wherein, the gas passage connector is formed by a first connector (81), a union joint (82), and a control module pressure connector (302) that are connected sequentially, the first connector is a hollow tubular structure and is connected with one end of the union joint, the other end of the union joint is plug-in connected with the control module pressure connector (302), and a seal ring is provided inside the port of the first connector (81) and the port of the control module pressure connector (302).

17. The fully-automated handheld pressure calibrator according to claim 15, wherein, the pressure sensor, the vacuum sensor, and the circuit board are electrically connected to a main electrical circuit interface; the gas intake control solenoid valve, the gas discharge control solenoid valve, and the fourth solenoid valve are electrically connected to the main electrical circuit interface through connecting wires; and the main electrical circuit interface is connected to the interface circuit board (600).

18. The fully-automated handheld pressure calibrator according to claim 17, wherein, the gas intake control solenoid valve and the gas discharge control solenoid valve are micro high-precision gas flow control valves, each of which is arranged with a first port and a second port; the fourth solenoid valve is a two-position three-way solenoid valve arranged with a first vent hole (651) of fourth solenoid valve, a second vent hole (652) of fourth solenoid valve, and a third vent hole (653) of fourth solenoid valve; when the fourth solenoid valve is in a power-off state, the second vent hole (652) of fourth solenoid valve communicates with the third vent hole (653) of fourth solenoid valve; when the fourth solenoid valve is in a power-on state, the first vent hole (651) of fourth solenoid valve communicates with the second vent hole (652) of fourth solenoid valve, and the second vent hole (652) of fourth solenoid valve is blocked from the third vent hole (653) of fourth solenoid valve.

19. The fully-automated handheld pressure calibrator according to claim 15, wherein,
the pressurized gas interface (72) is fixed to one side of the control valve terminal (61), one end of the pressurized gas interface (72) is plug-in mounted in and leak-tight connected with the positive pressure connector (240) of the micro intelligent gas distribution module (200), and the other end of the pressurized gas interface (72) is inside the control valve terminal and communicates with a first pressure pipeline (73); the pressure sensor (69) is arranged with a first port and a second port, the first port communicates with the first pressure pipeline (73), and the second port communicates with a second pressure pipeline (74); the gas intake control solenoid valve (64) is arranged with a first port and a second port, the first port communicates with the second pressure pipeline (74), and the second port communicates with a third pressure pipeline (75); the third pressure pipeline (75) communicates with a fourth pressure pipeline (76); the fourth pressure pipeline (76) communicates with a second port of the gas discharge control solenoid valve (66) and the first connector (81);
the vacuum interface (80) is fixed to one side of the control valve terminal (61), one end of the vacuum interface (80) is located on the surface of the control valve terminal and plug-in mounted in and leak-tight connected with the vacuum connector (245) of the micro intelligent gas distribution module (200), and the other end of the vacuum interface (80) is inside the control valve terminal and communicates with a first vacuum pipeline (78); the vacuum sensor (67) is arranged with a first port and a second port, the first port communicates with the first vacuum pipeline (78), and the second port communicates with the first vent hole (651) of fourth solenoid valve; the second vent hole (652) of fourth solenoid valve communicates with a downstream gas discharge pipeline (77), and the third vent hole (653) of fourth solenoid valve communicates with the atmosphere; the downstream gas discharge pipeline (77) is connected with the first port of the gas discharge control solenoid valve (66), the second port of the gas discharge control solenoid valve communicates with the fourth pressure pipeline (76), and the fourth pressure pipeline is connected with the first connector (81).

20. The fully-automated handheld pressure calibrator according to claim 19, wherein, the micro intelligent pressure interface module (400) comprises a connector base (402) configured to assemble a standard pressure module (500), and a pressure connector (403), a reference pressure connector (414), and a gas pressure input interface (415) that are provided on the connector base, wherein the gas pressure input interface communicates with the pressure connector, the reference pressure connector, and the standard pressure module through gas flow pipelines inside the connector base, the pressure connector and the reference pressure connector are connected with an external pressure instrument to be calibrated, wherein the connector base (402) comprises a first columnar body structure and a second columnar body structure that extend in two different directions, and has two connecting surfaces, i.e., a gas pressure input connecting surface is arranged at the junction between the two columnar body structures, and the gas pressure input interface (415) is provided on the gas pressure input connecting surface; a connector connecting surface is arranged at and end of the first columnar body structure, and the pressure connector (403) and the reference pressure connector (414) are provided on the connector connecting surface; a standard pressure module connecting surface is arranged at an end of the second columnar body structure, and the standard pressure module (500) is assembled on the standard pressure module connecting surface.

21. The fully-automated handheld pressure calibrator according to claim 20, wherein, a reference pressure cavity (408), a gas-liquid separation chamber (407), and a first solenoid valve (409) are further provided in the connector base (402), the first solenoid valve is disposed between the pressure connector (403) and the gas-liquid separation chamber, the pressure connector communicates with the gas-liquid separation chamber via a first gas flow pipeline (421) and a second vent hole (424) of first solenoid valve, and the gas-liquid separation chamber directly communicates with the gas pressure input interface (415); the gas-liquid separation chamber communicates with the reference pressure cavity via the first solenoid valve and a fourth gas flow pipeline (420), and the reference pressure cavity communicates with the reference pressure connector (414).

22. The fully-automated handheld pressure calibrator according to claim 21, wherein, the outer side of the gas-liquid separation chamber is sealed by means of a vent valve seat (404), a second solenoid valve (410) is provided in the vent valve seat, a second vent hole (426) of second solenoid valve communicates with the gas-liquid separation chamber (407) through the first gas flow pipeline (421), and a first vent hole (425) of second solenoid valve communicates with the atmosphere.

23. The fully-automated handheld pressure calibrator according to claim 22, wherein, a filth filter (413) is provided at an internal port of the pressure connector (403) and an internal port of the reference pressure connector (414) respectively.

24. The fully-automated handheld pressure calibrator according to claim 23, wherein, a module pressure interface (416) and a module reference pressure interface (417) are provided on the standard pressure module connecting surface of the connector base (402), the module reference pressure interface directly communicates with the reference pressure cavity (408), and module pressure interface communicates with the gas-liquid separation chamber (407) through a third gas flow pipeline (419).

25. The fully-automated handheld pressure calibrator according to claim 24, wherein, a standard pressure module mounting base (406) is further mounted on the standard pressure module connecting surface of the connector base (402), the standard pressure module mounting base is a columnar body structure with a L-shaped stepped hole, a deeper side of the L-shaped stepped hole is connected with a connecting surface of the standard pressure module mounting base of the connector base, a through-slot is arranged in the step of a shallower side of the L-shaped stepped hole, a second circuit board (405) is mounted on the top part of the through-slot, a communication plug (412) passes through the through-slot and is electrically connected to the second circuit board, and a socket (411) is electrically connected to the communication plug.

26. The fully-automated handheld pressure calibrator according to claim 25, wherein, the standard pressure module (500) is a differential pressure module plug-in mounted to the connector base (402) from the mounting base of the standard pressure module (406), a pressure interface (505) of the differential pressure module is plug-in mounted to the module pressure interface (416) of the connector base, the pressure reference interface (514) is plug-in mounted into the module reference pressure interface (417), a seal ring (504) of the differential pressure module seals the interface connections, the communication plug (412) on the connector base is plug-in mounted into a communication socket (508) of the differential pressure module, a first circuit board (502) of the differential pressure module is electrically connected to the second circuit board (405) on the connector base, and the differential pressure module is fixed to the connector bases (402) by non-removable screws (506) on the differential pressure module; or the standard pressure module is an absolute pressure module, a pressure interface (505) of the absolute pressure module is plug-in mounted into the module pressure interface (416) of the connector base, a seal ring (504) of the absolute pressure module seals the interface connections, the communication plug (412) on the connector base is plug-in mounted into a communication socket (508) of the absolute pressure module, a first circuit board (502) of the absolute pressure module is electrically connected to the second circuit board (405) on the connector base, and the absolute pressure module is fixed to the connector base (402) by non-removable screws on the absolute pressure module; or the standard pressure module is a gauge pressure module, a pressure interface (505) of the gauge pressure module is plug-in mounted into the module pressure interface (416) of the connector base, a seal ring (504) of the gauge pressure module seals the interface connection, the communication plug (412) on the connector base is plug-in mounted into a communication socket (508) of the gauge pressure module, a first circuit board (502) of the gauge pressure module is connected to the second circuit board (405) of the connector base, and the gauge pressure module is fixed to the connector base (402) by non-removable screws on the gauge pressure module.

27. The fully-automated handheld pressure calibrator according to claim 26, wherein, an interface circuit board plug (601) configured to connect the main control circuit board (700), a gas distribution module socket (602) configured to connect the electrical circuit (201) of the micro intelligent gas distribution module (200), a control module socket (603) configured to connect the electrical circuit (301) of the micro intelligent gas control module (300), a battery plug (604) configured to connect a rechargeable battery (900), and an interface module socket (606) configured to connect the electrical circuit (401) of the micro intelligent pressure interface module (400) are distributed on the interface circuit board (600).

28. The fully-automated handheld pressure calibrator according to claim 27, wherein, a display screen socket (705) and a touch screen socket (706) configured to connect a display screen and a touch screen in the touch display screen (800) respectively, module interface sockets (704) configured to extended external module interfaces (025) for temperature and pressure, etc., a socket (707) for connecting USB interface (024) and DC interface (023), and interface circuit board sockets (703) configured to connect the interface circuit board (600), and a core circuit board (701), a Bluetooth module (708), a Wifi module (702), a memory unit (711), and a microswitch (712), etc. are distributed on the main control circuit board (700).

29. The fully-automated handheld pressure calibrator according to claim 28, wherein, the main control circuit board (700) further includes a measurement circuit (709) configured to connect external electrical measurement interfaces, which are a plurality of external electrical measurement interfaces (022) mounted on an electrical measurement interface press plate (021) and pressed into measurement jacks (012) on a front end surface of the upper housing (010).

30. The fully-automated handheld pressure calibrator according to claim 29, wherein, the main control circuit board (700) is connected with the interface circuit board (600) via a supporting frame (050), which is mounted together with the main control circuit board (700) and the touch display screen (800) integrally on the inner side of the upper housing (010).

31. The fully-automated handheld pressure calibrator according to claim 30, wherein, the main control circuit board (700) is further connected with a communication module (1000), which is connected to a database (3000) through a network (2000).

32. The fully-automated handheld pressure calibrator according to claim 31, wherein, the main control circuit board (700) is electrically connected with a camera assembly that comprises a camera unit (4000), a camera (5000) provided on the camera unit, and an image recognition program embedded in the main control circuit board (700), wherein the camera faces the front side of the calibrated pressure instrument to capture the data and model information displayed on a dial of the calibrated pressure instrument and the appearance characteristics of the calibrated pressure instrument.

33. A cylinder body-guided micro boosting electric gas pump, comprising:
a pump body base (108),
a motor base (102) and a motor that are connected with the pump body base,
an eccentric shaft (104) driven by the motor,
a link rod (105) interlocked with the eccentric shaft,
a primary cylinder body (1081),
a secondary cylinder body (106),
a piston rod (110) that runs through the primary cylinder body and the secondary cylinder body and is movable synchronously with the link rod, and
a plurality of one-way valves provided at outer ends of the two cylinder bodies, wherein the two ends of the pump body base (108) form the primary cylinder body (1081) and a secondary cylinder body support base (1082), the secondary cylinder body (106) being assembled at the inner side of the secondary cylinder body support base (1082) and being in the same axial line as the primary cylinder body (1081), the volume of the secondary cylinder body (106) is smaller than the volume of the primary cylinder body (1081), a primary gas discharge pipeline (117) of the primary cylinder body (1081) communicating with a secondary gas suction pipeline (120) of the secondary cylinder body (106), and the two ends of the piston rod (110) are provided with a primary piston end (1101) and a secondary piston end (1102), the primary piston end being fitted with the primary cylinder body (1081), and the secondary piston end extending into the secondary cylinder body (106) and being fitted with the secondary cylinder body.

34. The cylinder body-guided micro boosting electric gas pump according to claim 33, wherein, the secondary cylinder body (106) is a hollow columnar body, a first step surface (1062) perpendicular to the axial direction of the secondary cylinder body (106) is arranged on the inner surface of the columnar body, a second combined seal (107) is assembled at the first step surface (1062), and the side surfaces of the pump body base (108) abut against the second combined seal (107);

the first step surface (1062) is configured in a way that a primary through-hole (1061) and a secondary through-hole (1066) are formed in the inner surface of the secondary cylinder body (106) and communicate with each other, the diameter of the primary through-hole (1061) is greater than the diameter of the secondary through-hole (1066), and the inner surface of the primary through-hole (1061), the first step surface (1062), and the outer surface of the secondary piston end (1102) of the piston rod (110) form an annular groove together, in which the second combined seal (107) is placed; a pair of protrusions (1083) corresponding to each other are arranged at the joint between the pump body base (108) and the secondary cylinder body (106) to retain the second combined seal (107).

35. The cylinder body-guided micro boosting electric gas pump according to claim 34, wherein, the outer surface of the secondary cylinder body (106) is at least provided with a second step surface (1063), a seal ring abuts against the second step surface (1063), and the sides of the motor base (104) abut against the seal ring; or, the outer surface of the secondary cylinder body (106) is provided with two stages of steps with a third step surface (1064) and a fourth step surface (1065), the distance of the third step surface (1064) from the central axis of the secondary cylinder body (106) is smaller than the distance of the fourth step surface (1065) from the central axis of the secondary cylinder body (106), a seal ring (128) abuts against the third step surface (1064), and the sides of the motor base (104) abut against the seal ring (128) and the fourth step surface (1065).

36. The cylinder body-guided micro boosting electric gas pump according to claim 35, wherein, the end surface area of the primary piston end (1101) is greater than the end surface area of the secondary piston end (1102), and the corresponding axial cross sectional area of the primary cylinder body (1081) is greater than the axial cross sectional area of the secondary cylinder body (106).

37. The cylinder body-guided micro boosting electric gas pump according to claim 36, wherein, the outer end of the primary cylinder body (1081) is provided with a cylinder body gasket (112), a primary gas suction one-way valve (115) and a primary gas discharge one-way valve (116) that are assembled in a reversed direction, and an end cap (113) sequentially, the primary gas suction one-way valve (115) and the primary gas discharge one-way valve (116) communicate with the inner cavity of the primary cylinder body (1081), a primary gas suction pipeline (114) on the end cap (113) is connected with external gas and communicates with the primary gas suction one-way valve (115), a primary gas discharge pipeline (117) on the end cap (113) communicates with the primary gas discharge one-way valve (116) and communicates with a secondary gas suction pipeline (120) in the secondary cylinder body (106) via a connection pipeline (119);

the outer end of the secondary cylinder body (106) is provided with a secondary gas suction pipeline (120) and a secondary gas discharge pipeline (122), a secondary gas suction one-way valve (121) configured to control gas intake is mounted in front of an inlet of the secondary gas suction pipeline (120), and the primary gas discharge pipeline (117) in the primary cylinder body (1081) communicates with the secondary gas suction one-way valve (121) and the secondary gas suction pipeline (120) via the connection pipeline (119) disposed in a valve terminal (130); a secondary gas discharge one-way valve (123) configured to control gas discharge is mounted at an outlet of the secondary gas discharge pipeline (122).

* * * * *